United States Patent
Ma et al.

(10) Patent No.: US 12,523,656 B2
(45) Date of Patent: Jan. 13, 2026

(54) ANTIBODIES AGAINST SARS-CoV-2 SPIKE PROTEIN

(71) Applicants: ShanghaiTech University, Shanghai (CN); ShOx Science Limited, Hong Kong (CN)

(72) Inventors: Peixiang Ma, Shanghai (CN); Guang Yang, Shanghai (CN); Richard A. Lerner, Shanghai (CN); Min Qiang, Shanghai (CN); Hou Wang, Shanghai (CN)

(73) Assignees: ShanghaiTech University, Shanghai (CN); ShOx Science Limited, Hong Kong (CN)

( * ) Notice: Subject to any disclaimer, the term of this patent is extended or adjusted under 35 U.S.C. 154(b) by 967 days.

(21) Appl. No.: 17/702,710

(22) Filed: Mar. 23, 2022

(65) Prior Publication Data
US 2022/0213176 A1    Jul. 7, 2022

Related U.S. Application Data

(63) Continuation of application No. PCT/CN2021/129036, filed on Nov. 5, 2021.

(60) Provisional application No. 63/184,548, filed on May 5, 2021, provisional application No. 63/110,977, filed on Nov. 6, 2020.

(51) Int. Cl.
*A61P 31/14*     (2006.01)
*A61K 39/00*     (2006.01)
*C07K 16/10*     (2006.01)
*G01N 33/569*    (2006.01)

(52) U.S. Cl.
CPC ........ *G01N 33/56983* (2013.01); *A61P 31/14* (2018.01); *C07K 16/1003* (2023.08); *A61K 2039/505* (2013.01); *C07K 2317/55* (2013.01); *C07K 2317/565* (2013.01); *C07K 2317/622* (2013.01); *C07K 2317/626* (2013.01)

(58) Field of Classification Search
CPC ......... G01N 33/56983; G01N 2469/10; G01N 2333/165; A61P 31/14; C07K 16/1003; C07K 2317/55; C07K 2317/565; C07K 2317/622; C07K 2317/626; C07K 2299/00; C07K 2317/21; C07K 2317/30; C07K 2317/33; C07K 2317/35; C07K 2317/70; C07K 2317/76; C07K 2317/92; A61K 2039/505
See application file for complete search history.

(56) References Cited

FOREIGN PATENT DOCUMENTS

| | | | |
|---|---|---|---|
| CN | 111423508 A | 7/2020 | |
| CN | 111592595 A | 8/2020 | |
| CN | 111620945 A | 9/2020 | |
| CN | 111647077 A | 9/2020 | |
| CN | 111662379 A | 9/2020 | |
| CN | 11778218 A | 10/2020 | |
| EP | 2441776 A1 * | 4/2012 | ............ C07K 14/78 |

OTHER PUBLICATIONS

Blanco-Toribio A, et al. Generation and characterization of monospecific and bispecific hexavalent trimerbodies. MAbs. Jan.-Feb. 2013;5(1):70-9. doi: 10.4161/mabs.22698. Epub Dec. 5, 2012. PMID: 23221741; PMCID: PMC3564888. (Year: 2012).*
Ju B., et al. Human neutralizing antibodies elicited by SARS-CoV-2 infection. Nature. Aug. 2020;584(7819):115-119. doi: 10.1038/s41586-020-2380-z. Epub May 26, 2020. PMID: 32454513. (Year: 2020).*
International Search Report and Written Opinion for International Application No. PCT/CN2021/129036, Feb. 9, 2022.

* cited by examiner

*Primary Examiner* — Chun W Dahle
*Assistant Examiner* — Alec Jon Peters
(74) *Attorney, Agent, or Firm* — Sheppard Mullin Richter & Hampton LLP

(57) ABSTRACT

Provided are human antibodies and fragments thereof having binding specificity to the SARS-CoV-2 spike protein's receptor binding domain (RBD). The antibodies and fragments have strong affinity and potent neutralization ability against the SARS-CoV-2 virus and various mutant forms. Also provided are trimeric antibodies which have further enhanced neutralization capabilities. The antibodies and fragments thus may be used for preventing or treating SARS-CoV-2 viral infection or detecting the presence of the virus in a sample.

20 Claims, 29 Drawing Sheets

Specification includes a Sequence Listing.

| Ag | Abs | $K_{on}$ (1/Ms) | $K_{off}$ (1/S) | $K_D$ (M) | $R^2$ value |
|---|---|---|---|---|---|
| WT RBD | S-B8 | $1.6 \pm 0.3 \times 10^6$ | $2.5 \pm 0.2 \times 10^{-4}$ | $1.7 \pm 0.2 \times 10^{-10}$ | 0.9925 |
| WT RBD | S-D4 | $3.9 \pm 0.3 \times 10^5$ | $4.6 \pm 0.5 \times 10^{-5}$ | $1.2 \pm 0.2 \times 10^{-10}$ | 0.9998 |
| WT RBD | S-E6 | $1.2 \pm 0.2 \times 10^6$ | $1.3 \pm 0.2 \times 10^{-4}$ | $1.1 \pm 0.2 \times 10^{-10}$ | 0.9992 |
| N501Y RBD | S-B8 | $1.7 \pm 0.3 \times 10^6$ | $2.2 \pm 0.2 \times 10^{-4}$ | $1.3 \pm 0.2 \times 10^{-10}$ | 0.9852 |
| N501Y RBD | S-D4 | $4.4 \pm 0.3 \times 10^5$ | $4.2 \pm 0.3 \times 10^{-5}$ | $9.7 \pm 0.3 \times 10^{-11}$ | 0.9992 |
| N501Y RBD | S-E6 | $1.2 \pm 0.2 \times 10^6$ | $2.5 \pm 0.2 \times 10^{-4}$ | $2.1 \pm 0.3 \times 10^{-10}$ | 0.9900 |

SEQUENCE LISTING

<160> NUMBER OF SEQ ID NOS: 126

<210> SEQ ID NO 1
<211> LENGTH: 116
<212> TYPE: PRT
<213> ORGANISM: Artificial Sequence
<220> FEATURE:
<223> OTHER INFORMATION: Synthetic

<400> SEQUENCE: 1

Gln Val Gln Leu Val Gln Ser Gly Gly Gly Leu Ile Gln Pro Gly Gly
1               5                   10                  15

Ser Leu Arg Leu Ser Cys Ala Ala Ser Gly Phe Thr Val Ser Leu Ser
            20                  25                  30

His Met Asn Trp Val Arg Gln Ala Pro Gly Lys Gly Leu Glu Trp Val
        35                  40                  45

Ser Ile Thr Tyr Gly Asp Gly Asn Ser Asp Tyr Ala Asp Ser Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Ala
                85                  90                  95

Arg Glu Tyr Tyr Tyr Gly Met Asp Val Trp Gly Gln Gly Thr Thr Val
            100                 105                 110

Thr Val Ser Ser
            115

<210> SEQ ID NO 2
<211> LENGTH: 114
<212> TYPE: PRT
<213> ORGANISM: Artificial Sequence
<220> FEATURE:
<223> OTHER INFORMATION: Synthetic

<400> SEQUENCE: 2

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Val Leu Tyr Ser
            20                  25                  30

Ser Asn Asn Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Gln Gln
                85                  90                  95

Tyr Tyr Ser Leu Pro Leu Thr Phe Gly Gly Gly Thr Lys Leu Glu Ile
            100                 105                 110

Lys Arg

<210> SEQ ID NO 3
<211> LENGTH: 348
<212> TYPE: DNA
<213> ORGANISM: Artificial Sequence
<220> FEATURE:
<223> OTHER INFORMATION: Synthetic

<400> SEQUENCE: 3

```
caggttcagc tggtacagtc tggaggaggc ttgatccagc cggggggggtc cctgagactc    60 tcctgtgcag cctctgggtt caccgtcagt ctctcccaca tgaactgggt ccgccaggct   120
ccagggaagg gactggagtg ggtctcaatt acttatggcg atggtaactc agactatgca   180
gactccgtga agggccgatt caccatctcc agagacaatt ccaagaacac gctgtatctg   240
caaatgaaca gcctgagagc tgaggacacg gctgtgtatt actgtgcgag agaatactac   300
tacggtatgg acgtctgggg ccaagggacc acggtcaccg tctcctca                348
```

```
<210> SEQ ID NO 4
<211> LENGTH: 342
<212> TYPE: DNA
<213> ORGANISM: Artificial Sequence
<220> FEATURE:
<223> OTHER INFORMATION: Synthetic

<400> SEQUENCE: 4
```

```
gacatcgtga tgacccagtc tccagactcc ctggctgtgt ctctgggcga gagggccacc    60
atcaactgca gtccagccca gagtgtttta tacagctcca acaataagaa ctacttagct   120
tggtaccagc agaaaccagg acagcctcct aagctgctca tttactgggc atctacccgg   180
gaatccgggg tccctgaccg attcagtggc agcgggtctg ggacagattt cactctcacc   240
atcagcagcc tgcaggctga agatgtggca gtttattact gtcaacaata ttatagtctt   300
cctctcactt tcggcggagg gaccaagctg gagatcaaac gt                       342
```

```
<210> SEQ ID NO 5
<211> LENGTH: 5
<212> TYPE: PRT
<213> ORGANISM: Artificial Sequence
<220> FEATURE:
<223> OTHER INFORMATION: Synthetic

<400> SEQUENCE: 5

Leu Ser His Met Asn
1               5

<210> SEQ ID NO 6
<211> LENGTH: 16
<212> TYPE: PRT
<213> ORGANISM: Artificial Sequence
<220> FEATURE:
<223> OTHER INFORMATION: Synthetic

<400> SEQUENCE: 6

Ile Thr Tyr Gly Asp Gly Asn Ser Asp Tyr Ala Asp Ser Val Lys Gly
1               5                   10                  15

<210> SEQ ID NO 7
<211> LENGTH: 8
<212> TYPE: PRT
<213> ORGANISM: Artificial Sequence
<220> FEATURE:
<223> OTHER INFORMATION: Synthetic

<400> SEQUENCE: 7

Glu Tyr Tyr Tyr Gly Met Asp Val
1               5

<210> SEQ ID NO 8
<211> LENGTH: 17
<212> TYPE: PRT
<213> ORGANISM: Artificial Sequence
<220> FEATURE:
```

<223> OTHER INFORMATION: Synthetic

<400> SEQUENCE: 8

Lys Ser Ser Gln Ser Val Leu Tyr Ser Ser Asn Asn Lys Asn Tyr Leu
1               5                   10                  15
Ala

<210> SEQ ID NO 9
<211> LENGTH: 7
<212> TYPE: PRT
<213> ORGANISM: Artificial Sequence
<220> FEATURE:
<223> OTHER INFORMATION: Synthetic

<400> SEQUENCE: 9

Trp Ala Ser Thr Arg Glu Ser
1               5

<210> SEQ ID NO 10
<211> LENGTH: 9
<212> TYPE: PRT
<213> ORGANISM: Artificial Sequence
<220> FEATURE:
<223> OTHER INFORMATION: Synthetic

<400> SEQUENCE: 10

Gln Gln Tyr Tyr Ser Leu Pro Leu Thr
1               5

<210> SEQ ID NO 11
<211> LENGTH: 8
<212> TYPE: PRT
<213> ORGANISM: Artificial Sequence
<220> FEATURE:
<223> OTHER INFORMATION: Synthetic

<400> SEQUENCE: 11

Gly Phe Thr Val Ser Leu Ser His
1               5

<210> SEQ ID NO 12
<211> LENGTH: 7
<212> TYPE: PRT
<213> ORGANISM: Artificial Sequence
<220> FEATURE:
<223> OTHER INFORMATION: Synthetic

<400> SEQUENCE: 12

Thr Tyr Gly Asp Gly Asn Ser
1               5

<210> SEQ ID NO 13
<211> LENGTH: 10
<212> TYPE: PRT
<213> ORGANISM: Artificial Sequence
<220> FEATURE:
<223> OTHER INFORMATION: Synthetic

<400> SEQUENCE: 13

Ala Arg Glu Tyr Tyr Tyr Gly Met Asp Val
1               5                   10

<210> SEQ ID NO 14
<211> LENGTH: 12
<212> TYPE: PRT
<213> ORGANISM: Artificial Sequence

```
<220> FEATURE:
<223> OTHER INFORMATION: Synthetic

<400> SEQUENCE: 14

Gln Ser Val Leu Tyr Ser Ser Asn Asn Lys Asn Tyr
1               5                   10

<210> SEQ ID NO 15
<211> LENGTH: 4
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (4)..(4)
<223> OTHER INFORMATION: X is any amino acid or not present

<400> SEQUENCE: 15

Trp Ala Ser Xaa
1

<210> SEQ ID NO 16
<211> LENGTH: 9
<212> TYPE: PRT
<213> ORGANISM: Artificial Sequence
<220> FEATURE:
<223> OTHER INFORMATION: Synthetic

<400> SEQUENCE: 16

Gln Gln Tyr Tyr Ser Leu Pro Leu Thr
1               5

<210> SEQ ID NO 17
<211> LENGTH: 247
<212> TYPE: PRT
<213> ORGANISM: Artificial Sequence
<220> FEATURE:
<223> OTHER INFORMATION: Synthetic

<400> SEQUENCE: 17

Met Ala Gln Val Gln Leu Val Gln Ser Gly Gly Gly Leu Ile Gln Pro
1               5                   10                  15

Gly Gly Ser Leu Arg Leu Ser Cys Ala Ala Ser Gly Phe Thr Val Ser
            20                  25                  30

Leu Ser His Met Asn Trp Val Arg Gln Ala Pro Gly Lys Gly Leu Glu
        35                  40                  45

Trp Val Ser Ile Thr Tyr Gly Asp Gly Asn Ser Asp Tyr Ala Asp Ser
    50                  55                  60

Val Lys Gly Arg Phe Thr Ile Ser Arg Asp Asn Ser Lys Asn Thr Leu
65                  70                  75                  80

Tyr Leu Gln Met Asn Ser Leu Arg Ala Glu Asp Thr Ala Val Tyr Tyr
                85                  90                  95

Cys Ala Arg Glu Tyr Tyr Gly Met Asp Val Trp Gly Gln Gly Thr Thr
            100                 105                 110

Thr Val Thr Val Ser Ser Gly Gly Gly Gly Ser Gly Gly Gly Gly Ser
        115                 120                 125

Gly Gly Gly Gly Ser Asp Ile Val Met Thr Gln Ser Pro Asp Ser Leu
    130                 135                 140

Ala Val Ser Leu Gly Glu Arg Ala Thr Ile Asn Cys Lys Ser Ser Gln
145                 150                 155                 160

Ser Val Leu Tyr Ser Ser Asn Asn Lys Asn Tyr Leu Ala Trp Tyr Gln
```

165                 170                 175
Gln Lys Pro Gly Gln Pro Pro Lys Leu Leu Ile Tyr Trp Ala Ser Thr
                180                 185                 190

Arg Glu Ser Gly Val Pro Asp Arg Phe Ser Gly Ser Gly Ser Gly Thr
            195                 200                 205

Asp Phe Thr Leu Thr Ile Ser Ser Leu Gln Ala Glu Asp Val Ala Val
        210                 215                 220

Tyr Tyr Cys Gln Gln Tyr Tyr Ser Leu Pro Leu Thr Phe Gly Gly Gly
225                 230                 235                 240

Thr Lys Leu Glu Ile Lys Arg
                245

<210> SEQ ID NO 18
<211> LENGTH: 741
<212> TYPE: DNA
<213> ORGANISM: Artificial Sequence
<220> FEATURE:
<223> OTHER INFORMATION: Synthetic

<400> SEQUENCE: 18
atggcacagg ttcagctggt acagtctgga ggaggcttga tccagccggg ggggtccctg      60
agactctcct gtgcagcctc tgggttcacc gtcagtctct cccacatgaa ctgggtccgc    120
caggctccag gaagggact ggagtgggtc tcaattactt atggcgatgg taactcagac     180
tatgcagact ccgtgaaggg ccgattcacc atctccagag acaattccaa gaacacgctg    240
tatctgcaaa tgaacagcct gagagctgag gacacggctg tgtattactg tgcgagagaa    300
tactactacg gtatggacgt ctggggccaa gggaccacgg tcaccgtctc ctcaggcggc    360
ggcggctctg gcggaggtgg cagcggcggt ggcggatccg acatcgtgat gacccagtct    420
ccagactccc tggctgtgtc tctgggcgag agggccacca tcaactgcaa gtccagccag    480
agtgttttat acagtccaa caataagaac tacttagctt ggtaccagca gaaaccagga    540
cagcctccta agctgctcat ttactgggca tctacccggg aatccggggt ccctgaccga    600
ttcagtggca gcgggtctgg gacagatttc actctcacca tcagcagcct gcaggctgaa    660
gatgtggcag tttattactg tcaacaatat tatagtcttc ctctcacttt cggcggaggg    720
accaagctgg agatcaaacg t                                              741

<210> SEQ ID NO 19
<211> LENGTH: 261
<212> TYPE: PRT
<213> ORGANISM: Artificial Sequence
<220> FEATURE:
<223> OTHER INFORMATION: Synthetic

<400> SEQUENCE: 19

Gln Val Gln Leu Val Gln Ser Gly Gly Gly Leu Ile Gln Pro Gly Gly
1               5                   10                  15

Ser Leu Arg Leu Ser Cys Ala Ala Ser Gly Phe Thr Val Ser Leu Ser
            20                  25                  30

His Met Asn Trp Val Arg Gln Ala Pro Gly Lys Gly Leu Glu Trp Val
        35                  40                  45

Ser Ile Thr Tyr Gly Asp Gly Asn Ser Asp Tyr Ala Asp Ser Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Ala

```
                85                  90                  95
Arg Glu Tyr Tyr Tyr Gly Met Asp Val Trp Gly Gln Gly Thr Thr Val
            100                 105                 110
Thr Val Ser Ser Ala Ser Thr Lys Gly Pro Ser Val Phe Pro Leu Ala
            115                 120                 125
Pro Ser Ser Lys Ser Thr Ser Gly Gly Thr Ala Ala Leu Gly Cys Leu
        130                 135                 140
Val Lys Asp Tyr Phe Pro Glu Pro Val Thr Val Ser Trp Asn Ser Gly
145                 150                 155                 160
Ala Leu Thr Ser Gly Val His Thr Phe Pro Ala Val Leu Gln Ser Ser
                165                 170                 175
Gly Leu Tyr Ser Leu Ser Ser Val Val Thr Val Pro Ser Ser Ser Leu
            180                 185                 190
Gly Thr Gln Thr Tyr Ile Cys Asn Val Asn His Lys Pro Ser Asn Thr
        195                 200                 205
Lys Val Asp Lys Lys Val Glu Pro Pro Lys Ser Gly Gly Gly Gly Ser
    210                 215                 220
Pro Gly Ser Gly Tyr Ile Pro Glu Ala Pro Arg Asp Gly Gln Ala Tyr
225                 230                 235                 240
Val Arg Lys Asp Gly Glu Trp Val Leu Leu Ser Thr Phe Leu Gly His
                245                 250                 255
His His His His
        260

<210> SEQ ID NO 20
<211> LENGTH: 783
<212> TYPE: DNA
<213> ORGANISM: Artificial Sequence
<220> FEATURE:
<223> OTHER INFORMATION: Synthetic

<400> SEQUENCE: 20
caggttcagc tggtacagtc tggaggaggc ttgatccagc cggggggggtc cctgagactc     60 tcctgtgcag cctctgggtt caccgtcagt ctctcccaca tgaactgggt ccgccaggct    120
ccagggaagg gactggagtg gtctcaatt acttatggcg atggtaactc agactatgca    180
gactccgtga agggccgatt caccatctcc agagacaatt ccaagaacac gctgtatctg    240
caaatgaaca gcctgagagc tgaggacacg gctgtgtatt actgtgcgag agaatactac    300
tacggtatgg acgtctgggg ccaagggacc acggtcaccg tctcctcagc ctccaccaag    360
ggcccatcgg tcttccccct ggcacccctcc tccaagagca cctctggggg cacagcggcc    420
ctgggctgcc tggtcaagga ctacttcccc gaaccggtga cggtgtcgtg aactcaggc    480 gccctgacca gcggcgtgca caccttcccg gctgtcctac agtcctcagg actctactcc    540
ctcagcagcg tggtgactgt gccctctagc agcttgggca cccagaccta catctgcaac    600
gtgaatcaca gcccagcaa caccaaggtg gacaagaaag ttgagccccc gaaatctggc    660
ggtggcggat ccccaggatc aggttatatt cctgaagctc caagagatgg gcaagcttac    720
gttcgtaaag atggcgaatg ggtattactt tctaccttt taggacatca tcatcatcat    780
cac                                                                  783

<210> SEQ ID NO 21
<211> LENGTH: 271
<212> TYPE: PRT
<213> ORGANISM: Artificial Sequence
<220> FEATURE:
```

<223> OTHER INFORMATION: Synthetic

<400> SEQUENCE: 21

```
Gln Val Gln Leu Val Gln Ser Gly Gly Gly Leu Ile Gln Pro Gly Gly
1               5                   10                  15

Ser Leu Arg Leu Ser Cys Ala Ala Ser Gly Phe Thr Val Ser Leu Ser
            20                  25                  30

His Met Asn Trp Val Arg Gln Ala Pro Gly Lys Gly Leu Glu Trp Val
        35                  40                  45

Ser Ile Thr Tyr Gly Asp Gly Asn Ser Asp Tyr Ala Asp Ser Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Ala
                85                  90                  95

Arg Glu Tyr Tyr Tyr Gly Met Asp Val Trp Gly Gln Gly Thr Thr Val
            100                 105                 110

Thr Val Ser Ser Ala Ser Thr Lys Gly Pro Ser Val Phe Pro Leu Ala
        115                 120                 125

Pro Ser Ser Lys Ser Thr Ser Gly Gly Thr Ala Ala Leu Gly Cys Leu
    130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Gln Thr Tyr Ile Cys Asn Val Asn His Lys Pro Ser Asn Thr
        195                 200                 205

Lys Val Asp Lys Lys Val Glu Pro Pro Lys Ser Gly Gly Gly Gly Ser
    210                 215                 220

Gly Gly Gly Gly Ser Gly Gly Gly Ser Pro Gly Ser Gly Tyr Ile
225                 230                 235                 240

Pro Glu Ala Pro Arg Asp Gly Gln Ala Tyr Val Arg Lys Asp Gly Glu
                245                 250                 255

Trp Val Leu Leu Ser Thr Phe Leu Gly His His His His His His
            260                 265                 270
```

<210> SEQ ID NO 22
<211> LENGTH: 813
<212> TYPE: DNA
<213> ORGANISM: Artificial Sequence
<220> FEATURE:
<223> OTHER INFORMATION: Synthetic

<400> SEQUENCE: 22

```
caggttcagc tggtacagtc tggaggaggc ttgatccagc cggggggtc cctgagactc      60 tcctgtgcag cctctgggtt caccgtcagt ctctcccaca tgaactgggt ccgccaggct    120
ccagggaagg gactggagtg ggtctcaatt acttatggcg atggtaactc agactatgca    180
gactccgtga agggccgatt caccatctcc agagacaatt ccaagaacac gctgtatctg    240
caaatgaaca gcctgagagc tgaggacacg gctgtgtatt actgtgcgag agaatactac    300
tacggtatgg acgtctgggg ccaagggacc acggtcaccg tctcctcagc tccaccaag    360 ggcccatcgg tcttccccct ggcacccctcc tccaagagca cctctggggg cacagcggcc    420
```

```
ctgggctgcc tggtcaagga ctacttcccc gaaccggtga cggtgtcgtg gaactcaggc    480
gccctgacca gcggcgtgca caccttcccg gctgtcctac agtcctcagg actctactcc    540
ctcagcagcg tggtgactgt gccctctagc agcttgggca cccagaccta catctgcaac    600
gtgaatcaca gcccagcaa caccaaggtg gacaagaaag ttgagccccc gaaatctggt     660
ggaggaggtt ctggaggcgg tggaagtggt ggcggaggta gcccaggatc aggttatatt    720
cctgaagctc aagagatgg gcaagcttac gttcgtaaag atggcgaatg gtattactt      780 tctacctttt taggacatca tcatcatcat cac                                  813
```

```
<210> SEQ ID NO 23
<211> LENGTH: 135
<212> TYPE: PRT
<213> ORGANISM: Artificial Sequence
<220> FEATURE:
<223> OTHER INFORMATION: Synthetic

<400> SEQUENCE: 23

Gln Val Gln Leu Gln Glu Ser Gly Gly Gly Val Val Gln Pro Gly Arg
1               5                   10                  15

Ser Leu Arg Leu Ser Cys Glu Val Ser Gly Phe Thr Phe Ser Asp Tyr
            20                  25                  30

Gly Met His Trp Val Arg Gln Ala Pro Gly Lys Gly Leu Glu Trp Val
        35                  40                  45

Ala Val Ile Trp Ser Glu Gly Ser Thr Glu Tyr Tyr Ala Asp Ser Val
    50                  55                  60

Lys Gly Arg Phe Thr Ile Ser Arg Asp Asn Ser Lys Asp Thr Leu Tyr
65                  70                  75                  80

Leu Gln Met Asn Ser Leu Arg Ala Glu Asp Thr Ala Val Tyr Tyr Cys
                85                  90                  95

Ala Arg Pro Gly Tyr Pro Thr Ser Thr Asp Arg Ser Pro Ala Ala Ala
            100                 105                 110

Gly Ala Arg Gln Tyr Tyr Tyr Tyr Gly Met Asp Val Trp Gly Gln Gly
        115                 120                 125

Thr Thr Val Thr Val Ser Ser
    130                 135

<210> SEQ ID NO 24
<211> LENGTH: 112
<212> TYPE: PRT
<213> ORGANISM: Artificial Sequence
<220> FEATURE:
<223> OTHER INFORMATION: Synthetic

<400> SEQUENCE: 24

Asn Phe Met Leu Thr Gln Pro His Ser Val Ser Glu Ser Pro Gly Lys
1               5                   10                  15

Thr Val Thr Ile Ser Cys Thr Arg Ser Gly Gly Ser Gly Ala Ala Asn
            20                  25                  30

Tyr Val Gln Trp Tyr Gln Gln Arg Pro Gly Ser Ser Pro Thr Thr Leu
        35                  40                  45

Ile Tyr Glu Asp Ser Arg Arg Pro Pro Gly Val Pro Asp Arg Phe Ser
    50                  55                  60

Gly Ser Val Asp Thr Ser Ser Asn Ser Ala Ser Leu Thr Ile Ser Gly
65                  70                  75                  80

Leu Gln Thr Glu Asp Glu Ala Asp Tyr Tyr Cys Gln Ser Tyr Asp Ser
                85                  90                  95
```

Ser Asn His Val Val Phe Gly Gly Gly Thr Lys Leu Thr Val Leu Gly
            100                 105                 110

<210> SEQ ID NO 25
<211> LENGTH: 405
<212> TYPE: DNA
<213> ORGANISM: Artificial Sequence
<220> FEATURE:
<223> OTHER INFORMATION: Synthetic

<400> SEQUENCE: 25
caggtgcagc tgcaggagtc cggggggaggc gtagtccagc ctggggaggtc cctgagactc      60 tcctgtgaag tgtctggatt cactttcagt gactatggca tgcactgggt ccgccaggct     120
ccaggcaagg ggctggagtg gtggcagtt atatggtctg aaggaagtac tgaatactac     180
gcagactccg tgaagggccg attcaccatc tctagagaca attccaagga cacgctttat     240
ctgcaaatga acagcctgag agccgaggac acggctgtct attactgtgc gagaccaggt     300
tatccaacat caaccgaccg ttcaccagca gcgctggtg caaggcaata ctactactac     360
ggtatggacg tctggggcca agggaccacg gtcaccgtct cctca                     405

<210> SEQ ID NO 26
<211> LENGTH: 336
<212> TYPE: DNA
<213> ORGANISM: Artificial Sequence
<220> FEATURE:
<223> OTHER INFORMATION: Synthetic

<400> SEQUENCE: 26
aattttatgc tgactcagcc ccactctgtg tcggagtctc cggggaagac cgttaccatc      60
tcctgcaccc gcagcggtgg cagcggggcc gccaactatg tacagtggta ccaacagcgc     120
ccgggcagtt ccccccaccac tctgatctat gaagatagtc gaagacccc tggggtccct     180 gatcggttct ctggctccgt cgacacgtcc tccaactctg cctccctcac catctctgga     240
ctgcagactg aagacgaggc tgactactac tgtcagtctt atgatagtag taatcacgtg     300
gtcttcggcg gagggaccaa gctgaccgtc ctaggt                                336

<210> SEQ ID NO 27
<211> LENGTH: 5
<212> TYPE: PRT
<213> ORGANISM: Artificial Sequence
<220> FEATURE:
<223> OTHER INFORMATION: Synthetic

<400> SEQUENCE: 27

Asp Tyr Gly Met His
1               5

<210> SEQ ID NO 28
<211> LENGTH: 17
<212> TYPE: PRT
<213> ORGANISM: Artificial Sequence
<220> FEATURE:
<223> OTHER INFORMATION: Synthetic

<400> SEQUENCE: 28

Val Ile Trp Ser Glu Gly Ser Thr Glu Tyr Tyr Ala Asp Ser Val Lys
1               5                   10                  15

Gly

<210> SEQ ID NO 29

```
<211> LENGTH: 26
<212> TYPE: PRT
<213> ORGANISM: Artificial Sequence
<220> FEATURE:
<223> OTHER INFORMATION: Synthetic

<400> SEQUENCE: 29

Pro Gly Tyr Pro Thr Ser Thr Asp Arg Ser Pro Ala Ala Ala Gly Ala
1               5                   10                  15
Arg Gln Tyr Tyr Tyr Tyr Gly Met Asp Val
            20                  25

<210> SEQ ID NO 30
<211> LENGTH: 13
<212> TYPE: PRT
<213> ORGANISM: Artificial Sequence
<220> FEATURE:
<223> OTHER INFORMATION: Synthetic

<400> SEQUENCE: 30

Thr Arg Ser Gly Gly Ser Gly Ala Ala Asn Tyr Val Gln
1               5                   10

<210> SEQ ID NO 31
<211> LENGTH: 7
<212> TYPE: PRT
<213> ORGANISM: Artificial Sequence
<220> FEATURE:
<223> OTHER INFORMATION: Synthetic

<400> SEQUENCE: 31

Glu Asp Ser Arg Arg Pro Pro
1               5

<210> SEQ ID NO 32
<211> LENGTH: 10
<212> TYPE: PRT
<213> ORGANISM: Artificial Sequence
<220> FEATURE:
<223> OTHER INFORMATION: Synthetic

<400> SEQUENCE: 32

Gln Ser Tyr Asp Ser Ser Asn His Val Val
1               5                   10

<210> SEQ ID NO 33
<211> LENGTH: 8
<212> TYPE: PRT
<213> ORGANISM: Artificial Sequence
<220> FEATURE:
<223> OTHER INFORMATION: Synthetic

<400> SEQUENCE: 33

Gly Phe Thr Phe Ser Asp Tyr Gly
1               5

<210> SEQ ID NO 34
<211> LENGTH: 8
<212> TYPE: PRT
<213> ORGANISM: Artificial Sequence
<220> FEATURE:
<223> OTHER INFORMATION: Synthetic

<400> SEQUENCE: 34

Ile Trp Ser Glu Gly Ser Thr Glu
1               5
```

```
<210> SEQ ID NO 35
<211> LENGTH: 28
<212> TYPE: PRT
<213> ORGANISM: Artificial Sequence
<220> FEATURE:
<223> OTHER INFORMATION: Synthetic

<400> SEQUENCE: 35

Ala Arg Pro Gly Tyr Pro Thr Ser Thr Asp Arg Ser Pro Ala Ala Ala
1               5                   10                  15

Gly Ala Arg Gln Tyr Tyr Tyr Gly Met Asp Val
            20                  25

<210> SEQ ID NO 36
<211> LENGTH: 8
<212> TYPE: PRT
<213> ORGANISM: Artificial Sequence
<220> FEATURE:
<223> OTHER INFORMATION: Synthetic

<400> SEQUENCE: 36

Gly Gly Ser Gly Ala Ala Asn Tyr
1               5

<210> SEQ ID NO 37
<211> LENGTH: 4
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (4)..(4)
<223> OTHER INFORMATION: X is any amino acid or not present

<400> SEQUENCE: 37

Glu Asp Ser Xaa
1

<210> SEQ ID NO 38
<211> LENGTH: 10
<212> TYPE: PRT
<213> ORGANISM: Artificial Sequence
<220> FEATURE:
<223> OTHER INFORMATION: Synthetic

<400> SEQUENCE: 38

Gln Ser Tyr Asp Ser Ser Asn His Val Val
1               5                   10

<210> SEQ ID NO 39
<211> LENGTH: 262
<212> TYPE: PRT
<213> ORGANISM: Artificial Sequence
<220> FEATURE:
<223> OTHER INFORMATION: Synthetic

<400> SEQUENCE: 39

Gln Val Gln Leu Gln Glu Ser Gly Gly Gly Val Val Gln Pro Gly Arg
1               5                   10                  15

Ser Leu Arg Leu Ser Cys Glu Val Ser Gly Phe Thr Phe Ser Asp Tyr
            20                  25                  30

Gly Met His Trp Val Arg Gln Ala Pro Gly Lys Gly Leu Glu Trp Val
        35                  40                  45

Ala Val Ile Trp Ser Glu Gly Ser Thr Glu Tyr Tyr Ala Asp Ser Val
```

```
             50                  55                  60
Lys Gly Arg Phe Thr Ile Ser Arg Asp Asn Ser Lys Asp Thr Leu Tyr
 65                  70                  75                  80

Leu Gln Met Asn Ser Leu Arg Ala Glu Asp Thr Ala Val Tyr Tyr Cys
                 85                  90                  95

Ala Arg Pro Gly Tyr Pro Thr Ser Thr Asp Arg Ser Pro Ala Ala
            100                 105                 110

Gly Ala Arg Gln Tyr Tyr Tyr Gly Met Asp Val Trp Gly Gln Gly
            115                 120                 125

Thr Thr Val Thr Val Ser Ser Gly Gly Gly Ser Gly Gly Gly Gly
            130                 135                 140

Ser Gly Gly Gly Gly Ser Asn Phe Met Leu Thr Gln Pro His Ser Val
145                 150                 155                 160

Ser Glu Ser Pro Gly Lys Thr Val Thr Ile Ser Cys Thr Arg Ser Gly
                165                 170                 175

Gly Ser Gly Ala Ala Asn Tyr Val Gln Trp Tyr Gln Gln Arg Pro Gly
            180                 185                 190

Ser Ser Pro Thr Thr Leu Ile Tyr Glu Asp Ser Arg Arg Pro Pro Gly
            195                 200                 205

Val Pro Asp Arg Phe Ser Gly Ser Val Asp Thr Ser Ser Asn Ser Ala
            210                 215                 220

Ser Leu Thr Ile Ser Gly Leu Gln Thr Glu Asp Glu Ala Asp Tyr Tyr
225                 230                 235                 240

Cys Gln Ser Tyr Asp Ser Ser Asn His Val Val Phe Gly Gly Gly Thr
                245                 250                 255

Lys Leu Thr Val Leu Gly
            260

<210> SEQ ID NO 40
<211> LENGTH: 786
<212> TYPE: DNA
<213> ORGANISM: Artificial Sequence
<220> FEATURE:
<223> OTHER INFORMATION: Synthetic

<400> SEQUENCE: 40
caggtgcagc tgcaggagtc cggggggaggc gtagtccagc ctgggaggtc cctgagactc        60
tcctgtgaag tgtctggatt cactttcagt gactatggca tgcactgggt ccgccaggct       120
ccaggcaagg gctggagtg gtggcagtt atatggtctg aaggaagtac tgaatactac        180
gcagactccg tgaagggccg attcaccatc tctagagaca attccaagga cacgctttat       240
ctgcaaatga acagcctgag agccgaggac acggctgtct attactgtgc gagaccaggt       300
tatccaacat caaccgaccg ttcaccagca gcagctggtg caaggcaata ctactactac       360
ggtatggacg tctggggcca agggaccacg gtcaccgtct cctcaggcgg cggcggctct       420
ggcggaggtg cagcggcgg tggcggatcc aatttatgc tgactcagcc ccactctgtg       480
tcggagtctc cggggaagac cgttaccatc tcctgcaccc gcagcggtgg cagcggggcc       540
gccaactatg tacagtggta ccaacagcgc ccgggcagtt cccccaccac tctgatctat       600
gaagatagtc gaagaccccc tggggtccct gatcggttct ctggctccgt cgacacgtcc       660
tccaactctg cctccctcac catctctgga ctgcagactg aagacgaggc tgactactac       720
tgtcagtctt atgatagtag taatcacgtg gtcttcggcg gagggaccaa gctgaccgtc       780
ctaggt                                                                  786
```

<210> SEQ ID NO 41
<211> LENGTH: 280
<212> TYPE: PRT
<213> ORGANISM: Artificial Sequence
<220> FEATURE:
<223> OTHER INFORMATION: Synthetic

<400> SEQUENCE: 41

```
Gln Val Gln Leu Gln Glu Ser Gly Gly Gly Val Val Gln Pro Gly Arg
1               5                   10                  15

Ser Leu Arg Leu Ser Cys Glu Val Ser Gly Phe Thr Phe Ser Asp Tyr
            20                  25                  30

Gly Met His Trp Val Arg Gln Ala Pro Gly Lys Gly Leu Glu Trp Val
        35                  40                  45

Ala Val Ile Trp Ser Glu Gly Ser Thr Glu Tyr Tyr Ala Asp Ser Val
    50                  55                  60

Lys Gly Arg Phe Thr Ile Ser Arg Asp Asn Ser Lys Asp Thr Leu Tyr
65                  70                  75                  80

Leu Gln Met Asn Ser Leu Arg Ala Glu Asp Thr Ala Val Tyr Tyr Cys
                85                  90                  95

Ala Arg Pro Gly Tyr Pro Thr Thr Asp Arg Ser Pro Ala Ala Ala
            100                 105                 110

Gly Ala Arg Gln Tyr Tyr Tyr Tyr Gly Met Asp Val Trp Gly Gln Gly
        115                 120                 125

Thr Thr Val Thr Val Ser Ser Ala Ser Thr Lys Gly Pro Ser Val Phe
130                 135                 140

Pro Leu Ala Pro Ser Ser Lys Ser Thr Ser Gly Gly Thr Ala Ala Leu
145                 150                 155                 160

Gly Cys Leu Val Lys Asp Tyr Phe Pro Glu Pro Val Thr Val Ser Trp
                165                 170                 175

Asn Ser Gly Ala Leu Thr Ser Gly Val His Thr Phe Pro Ala Val Leu
            180                 185                 190

Gln Ser Ser Gly Leu Tyr Ser Leu Ser Ser Val Val Thr Val Pro Ser
        195                 200                 205

Ser Ser Leu Gly Thr Gln Thr Tyr Ile Cys Asn Val Asn His Lys Pro
    210                 215                 220

Ser Asn Thr Lys Val Asp Lys Lys Val Glu Pro Lys Ser Gly Gly
225                 230                 235                 240

Gly Gly Ser Pro Gly Ser Gly Tyr Ile Pro Glu Ala Pro Arg Asp Gly
                245                 250                 255

Gln Ala Tyr Val Arg Lys Asp Gly Glu Trp Val Leu Leu Ser Thr Phe
            260                 265                 270

Leu Gly His His His His His His
        275                 280
```

<210> SEQ ID NO 42
<211> LENGTH: 840
<212> TYPE: DNA
<213> ORGANISM: Artificial Sequence
<220> FEATURE:
<223> OTHER INFORMATION: Synthetic

<400> SEQUENCE: 42

```
caggtgcagc tgcaggagtc cggggggaggc gtagtccagc ctgggaggtc cctgagactc      60
tcctgtgaag tgtctggatt cactttcagt gactatggca tgcactgggt ccgccaggct     120
ccaggcaagg ggctggagtg ggtggcagtt atatggtctg aaggaagtac tgaatactac     180
```

-continued

```
gcagactccg tgaagggccg attcaccatc tctagagaca attccaagga cacgctttat    240
ctgcaaatga acagcctgag agccgaggac acggctgtct attactgtgc gagaccaggt    300
tatccaacat caaccgaccg ttcaccagca gcagctggtg caaggcaata ctactactac    360
ggtatggacg tctggggcca agggaccacg gtcaccgtct cctcagcctc caccaagggc    420
ccatcggtct tccccctggc acctcctcc aagagcacct ctgggggcac agcggccctg    480
ggctgcctgg tcaaggacta cttccccgaa ccggtgacgg tgtcgtggaa ctcaggcgcc    540
ctgaccagcg gcgtgcacac cttccggct gtcctacagt cctcaggact ctactccctc    600
agcagcgtgg tgactgtgcc ctctagcagc ttgggcaccc agacctacat ctgcaacgtg    660
aatcacaagc ccagcaacac caaggtggac aagaaagttg agcccccgaa atctggcggt    720
ggcggatccc caggatcagg ttatattcct gaagctccaa gagatgggca agcttacgtt    780
cgtaaagatg gcgaatgggt attactttct acctttttag gacatcatca tcatcatcac    840
```

<210> SEQ ID NO 43
<211> LENGTH: 290
<212> TYPE: PRT
<213> ORGANISM: Artificial Sequence
<220> FEATURE:
<223> OTHER INFORMATION: Synthetic

<400> SEQUENCE: 43

```
Gln Val Gln Leu Gln Glu Ser Gly Gly Gly Val Val Gln Pro Gly Arg
1               5                   10                  15

Ser Leu Arg Leu Ser Cys Glu Val Ser Gly Phe Thr Phe Ser Asp Tyr
            20                  25                  30

Gly Met His Trp Val Arg Gln Ala Pro Gly Lys Gly Leu Glu Trp Val
        35                  40                  45

Ala Val Ile Trp Ser Glu Gly Ser Thr Glu Tyr Tyr Ala Asp Ser Val
    50                  55                  60

Lys Gly Arg Phe Thr Ile Ser Arg Asp Asn Ser Lys Asp Thr Leu Tyr
65                  70                  75                  80

Leu Gln Met Asn Ser Leu Arg Ala Glu Asp Thr Ala Val Tyr Tyr Cys
                85                  90                  95

Ala Arg Pro Gly Tyr Pro Thr Ser Thr Asp Arg Ser Pro Ala Ala Ala
            100                 105                 110

Gly Ala Arg Gln Tyr Tyr Tyr Tyr Gly Met Asp Val Trp Gly Gln Gly
        115                 120                 125

Thr Thr Val Thr Val Ser Ser Ala Ser Thr Lys Gly Pro Ser Val Phe
    130                 135                 140

Pro Leu Ala Pro Ser Ser Lys Ser Thr Ser Gly Gly Thr Ala Ala Leu
145                 150                 155                 160

Gly Cys Leu Val Lys Asp Tyr Phe Pro Glu Pro Val Thr Val Ser Trp
                165                 170                 175

Asn Ser Gly Ala Leu Thr Ser Gly Val His Thr Phe Pro Ala Val Leu
            180                 185                 190

Gln Ser Ser Gly Leu Tyr Ser Leu Ser Val Val Thr Val Pro Ser
        195                 200                 205

Ser Ser Leu Gly Thr Gln Thr Tyr Ile Cys Asn Val Asn His Lys Pro
    210                 215                 220

Ser Asn Thr Lys Val Asp Lys Lys Val Glu Pro Pro Lys Ser Gly Gly
225                 230                 235                 240

Gly Gly Ser Gly Gly Gly Gly Ser Gly Gly Gly Gly Ser Pro Gly Ser
```

```
                        245                 250                 255
Gly Tyr Ile Pro Glu Ala Pro Arg Asp Gly Gln Ala Tyr Val Arg Lys
                260                 265                 270

Asp Gly Glu Trp Val Leu Leu Ser Thr Phe Leu Gly His His His His
            275                 280                 285

His His
    290

<210> SEQ ID NO 44
<211> LENGTH: 870
<212> TYPE: DNA
<213> ORGANISM: Artificial Sequence
<220> FEATURE:
<223> OTHER INFORMATION: Synthetic

<400> SEQUENCE: 44
caggtgcagc tgcaggagtc cggggggaggc gtagtccagc ctggagggtc cctgagactc      60
tcctgtgaag tgtctggatt cactttcagt gactatggca tgcactgggt ccgccaggct     120
ccaggcaagg ggctggagtg ggtggcagtt atatggtctg aaggaagtac tgaatactac     180
gcagactccg tgaagggccg attcaccatc tctagagaca attccaagga cacgctttat     240
ctgcaaatga acagcctgag agccgaggac acggctgtct attactgtgc gagaccaggt     300
tatccaacat caaccgaccg ttcaccagca gcagctggtg caaggcaata ctactactac     360
ggtatggacg tctggggcca agggaccacg gtcaccgtct cctcagcctc caccaagggc     420
ccatcggtct tccccctggc accctcctcc aagagcacct ctgggggcac agcggccctg     480
ggctgcctgg tcaaggacta cttccccgaa ccggtgacgg tgtcgtggaa ctcaggcgcc     540
ctgaccagcg gcgtgcacac cttcccggct gtcctacagt cctcaggact ctactccctc     600
agcagcgtgg tgactgtgcc ctctagcagc ttgggcaccc agacctacat ctgcaacgtg     660
aatcacaagc ccagcaacac caaggtggac aagaaagttg agcccccgaa atctggtgga     720
ggaggttctg gaggcggtgg aagtggtggc ggaggtagcc aggatcagg ttatattcct      780 gaagctccaa gagatgggca agcttacgtt cgtaaagatg gcgaatgggt attactttct     840
acctttttag gacatcatca tcatcatcac                                      870

<210> SEQ ID NO 45
<211> LENGTH: 120
<212> TYPE: PRT
<213> ORGANISM: Artificial Sequence
<220> FEATURE:
<223> OTHER INFORMATION: Synthetic

<400> SEQUENCE: 45

Gln Val Thr Leu Arg Glu Ser Gly Pro Gly Leu Val Lys Pro Ser Glu
1               5                   10                  15

Thr Leu Ser Leu Thr Cys Ala Val Ser Gly Gly Ser Leu Ser Ser Val
            20                  25                  30

Asn Tyr Tyr Trp Ser Trp Ile Arg Gln His Pro Gly Lys Gly Leu Glu
        35                  40                  45

Trp Ile Gly Tyr Ile Tyr Tyr Ser Gly Ser Thr Asn Tyr Asn Pro Ser
    50                  55                  60

Leu Lys Ser Arg Val Thr Met Ser Leu Asp Thr Ser Lys Asn Gln Phe
65                  70                  75                  80

Ser Leu Lys Leu Ser Ser Val Thr Ala Ala Asp Thr Ala Val Tyr Tyr
                85                  90                  95
```

Cys Ala Thr Pro Gly Ala Ile Met Gly Ala Leu His Ile Trp Gly Gln
                100                 105                 110

Gly Thr Leu Val Thr Val Ser Ser
        115                 120

<210> SEQ ID NO 46
<211> LENGTH: 111
<212> TYPE: PRT
<213> ORGANISM: Artificial Sequence
<220> FEATURE:
<223> OTHER INFORMATION: Synthetic

<400> SEQUENCE: 46

Gln Ala Val Leu Thr Gln Pro Ser Ser Ala Ser Ser Thr Pro Gly Gln
1               5                   10                  15

Arg Val Ile Ile Ser Cys Ser Gly Ser Ser Ser Asn Ile Gly Ser Asn
            20                  25                  30

Thr Val Ser Trp Tyr Gln Gln Val Pro Gly Ala Ala Pro Lys Leu Leu
        35                  40                  45

Ile Tyr Phe Asp Tyr Arg Arg Pro Ser Gly Val Pro Asp Arg Phe Ser
    50                  55                  60

Gly Thr Arg Ser Gly Thr Ser Ala Ser Leu Gly Ile Ser Gly Leu Gln
65                  70                  75                  80

Ser Glu Asp Glu Ala Asp Tyr Tyr Cys Ala Ala Trp Asp Asp Ser Leu
                85                  90                  95

Ser Ala Trp Val Phe Gly Arg Gly Thr Lys Leu Thr Val Leu Gly
            100                 105                 110

<210> SEQ ID NO 47
<211> LENGTH: 360
<212> TYPE: DNA
<213> ORGANISM: Artificial Sequence
<220> FEATURE:
<223> OTHER INFORMATION: Synthetic

<400> SEQUENCE: 47
caggtcacct tgagggagtc tggtccagga ctggtgaagc cttcggagac cctgtccctc      60
acctgcgctg tctctggtgg ctctctcagc agtgttaatt actactggag ctggatccgc     120
cagcacccag ggaagggcct ggagtggatt gggtacatct attacagtgg gagtaccaac     180
tacaacccgt ccctcaagag tcgagtcacc atgtcactgg acacgtccaa gaaccagttc     240
tccctgaaac tgagctctgt gactgccgcg gacacggccg tctattactg tgcgaccccc     300
ggagctatta tgggtgctct tcatatctgg ggccaaggca ccctggtcac cgtctcctca     360

<210> SEQ ID NO 48
<211> LENGTH: 333
<212> TYPE: DNA
<213> ORGANISM: Artificial Sequence
<220> FEATURE:
<223> OTHER INFORMATION: Synthetic

<400> SEQUENCE: 48
caggctgtgc tcactcagcc gtcctcggcg tcctcgaccc ccgggcagag ggtcatcatc      60
tcttgttctg ggagcagctc caatatcggg agtaacactg tcagctggta ccagcaggtc     120
ccaggagcgg cccccaaact cctcatctac tttgattatc gacgtccctc agggtccct      180 gaccgcttct ctggcaccag gtctggcacc tctgcctccc tgggcatcag tgggctccag     240
tctgaggatg aggctgatta ttactgtgcc gcatgggatg acagcctgag tgcttgggtg     300
ttcggcagag ggaccaagct gaccgtccta ggt                          333

<210> SEQ ID NO 49
<211> LENGTH: 7
<212> TYPE: PRT
<213> ORGANISM: Artificial Sequence
<220> FEATURE:
<223> OTHER INFORMATION: Synthetic

<400> SEQUENCE: 49

Ser Val Asn Tyr Tyr Trp Ser
1               5

<210> SEQ ID NO 50
<211> LENGTH: 16
<212> TYPE: PRT
<213> ORGANISM: Artificial Sequence
<220> FEATURE:
<223> OTHER INFORMATION: Synthetic

<400> SEQUENCE: 50

Tyr Ile Tyr Tyr Ser Gly Ser Thr Asn Tyr Asn Pro Ser Leu Lys Ser
1               5                   10                  15

<210> SEQ ID NO 51
<211> LENGTH: 10
<212> TYPE: PRT
<213> ORGANISM: Artificial Sequence
<220> FEATURE:
<223> OTHER INFORMATION: Synthetic

<400> SEQUENCE: 51

Pro Gly Ala Ile Met Gly Ala Leu His Ile
1               5                   10

<210> SEQ ID NO 52
<211> LENGTH: 13
<212> TYPE: PRT
<213> ORGANISM: Artificial Sequence
<220> FEATURE:
<223> OTHER INFORMATION: Synthetic

<400> SEQUENCE: 52

Ser Gly Ser Ser Ser Asn Ile Gly Ser Asn Thr Val Ser
1               5                   10

<210> SEQ ID NO 53
<211> LENGTH: 7
<212> TYPE: PRT
<213> ORGANISM: Artificial Sequence
<220> FEATURE:
<223> OTHER INFORMATION: Synthetic

<400> SEQUENCE: 53

Phe Asp Tyr Arg Arg Pro Ser
1               5

<210> SEQ ID NO 54
<211> LENGTH: 11
<212> TYPE: PRT
<213> ORGANISM: Artificial Sequence
<220> FEATURE:
<223> OTHER INFORMATION: Synthetic

<400> SEQUENCE: 54

Ala Ala Trp Asp Asp Ser Leu Ser Ala Trp Val
1               5                   10

```
<210> SEQ ID NO 55
<211> LENGTH: 10
<212> TYPE: PRT
<213> ORGANISM: Artificial Sequence
<220> FEATURE:
<223> OTHER INFORMATION: Synthetic

<400> SEQUENCE: 55

Gly Gly Ser Leu Ser Ser Val Asn Tyr Tyr
1               5                   10

<210> SEQ ID NO 56
<211> LENGTH: 7
<212> TYPE: PRT
<213> ORGANISM: Artificial Sequence
<220> FEATURE:
<223> OTHER INFORMATION: Synthetic

<400> SEQUENCE: 56

Ile Tyr Tyr Ser Gly Ser Thr
1               5

<210> SEQ ID NO 57
<211> LENGTH: 12
<212> TYPE: PRT
<213> ORGANISM: Artificial Sequence
<220> FEATURE:
<223> OTHER INFORMATION: Synthetic

<400> SEQUENCE: 57

Ala Thr Pro Gly Ala Ile Met Gly Ala Leu His Ile
1               5                   10

<210> SEQ ID NO 58
<211> LENGTH: 8
<212> TYPE: PRT
<213> ORGANISM: Artificial Sequence
<220> FEATURE:
<223> OTHER INFORMATION: Synthetic

<400> SEQUENCE: 58

Ser Ser Asn Ile Gly Ser Asn Thr
1               5

<210> SEQ ID NO 59
<211> LENGTH: 4
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (4)..(4)
<223> OTHER INFORMATION: X is any amino acid or not present

<400> SEQUENCE: 59

Phe Asp Tyr Xaa
1

<210> SEQ ID NO 60
<211> LENGTH: 11
<212> TYPE: PRT
<213> ORGANISM: Artificial Sequence
<220> FEATURE:
<223> OTHER INFORMATION: Synthetic

<400> SEQUENCE: 60
```

Ala Ala Trp Asp Asp Ser Leu Ser Ala Trp Val
1               5                   10

<210> SEQ ID NO 61
<211> LENGTH: 246
<212> TYPE: PRT
<213> ORGANISM: Artificial Sequence
<220> FEATURE:
<223> OTHER INFORMATION: Synthetic

<400> SEQUENCE: 61

Gln Val Thr Leu Arg Glu Ser Gly Pro Gly Leu Val Lys Pro Ser Glu
1               5                   10                  15

Thr Leu Ser Leu Thr Cys Ala Val Ser Gly Gly Ser Leu Ser Ser Val
            20                  25                  30

Asn Tyr Tyr Trp Ser Trp Ile Arg Gln His Pro Gly Lys Gly Leu Glu
        35                  40                  45

Trp Ile Gly Tyr Ile Tyr Tyr Ser Gly Ser Thr Asn Tyr Asn Pro Ser
    50                  55                  60

Leu Lys Ser Arg Val Thr Met Ser Leu Asp Thr Ser Lys Asn Gln Phe
65                  70                  75                  80

Ser Leu Lys Leu Ser Ser Val Thr Ala Ala Asp Thr Ala Val Tyr Tyr
                85                  90                  95

Cys Ala Thr Pro Gly Ala Ile Met Gly Ala Leu His Ile Trp Gly Gln
            100                 105                 110

Gly Thr Leu Val Thr Val Ser Ser Gly Gly Gly Gly Ser Gly Gly Gly
        115                 120                 125

Gly Ser Gly Gly Gly Ser Gln Ala Val Leu Thr Gln Pro Ser Ser
    130                 135                 140

Ala Ser Ser Thr Pro Gly Gln Arg Val Ile Ile Ser Cys Ser Gly Ser
145                 150                 155                 160

Ser Ser Asn Ile Gly Ser Asn Thr Val Ser Trp Tyr Gln Gln Val Pro
                165                 170                 175

Gly Ala Ala Pro Lys Leu Leu Ile Tyr Phe Asp Tyr Arg Arg Pro Ser
            180                 185                 190

Gly Val Pro Asp Arg Phe Ser Gly Thr Arg Ser Gly Thr Ser Ala Ser
        195                 200                 205

Leu Gly Ile Ser Gly Leu Gln Ser Glu Asp Glu Ala Asp Tyr Tyr Cys
    210                 215                 220

Ala Ala Trp Asp Asp Ser Leu Ser Ala Trp Val Phe Gly Arg Gly Thr
225                 230                 235                 240

Lys Leu Thr Val Leu Gly
                245

<210> SEQ ID NO 62
<211> LENGTH: 738
<212> TYPE: DNA
<213> ORGANISM: Artificial Sequence
<220> FEATURE:
<223> OTHER INFORMATION: Synthetic

<400> SEQUENCE: 62
caggtcacct tgagggagtc tggtccagga ctggtgaagc cttcggagac cctgtccctc     60
acctgcgctg tctctggtgg ctctctcagc agtgttaatt actactggag ctggatccgc    120
cagcacccag ggaagggcct ggagtggatt gggtacatct attacagtgg gagtaccaac    180
tacaacccgt ccctcaagag tcgagtcacc atgtcactgg acacgtccaa gaaccagttc    240

```
tccctgaaac tgagctctgt gactgccgcg gacacggccg tctattactg tgcgacccc     300 ggagctatta tgggtgctct tcatatctgg ggccaaggca ccctggtcac cgtctcctca    360
ggcggcggcg gctctggcgg aggtggcagc ggcggtggcg gatcccaggc tgtgctcact    420
cagccgtcct cggcgtcctc gacccccggg cagagggtca tcatctcttg ttctgggagc    480
agctccaata tcgggagtaa cactgtcagc tggtaccagc aggtcccagg agcggccccc    540
aaactcctca tctactttga ttatcgacgt ccctcagggg tccctgaccg cttctctggc    600
accaggtctg gcacctctgc ctccctgggc atcagtgggc tccagtctga ggatgaggct    660
gattattact gtgccgcatg ggatgacagc ctgagtgctt gggtgttcgg cagagggacc    720
aagctgaccg tcctaggt                                                  738
```

<210> SEQ ID NO 63
<211> LENGTH: 265
<212> TYPE: PRT
<213> ORGANISM: Artificial Sequence
<220> FEATURE:
<223> OTHER INFORMATION: Synthetic

<400> SEQUENCE: 63

```
Gln Val Thr Leu Arg Glu Ser Gly Pro Gly Leu Val Lys Pro Ser Glu
1               5                   10                  15

Thr Leu Ser Leu Thr Cys Ala Val Ser Gly Gly Ser Leu Ser Ser Val
            20                  25                  30

Asn Tyr Tyr Trp Ser Trp Ile Arg Gln His Pro Gly Lys Gly Leu Glu
        35                  40                  45

Trp Ile Gly Tyr Ile Tyr Tyr Ser Gly Ser Thr Asn Tyr Asn Pro Ser
    50                  55                  60

Leu Lys Ser Arg Val Thr Met Ser Leu Asp Thr Ser Lys Asn Gln Phe
65                  70                  75                  80

Ser Leu Lys Leu Ser Ser Val Thr Ala Ala Asp Thr Ala Val Tyr Tyr
                85                  90                  95

Cys Ala Thr Pro Gly Ala Ile Met Gly Ala Leu His Ile Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Pro Lys Ser Gly
    210                 215                 220

Gly Gly Gly Ser Pro Gly Ser Gly Tyr Ile Pro Glu Ala Pro Arg Asp
225                 230                 235                 240

Gly Gln Ala Tyr Val Arg Lys Asp Gly Glu Trp Val Leu Leu Ser Thr
                245                 250                 255

Phe Leu Gly His His His His His His
            260                 265
```

<210> SEQ ID NO 64
<211> LENGTH: 795
<212> TYPE: DNA
<213> ORGANISM: Artificial Sequence
<220> FEATURE:
<223> OTHER INFORMATION: Synthetic

<400> SEQUENCE: 64

```
caggtcacct tgagggagtc tggtccagga ctggtgaagc cttcggagac cctgtccctc     60
acctgcgctg tctctggtgg ctctctcagc agtgttaatt actactggag ctggatccgc    120
cagcacccag ggaagggcct ggagtggatt gggtacatct attacagtgg gagtaccaac    180
tacaacccgt ccctcaagag tcgagtcacc atgtcactgg acacgtccaa gaaccagttc    240
tccctgaaac tgagctctgt gactgccgcg gacacggccg tctattactg tgcgacccc     300
ggagctatta tgggtgctct tcatatctgg ggccaaggca ccctggtcac cgtctcctca    360
gcctccacca agggcccatc ggtcttcccc ctggcaccct cctccaagag cacctctggg    420
ggcacagcgg ccctgggctg cctggtcaag gactacttcc ccgaaccggt gacggtgtcg    480
tggaactcag gcgccctgac cagcggcgtg cacaccttcc cggctgtcct acagtcctca    540
ggactctact ccctcagcag cgtggtgact gtgccctcta gcagcttggg cacccagacc    600
tacatctgca acgtgaatca caagcccagc aacaccaagg tggacaagaa agttgagccc    660
ccgaaatctg gcggtggcgg atccccagga tcaggttata ttcctgaagc tccaagagat    720
gggcaagctt acgttcgtaa agatggcgaa tgggtattac tttctacctt tttaggacat    780
catcatcatc atcac                                                     795
```

<210> SEQ ID NO 65
<211> LENGTH: 275
<212> TYPE: PRT
<213> ORGANISM: Artificial Sequence
<220> FEATURE:
<223> OTHER INFORMATION: Synthetic

<400> SEQUENCE: 65

```
Gln Val Thr Leu Arg Glu Ser Gly Pro Gly Leu Val Lys Pro Ser Glu
1               5                   10                  15

Thr Leu Ser Leu Thr Cys Ala Val Ser Gly Gly Ser Leu Ser Ser Val
            20                  25                  30

Asn Tyr Tyr Trp Ser Trp Ile Arg Gln His Pro Gly Lys Gly Leu Glu
        35                  40                  45

Trp Ile Gly Tyr Ile Tyr Tyr Ser Gly Ser Thr Asn Tyr Asn Pro Ser
    50                  55                  60

Leu Lys Ser Arg Val Thr Met Ser Leu Asp Thr Ser Lys Asn Gln Phe
65                  70                  75                  80

Ser Leu Lys Leu Ser Ser Val Thr Ala Ala Asp Thr Ala Val Tyr Tyr
                85                  90                  95

Cys Ala Thr Pro Gly Ala Ile Met Gly Ala Leu His Ile Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160
```

Trp Asn Ser Gly Ala Leu Thr Ser Gly Val His Thr Phe Pro Ala Val
            165                 170                 175

Leu Gln Ser Ser Gly Leu Tyr Ser Leu Ser Ser Val Val Thr Val Pro
        180                 185                 190

Ser Ser Ser Leu Gly Thr Gln Thr Tyr Ile Cys Asn Val Asn His Lys
    195                 200                 205

Pro Ser Asn Thr Lys Val Asp Lys Lys Val Glu Pro Pro Lys Ser Gly
210                 215                 220

Gly Gly Gly Ser Gly Gly Gly Ser Gly Gly Gly Ser Pro Gly
225                 230                 235                 240

Ser Gly Tyr Ile Pro Glu Ala Pro Arg Asp Gly Gln Ala Tyr Val Arg
                245                 250                 255

Lys Asp Gly Glu Trp Val Leu Leu Ser Thr Phe Leu Gly His His His
            260                 265                 270

His His His
        275

<210> SEQ ID NO 66
<211> LENGTH: 825
<212> TYPE: DNA
<213> ORGANISM: Artificial Sequence
<220> FEATURE:
<223> OTHER INFORMATION: Synthetic

<400> SEQUENCE: 66
caggtcacct tgagggagtc tggtccagga ctggtgaagc cttcggagac cctgtccctc      60
acctgcgctg tctctggtgg ctctctcagc agtgttaatt actactggag ctggatccgc     120
cagcacccag ggaagggcct ggagtggatt gggtacatct attacagtgg gagtaccaac     180
tacaacccgt ccctcaagag tcgagtcacc atgtcactgg acacgtccaa gaaccagttc     240
tccctgaaac tgagctctgt gactgccgcg gacacggccg tctattactg cgacccccc     300 ggagctatta tgggtgctct tcatatctgg ggccaaggca ccctggtcac cgtctcctca     360
gcctccacca agggcccatc ggtcttcccc ctggcaccct cctccaagag cacctctggg     420
ggcacagcgg ccctgggctg cctggtcaag gactacttcc ccgaaccggt gacggtgtcg     480
tggaactcag gcgccctgac cagcggcgtg cacaccttcc cggctgtcct acagtcctca     540
ggactctact ccctcagcag cgtggtgact gtgccctcta gcagcttggg cacccagacc     600
tacatctgca acgtgaatca caagcccagc aacaccaagg tggacaagaa agttgagccc     660
ccgaaatctg gtgaggagg ttctggaggc ggtggaagtg gtggcggagg tagcccagga     720
tcaggttata ttcctgaagc tccaagagat gggcaagctt acgttcgtaa agatggcgaa     780
tgggtattac tttctacctt tttaggacat catcatcatc atcac                     825

<210> SEQ ID NO 67
<211> LENGTH: 118
<212> TYPE: PRT
<213> ORGANISM: Artificial Sequence
<220> FEATURE:
<223> OTHER INFORMATION: Synthetic

<400> SEQUENCE: 67

Gln Val Gln Leu Gln Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Ala Met His Trp Val Arg Gln Ala Pro Gly Lys Gly Leu Glu Trp Val

```
                35                  40                  45
Ala Val Ile Ser Tyr Asp Gly Ser Asn Lys Tyr Tyr Ala Asp Ser Val
        50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Tyr Gly Asp Tyr Leu Leu Asp Tyr Trp Gly Gln Gly Thr
            100                 105                 110

Leu Val Thr Val Ser Ser
        115
```

<210> SEQ ID NO 68
<211> LENGTH: 109
<212> TYPE: PRT
<213> ORGANISM: Artificial Sequence
<220> FEATURE:
<223> OTHER INFORMATION: Synthetic

<400> SEQUENCE: 68

```
Leu Ser Ala Leu Thr Gln Pro Ala Ser Ala Ser Gly Ser Pro Gly Gln
1               5                   10                  15

Ser Val Thr Ile Ser Cys Thr Gly Thr Ser Ser Asp Val Gly Gly Tyr
            20                  25                  30

Asn Tyr Ala Ser Trp Tyr Gln Gln His Pro Gly Lys Ala Pro Lys Leu
        35                  40                  45

Leu Ile Tyr Glu Val Thr Lys Arg Pro Ser Gly Val Pro Asp Arg Phe
    50                  55                  60

Ser Ser Ser Lys Ser Gly Asn Thr Ala Ser Leu Thr Val Ser Gly Leu
65                  70                  75                  80

Gln Ala Glu Asp Glu Ala Asp Tyr Tyr Cys Ser Ser Tyr Thr Gly Thr
                85                  90                  95

Leu Leu Leu Phe Gly Gly Gly Thr Lys Leu Thr Val Leu
            100                 105
```

<210> SEQ ID NO 69
<211> LENGTH: 354
<212> TYPE: DNA
<213> ORGANISM: Artificial Sequence
<220> FEATURE:
<223> OTHER INFORMATION: Synthetic

<400> SEQUENCE: 69

```
caggtgcagc tgcaggagtc cgggggaggc gtggtccagc ctggggaggtc cctgagactc        60 tcctgtgcag cctctggatt caccttcagt agctatgcta tgcactgggt ccgccaggct       120
ccaggcaagg ggctggagtg ggtggcagtt atatcatatg atggaagcaa taaatactac       180
gcagactccg tgaagggccg attcaccatc tccagagaca attccaagaa cacgctgtat       240
ctgcaaatga acagcctgag agctgaggac acggctgtgt attactgtgc gagagactac       300
ggtgactacc tccttgacta ctggggccag ggcaccctgg tcaccgtctc ctca             354
```

<210> SEQ ID NO 70
<211> LENGTH: 327
<212> TYPE: DNA
<213> ORGANISM: Artificial Sequence
<220> FEATURE:
<223> OTHER INFORMATION: Synthetic

<400> SEQUENCE: 70

```
ctgtctgccc tgactcagcc tgcctccgcg tccgggtctc ctggacagtc agtcaccatc     60
tcctgcactg gaaccagcag tgacgttggt ggatataact atgcctcctg gtaccaacaa    120
cacccaggta agcccccaa actcctgatt tatgaggtca caaagcggcc ctcaggggtc     180
cctgatcgct tctctagctc caagtctggc aacacggcct ccctgaccgt ctctgggctc    240
caggctgagg acgaggctga ttattactgc agctcatata caggcacttt gctacttttc    300
ggcggaggga ccaagctgac cgtcctt                                        327
```

<210> SEQ ID NO 71
<211> LENGTH: 5
<212> TYPE: PRT
<213> ORGANISM: Artificial Sequence
<220> FEATURE:
<223> OTHER INFORMATION: Synthetic

<400> SEQUENCE: 71

Ser Tyr Ala Met His
1               5

<210> SEQ ID NO 72
<211> LENGTH: 17
<212> TYPE: PRT
<213> ORGANISM: Artificial Sequence
<220> FEATURE:
<223> OTHER INFORMATION: Synthetic

<400> SEQUENCE: 72

Val Ile Ser Tyr Asp Gly Ser Asn Lys Tyr Tyr Ala Asp Ser Val Lys
1               5                   10                  15

Gly

<210> SEQ ID NO 73
<211> LENGTH: 9
<212> TYPE: PRT
<213> ORGANISM: Artificial Sequence
<220> FEATURE:
<223> OTHER INFORMATION: Synthetic

<400> SEQUENCE: 73

Asp Tyr Gly Asp Tyr Leu Leu Asp Tyr
1               5

<210> SEQ ID NO 74
<211> LENGTH: 14
<212> TYPE: PRT
<213> ORGANISM: Artificial Sequence
<220> FEATURE:
<223> OTHER INFORMATION: Synthetic

<400> SEQUENCE: 74

Thr Gly Thr Ser Ser Asp Val Gly Gly Tyr Asn Tyr Ala Ser
1               5                   10

<210> SEQ ID NO 75
<211> LENGTH: 7
<212> TYPE: PRT
<213> ORGANISM: Artificial Sequence
<220> FEATURE:
<223> OTHER INFORMATION: Synthetic

<400> SEQUENCE: 75

Glu Val Thr Lys Arg Pro Ser
1               5

```
<210> SEQ ID NO 76
<211> LENGTH: 9
<212> TYPE: PRT
<213> ORGANISM: Artificial Sequence
<220> FEATURE:
<223> OTHER INFORMATION: Synthetic

<400> SEQUENCE: 76

Ser Ser Tyr Thr Gly Thr Leu Leu Leu
1               5

<210> SEQ ID NO 77
<211> LENGTH: 8
<212> TYPE: PRT
<213> ORGANISM: Artificial Sequence
<220> FEATURE:
<223> OTHER INFORMATION: Synthetic

<400> SEQUENCE: 77

Gly Phe Thr Phe Ser Ser Tyr Ala
1               5

<210> SEQ ID NO 78
<211> LENGTH: 8
<212> TYPE: PRT
<213> ORGANISM: Artificial Sequence
<220> FEATURE:
<223> OTHER INFORMATION: Synthetic

<400> SEQUENCE: 78

Ile Ser Tyr Asp Gly Ser Asn Lys
1               5

<210> SEQ ID NO 79
<211> LENGTH: 11
<212> TYPE: PRT
<213> ORGANISM: Artificial Sequence
<220> FEATURE:
<223> OTHER INFORMATION: Synthetic

<400> SEQUENCE: 79

Ala Arg Asp Tyr Gly Asp Tyr Leu Leu Asp Tyr
1               5                   10

<210> SEQ ID NO 80
<211> LENGTH: 9
<212> TYPE: PRT
<213> ORGANISM: Artificial Sequence
<220> FEATURE:
<223> OTHER INFORMATION: Synthetic

<400> SEQUENCE: 80

Ser Ser Asp Val Gly Gly Tyr Asn Tyr
1               5

<210> SEQ ID NO 81
<211> LENGTH: 4
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (4)..(4)
<223> OTHER INFORMATION: X is any amino acid or not present

<400> SEQUENCE: 81
```

Glu Val Thr Xaa
1

<210> SEQ ID NO 82
<211> LENGTH: 9
<212> TYPE: PRT
<213> ORGANISM: Artificial Sequence
<220> FEATURE:
<223> OTHER INFORMATION: Synthetic

<400> SEQUENCE: 82

Ser Ser Tyr Thr Gly Thr Leu Leu Leu
1               5

<210> SEQ ID NO 83
<211> LENGTH: 234
<212> TYPE: PRT
<213> ORGANISM: Artificial Sequence
<220> FEATURE:
<223> OTHER INFORMATION: Synthetic

<400> SEQUENCE: 83

Gln Val Gln Leu Gln Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
                20                  25                  30

Ala Met His Trp Val Arg Gln Ala Pro Gly Lys Gly Leu Glu Trp Val
            35                  40                  45

Ala Val Ile Ser Tyr Asp Gly Ser Asn Lys Tyr Tyr Ala Asp Ser Val
        50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Tyr Gly Asp Tyr Leu Leu Asp Tyr Trp Gly Gln Gly Thr
            100                 105                 110

Leu Val Thr Val Ser Ser Gly Ser Gly Gly Gly Ser Leu Ser Ala
        115                 120                 125

Leu Thr Gln Pro Ala Ser Ala Ser Gly Ser Pro Gly Gln Ser Val Thr
    130                 135                 140

Ile Ser Cys Thr Gly Thr Ser Ser Asp Val Gly Gly Tyr Asn Tyr Ala
145                 150                 155                 160

Ser Trp Tyr Gln Gln His Pro Gly Lys Ala Pro Lys Leu Leu Ile Tyr
                165                 170                 175

Glu Val Thr Lys Arg Pro Ser Gly Val Pro Asp Arg Phe Ser Ser Ser
            180                 185                 190

Lys Ser Gly Asn Thr Ala Ser Leu Thr Val Ser Gly Leu Gln Ala Glu
        195                 200                 205

Asp Glu Ala Asp Tyr Tyr Cys Ser Ser Tyr Thr Gly Thr Leu Leu Leu
    210                 215                 220

Phe Gly Gly Gly Thr Lys Leu Thr Val Leu
225                 230

<210> SEQ ID NO 84
<211> LENGTH: 702
<212> TYPE: DNA
<213> ORGANISM: Artificial Sequence
<220> FEATURE:
<223> OTHER INFORMATION: Synthetic

<400> SEQUENCE: 84

```
caggtgcagc tgcaggagtc cggggggaggc gtggtccagc ctggggaggtc cctgagactc    60
tcctgtgcag cctctggatt caccttcagt agctatgcta tgcactgggt ccgccaggct   120
ccaggcaagg ggctggagtg gtggcagtt atatcatatg atggaagcaa taaatactac   180
gcagactccg tgaagggccg attcaccatc tccagagaca attccaagaa cacgctgtat   240
ctgcaaatga acagcctgag agctgaggac acggctgtgt attactgtgc gagagactac   300
ggtgactacc tccttgacta ctggggccag ggcaccctgg tcaccgtctc ctcaggcagc   360
ggcggtggcg atcccctgtc tgccctgact cagcctgcct ccgcgtccgg gtctcctgga   420
cagtcagtca ccatctcctg cactggaacc agcagtgacg ttggtggata taactatgcc   480
tcctggtacc aacaacaccc aggtaaagcc cccaaactcc tgatttatga ggtcacaaag   540
cggccctcag ggtccctga tcgcttctct agctccaagt ctggcaacac ggcctccctg   600
accgtctctg ggctccaggc tgaggacgag gctgattatt actgcagctc atatacaggc   660
actttgctac ttttcggcgg agggaccaag ctgaccgtcc tt                       702
```

<210> SEQ ID NO 85
<211> LENGTH: 127
<212> TYPE: PRT
<213> ORGANISM: Artificial Sequence
<220> FEATURE:
<223> OTHER INFORMATION: Synthetic

<400> SEQUENCE: 85

```
Gln Val Gln Leu Val Gln Ser Gly Ala Glu Leu Lys Lys Pro Gly Glu
1               5                   10                  15

Ser Leu Lys Ile Ser Cys Thr Ala Ser Gly Tyr Ser Phe Thr Asn Tyr
            20                  25                  30

Trp Ile Ala Trp Val Arg Gln Met Pro Gly Lys Gly Leu Glu Trp Met
        35                  40                  45

Gly Ile Val Asn Pro Ala Asp Ser Asp Thr Arg Tyr Ser Pro Ala Phe
    50                  55                  60

Gln Gly Gln Val Thr Met Ser Ala Asp Lys Ser Phe Asn Thr Ala Tyr
65                  70                  75                  80

Leu Gln Trp Ser Arg Leu Lys Ala Ser Asp Thr Ala Met Tyr Tyr Cys
                85                  90                  95

Ala Arg Leu Gly Gln Asp His Asn Ser Gly Trp Tyr Thr Tyr Phe His
            100                 105                 110

Pro Met Asp Val Trp Gly Gln Gly Thr Thr Val Thr Val Ser Ser
        115                 120                 125
```

<210> SEQ ID NO 86
<211> LENGTH: 112
<212> TYPE: PRT
<213> ORGANISM: Artificial Sequence
<220> FEATURE:
<223> OTHER INFORMATION: Synthetic

<400> SEQUENCE: 86

```
Gln Ser Ala Leu Thr Gln Pro Ala Ser Val Ser Gly Ser Pro Gly Gln
1               5                   10                  15

Ser Ile Thr Ile Ser Cys Thr Gly Thr Arg Ser Asp Val Gly Gly Tyr
            20                  25                  30

Asn Tyr Val Ser Trp Tyr Gln Gln His Pro Gly Lys Ala Pro Lys Leu
        35                  40                  45
```

```
Leu Ile Phe Gly Val Asn Asp Arg Pro Ser Gly Val Ser Asp Arg Phe
        50                  55                  60

Ser Gly Ser Arg Thr Gly Asn Thr Ala Ser Leu Thr Ile Ser Gly Leu
 65                  70                  75                  80

Gln Pro Glu Asp Glu Ala Asp Tyr Tyr Cys Ser Ser Phe Thr Arg Gly
                85                  90                  95

Thr Thr Leu Leu Val Phe Gly Gly Gly Thr Lys Leu Thr Val Leu Gly
            100                 105                 110
```

<210> SEQ ID NO 87
<211> LENGTH: 381
<212> TYPE: DNA
<213> ORGANISM: Artificial Sequence
<220> FEATURE:
<223> OTHER INFORMATION: Synthetic

<400> SEQUENCE: 87

```
caggtgcagc tggtgcaatc tggagcagaa ctgaaaaagc cgggggagtc tctgaagatc      60
tcttgtacgg cttctggata tagttttacc aactactgga tcgcctgggt gcgccagatg     120
cccgggaaag gcctggagtg gatgggaatc gtcaatcctg ctgactctga taccagatac     180
agcccggcct tccaaggcca ggtcaccatg tccgccgaca gtccttcaa taccgcctac      240 ctgcagtgga gtcgcctgaa ggcctcggac accgccatgt attactgtgc gagacttggg    300
caagatcata atagtggctg gtatacctac ttccacccta tggacgtctg gggccaaggg    360
accacggtca ccgtctcctc a                                              381
```

<210> SEQ ID NO 88
<211> LENGTH: 336
<212> TYPE: DNA
<213> ORGANISM: Artificial Sequence
<220> FEATURE:
<223> OTHER INFORMATION: Synthetic

<400> SEQUENCE: 88

```
cagtctgccc tgactcagcc tgcctccgtg tctgggtctc ctggacagtc gatcaccatc     60
tcctgcactg gaaccagaag tgacgttggt ggttataatt atgtctcttg gtaccaacag    120
cacccaggca aagcccccaa actcttaatt tttggggtca atgatcggcc ctcaggggtt    180
tctgatcgct tctctgggtc caggactggc aacacggcct ccctgaccat ctctgggctc    240
caacctgagg acgaggctga ttattattgc agttcgttta cacgaggcac cactctcctg    300
gtgttcggcg agggaccaa gctgaccgtc ctaggt                                336
```

<210> SEQ ID NO 89
<211> LENGTH: 5
<212> TYPE: PRT
<213> ORGANISM: Artificial Sequence
<220> FEATURE:
<223> OTHER INFORMATION: Synthetic

<400> SEQUENCE: 89

```
Asn Tyr Trp Ile Ala
 1               5
```

<210> SEQ ID NO 90
<211> LENGTH: 17
<212> TYPE: PRT
<213> ORGANISM: Artificial Sequence
<220> FEATURE:
<223> OTHER INFORMATION: Synthetic

```
<400> SEQUENCE: 90

Ile Val Asn Pro Ala Asp Ser Asp Thr Arg Tyr Ser Pro Ala Phe Gln
1               5                   10                  15

Gly

<210> SEQ ID NO 91
<211> LENGTH: 18
<212> TYPE: PRT
<213> ORGANISM: Artificial Sequence
<220> FEATURE:
<223> OTHER INFORMATION: Synthetic

<400> SEQUENCE: 91

Leu Gly Gln Asp His Asn Ser Gly Trp Tyr Thr Tyr Phe His Pro Met
1               5                   10                  15

Asp Val

<210> SEQ ID NO 92
<211> LENGTH: 14
<212> TYPE: PRT
<213> ORGANISM: Artificial Sequence
<220> FEATURE:
<223> OTHER INFORMATION: Synthetic

<400> SEQUENCE: 92

Thr Gly Thr Arg Ser Asp Val Gly Gly Tyr Asn Tyr Val Ser
1               5                   10

<210> SEQ ID NO 93
<211> LENGTH: 7
<212> TYPE: PRT
<213> ORGANISM: Artificial Sequence
<220> FEATURE:
<223> OTHER INFORMATION: Synthetic

<400> SEQUENCE: 93

Gly Val Asn Asp Arg Pro Ser
1               5

<210> SEQ ID NO 94
<211> LENGTH: 11
<212> TYPE: PRT
<213> ORGANISM: Artificial Sequence
<220> FEATURE:
<223> OTHER INFORMATION: Synthetic

<400> SEQUENCE: 94

Ser Ser Phe Thr Arg Gly Thr Thr Leu Leu Val
1               5                   10

<210> SEQ ID NO 95
<211> LENGTH: 8
<212> TYPE: PRT
<213> ORGANISM: Artificial Sequence
<220> FEATURE:
<223> OTHER INFORMATION: Synthetic

<400> SEQUENCE: 95

Gly Tyr Ser Phe Thr Asn Tyr Trp
1               5

<210> SEQ ID NO 96
<211> LENGTH: 8
<212> TYPE: PRT
```

```
<213> ORGANISM: Artificial Sequence
<220> FEATURE:
<223> OTHER INFORMATION: Synthetic

<400> SEQUENCE: 96

Val Asn Pro Ala Asp Ser Asp Thr
1               5

<210> SEQ ID NO 97
<211> LENGTH: 20
<212> TYPE: PRT
<213> ORGANISM: Artificial Sequence
<220> FEATURE:
<223> OTHER INFORMATION: Synthetic

<400> SEQUENCE: 97

Ala Arg Leu Gly Gln Asp His Asn Ser Gly Trp Tyr Thr Tyr Phe His
1               5                   10                  15

Pro Met Asp Val
            20

<210> SEQ ID NO 98
<211> LENGTH: 9
<212> TYPE: PRT
<213> ORGANISM: Artificial Sequence
<220> FEATURE:
<223> OTHER INFORMATION: Synthetic

<400> SEQUENCE: 98

Arg Ser Asp Val Gly Gly Tyr Asn Tyr
1               5

<210> SEQ ID NO 99
<211> LENGTH: 4
<212> TYPE: PRT
<213> ORGANISM: Artificial Sequence
<220> FEATURE:
<223> OTHER INFORMATION: Synthetic
<220> FEATURE:
<221> NAME/KEY: MISC_FEATURE
<222> LOCATION: (4)..(4)
<223> OTHER INFORMATION: X is any amino acid or not present

<400> SEQUENCE: 99

Gly Val Asn Xaa
1

<210> SEQ ID NO 100
<211> LENGTH: 11
<212> TYPE: PRT
<213> ORGANISM: Artificial Sequence
<220> FEATURE:
<223> OTHER INFORMATION: Synthetic

<400> SEQUENCE: 100

Ser Ser Phe Thr Arg Gly Thr Thr Leu Leu Val
1               5                   10

<210> SEQ ID NO 101
<211> LENGTH: 254
<212> TYPE: PRT
<213> ORGANISM: Artificial Sequence
<220> FEATURE:
<223> OTHER INFORMATION: Synthetic

<400> SEQUENCE: 101

Gln Val Gln Leu Val Gln Ser Gly Ala Glu Leu Lys Lys Pro Gly Glu
```

```
           1               5                  10                 15
          Ser Leu Lys Ile Ser Cys Thr Ala Ser Gly Tyr Ser Phe Thr Asn Tyr
                          20                 25                 30

Trp Ile Ala Trp Val Arg Gln Met Pro Gly Lys Gly Leu Glu Trp Met
                          35                 40                 45

Gly Ile Val Asn Pro Ala Asp Ser Asp Thr Arg Tyr Ser Pro Ala Phe
                          50                 55                 60

Gln Gly Gln Val Thr Met Ser Ala Asp Lys Ser Phe Asn Thr Ala Tyr
          65                      70                 75                 80

Leu Gln Trp Ser Arg Leu Lys Ala Ser Asp Thr Ala Met Tyr Tyr Cys
                          85                 90                 95

Ala Arg Leu Gly Gln Asp His Asn Ser Gly Trp Tyr Thr Tyr Phe His
                          100                105                110

Pro Met Asp Val Trp Gly Gln Gly Thr Val Thr Val Ser Ser Gly
                          115                120                125

Gly Gly Gly Ser Gly Gly Gly Gly Ser Gly Gly Gly Gly Ser Gln Ser
                          130                135                140

Ala Leu Thr Gln Pro Ala Ser Val Ser Gly Ser Pro Gly Gln Ser Ile
          145                     150                155                160

Thr Ile Ser Cys Thr Gly Thr Arg Ser Asp Val Gly Gly Tyr Asn Tyr
                              165                170                175

Val Ser Trp Tyr Gln Gln His Pro Gly Lys Ala Pro Lys Leu Leu Ile
                              180                185                190

Phe Gly Val Asn Asp Arg Pro Ser Gly Val Ser Asp Arg Phe Ser Gly
                              195                200                205

Ser Arg Thr Gly Asn Thr Ala Ser Leu Thr Ile Ser Gly Leu Gln Pro
          210                     215                220

Glu Asp Glu Ala Asp Tyr Tyr Cys Ser Ser Phe Thr Arg Gly Thr Thr
          225                     230                235                240

Leu Leu Val Phe Gly Gly Gly Thr Lys Leu Thr Val Leu Gly
                              245                250
```

<210> SEQ ID NO 102
<211> LENGTH: 762
<212> TYPE: DNA
<213> ORGANISM: Artificial Sequence
<220> FEATURE:
<223> OTHER INFORMATION: Synthetic

<400> SEQUENCE: 102

```
caggtgcagc tggtgcaatc tggagcagaa ctgaaaaagc cggggagtc tctgaagatc      60
tcttgtacgg cttctggata tagttttacc aactactgga tcgcctgggt gcgccagatg    120
cccgggaaag gcctggagtg gatgggaatc gtcaatcctg ctgactctga taccagatac    180
agcccggcct tccaaggcca ggtcaccatg tccgccgaca gtccttcaa taccgcctac    240
ctgcagtgga gtcgcctgaa ggcctcggac accgccatgt attactgtgc agacttggg    300
caagatcata tagtggctg gtataccta cttccaccc tatggacgtctg gggccaaggg    360
accacggtca ccgtctcctc aggcggcggc ggctctggcg gaggtggcag cggcggtggc    420
ggatcccagt ctgccctgac tcagcctgcc tccgtgtctg gttctcctgg acagtcgatc    480
accatctcct gcactggaac agaagtgac gttggtggtt ataattatgt ctcttggtac    540
caacagcacc caggcaaagc ccccaaactc ttaattttg ggtcaatga tcggccctca    600
ggggtttctg atcgcttctc tgggtccagg actggcaaca cggcctccct gaccatctct    660
```

```
gggctccaac ctgaggacga ggctgattat tattgcagtt cgtttacacg aggcaccact    720
ctcctggtgt cggcggagg gaccaagctg accgtcctag gt                        762
```

<210> SEQ ID NO 103
<211> LENGTH: 31
<212> TYPE: PRT
<213> ORGANISM: Artificial Sequence
<220> FEATURE:
<223> OTHER INFORMATION: Synthetic

<400> SEQUENCE: 103

Pro Gly Ser Gly Tyr Ile Pro Glu Ala Pro Arg Asp Gly Gln Ala Tyr
1               5                   10                  15

Val Arg Lys Asp Gly Glu Trp Val Leu Leu Ser Thr Phe Leu Gly
            20                  25                  30

<210> SEQ ID NO 104
<211> LENGTH: 93
<212> TYPE: DNA
<213> ORGANISM: Artificial Sequence
<220> FEATURE:
<223> OTHER INFORMATION: Synthetic

<400> SEQUENCE: 104

```
ccaggatcag gttatattcc tgaagctcca agagatgggc aagcttacgt tcgtaaagat    60
ggcgaatggg tattactttc tacctttta gga                                  93
```

<210> SEQ ID NO 105
<211> LENGTH: 5
<212> TYPE: PRT
<213> ORGANISM: Artificial Sequence
<220> FEATURE:
<223> OTHER INFORMATION: Synthetic

<400> SEQUENCE: 105

Glu Ala Ala Ala Lys
1               5

<210> SEQ ID NO 106
<211> LENGTH: 297
<212> TYPE: PRT
<213> ORGANISM: Artificial Sequence
<220> FEATURE:
<223> OTHER INFORMATION: Synthetic

<400> SEQUENCE: 106

Gln Val Thr Leu Arg Glu Ser Gly Pro Gly Leu Val Lys Pro Ser Glu
1               5                   10                  15

Thr Leu Ser Leu Thr Cys Ala Val Ser Gly Gly Ser Leu Ser Ser Val
            20                  25                  30

Asn Tyr Tyr Trp Ser Trp Ile Arg Gln His Pro Gly Lys Gly Leu Glu
        35                  40                  45

Trp Ile Gly Tyr Ile Tyr Tyr Ser Gly Ser Thr Asn Tyr Asn Pro Ser
    50                  55                  60

Leu Lys Ser Arg Val Thr Met Ser Leu Asp Thr Ser Lys Asn Gln Phe
65                  70                  75                  80

Ser Leu Lys Leu Ser Ser Val Thr Ala Ala Asp Thr Ala Val Tyr Tyr
                85                  90                  95

Cys Ala Thr Pro Gly Ala Ile Met Gly Ala Leu His Ile Trp Gly Gln
            100                 105                 110

Gly Thr Leu Val Thr Val Ser Ser Ala Ser Thr Lys Gly Pro Ser Val

```
            115                 120                 125
Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Pro Lys Ser Gly
    210                 215                 220

Gly Gly Gly Ser Gly Gly Gly Ser Gly Gly Gly Ser Ser Gly
225                 230                 235                 240

Val Arg Leu Trp Ala Thr Arg Gln Ala Met Leu Gly Gln Val His Glu
                245                 250                 255

Val Pro Glu Gly Trp Leu Ile Phe Val Ala Glu Gln Glu Leu Tyr
            260                 265                 270

Val Arg Val Gln Asn Gly Phe Arg Lys Val Gln Leu Glu Ala Arg Thr
                275                 280                 285

Pro Leu Pro Arg Gly Thr Asp Asn Glu
    290                 295
```

<210> SEQ ID NO 107
<211> LENGTH: 59
<212> TYPE: PRT
<213> ORGANISM: Artificial Sequence
<220> FEATURE:
<223> OTHER INFORMATION: Synthetic

<400> SEQUENCE: 107

```
Ser Gly Val Arg Leu Trp Ala Thr Arg Gln Ala Met Leu Gly Gln Val
1               5                   10                  15

His Glu Val Pro Glu Gly Trp Leu Ile Phe Val Ala Glu Gln Glu Glu
                20                  25                  30

Leu Tyr Val Arg Val Gln Asn Gly Phe Arg Lys Val Gln Leu Glu Ala
            35                  40                  45

Arg Thr Pro Leu Pro Arg Gly Thr Asp Asn Glu
        50                  55
```

<210> SEQ ID NO 108
<211> LENGTH: 226
<212> TYPE: PRT
<213> ORGANISM: Artificial Sequence
<220> FEATURE:
<223> OTHER INFORMATION: Synthetic

<400> SEQUENCE: 108

```
Gln Ala Val Leu Thr Gln Pro Ser Ser Ala Ser Ser Thr Pro Gly Gln
1               5                   10                  15

Arg Val Ile Ile Ser Cys Ser Gly Ser Ser Ser Asn Ile Gly Ser Asn
                20                  25                  30

Thr Val Ser Trp Tyr Gln Gln Val Pro Gly Ala Ala Pro Lys Leu Leu
            35                  40                  45

Ile Tyr Phe Asp Tyr Arg Arg Pro Ser Gly Val Pro Asp Arg Phe Ser
        50                  55                  60
```

```
Gly Thr Arg Ser Gly Thr Ser Ala Ser Leu Gly Ile Ser Gly Leu Gln
 65                  70                  75                  80

Ser Glu Asp Glu Ala Asp Tyr Tyr Cys Ala Ala Trp Asp Asp Ser Leu
                 85                  90                  95

Ser Ala Trp Val Phe Gly Arg Gly Thr Lys Leu Thr Val Leu Gly Gly
            100                 105                 110

Leu Gly Gly Leu Val Asp Tyr Lys Gly Gln Pro Lys Ala Ala Pro Ser
        115                 120                 125

Val Thr Leu Phe Pro Pro Ser Glu Glu Leu Gln Ala Asn Lys Ala
    130                 135                 140

Thr Leu Val Cys Leu Ile Ser Asp Phe Tyr Pro Gly Ala Val Thr Val
145                 150                 155                 160

Ala Trp Lys Ala Asp Ser Ser Pro Val Lys Ala Gly Val Glu Thr Thr
                165                 170                 175

Thr Pro Ser Lys Gln Ser Asn Asn Lys Tyr Ala Ala Ser Ser Tyr Leu
            180                 185                 190

Ser Leu Thr Pro Glu Gln Trp Lys Ser His Arg Ser Tyr Ser Cys Gln
        195                 200                 205

Val Thr His Glu Gly Ser Thr Val Glu Lys Thr Val Ala Pro Thr Glu
    210                 215                 220

Cys Ser
225

<210> SEQ ID NO 109
<211> LENGTH: 269
<212> TYPE: PRT
<213> ORGANISM: Artificial Sequence
<220> FEATURE:
<223> OTHER INFORMATION: Synthetic

<400> SEQUENCE: 109

Gln Val Thr Leu Arg Glu Ser Gly Pro Gly Leu Val Lys Pro Ser Glu
  1               5                  10                  15

Thr Leu Ser Leu Thr Cys Ala Val Ser Gly Gly Ser Leu Ser Ser Val
             20                  25                  30

Asn Tyr Tyr Trp Ser Trp Ile Arg Gln His Pro Gly Lys Gly Leu Glu
         35                  40                  45

Trp Ile Gly Tyr Ile Tyr Tyr Ser Gly Ser Thr Asn Tyr Asn Pro Ser
 50                  55                  60

Leu Lys Ser Arg Val Thr Met Ser Leu Asp Thr Ser Lys Asn Gln Phe
 65                  70                  75                  80

Ser Leu Lys Leu Ser Ser Val Thr Ala Ala Asp Thr Ala Val Tyr Tyr
                 85                  90                  95

Cys Ala Thr Pro Gly Ala Ile Met Gly Ala Leu His Ile Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190
```

```
Ser Ser Ser Leu Gly Thr Gln Thr Tyr Ile Cys Asn Val Asn His Lys
            195                 200                 205

Pro Ser Asn Thr Lys Val Asp Lys Lys Val Glu Pro Pro Lys Ser Gly
210                 215                 220

Gly Gly Gly Ser Gly Gly Gly Gly Ser Gly Gly Gly Gly Ser Pro Gly
225                 230                 235                 240

Ser Gly Tyr Ile Pro Glu Ala Pro Arg Asp Gly Gln Ala Tyr Val Arg
                245                 250                 255

Lys Asp Gly Glu Trp Val Leu Leu Ser Thr Phe Leu Gly
            260                 265

<210> SEQ ID NO 110
<211> LENGTH: 270
<212> TYPE: PRT
<213> ORGANISM: Artificial Sequence
<220> FEATURE:
<223> OTHER INFORMATION: Synthetic

<400> SEQUENCE: 110

Gln Val Thr Leu Arg Glu Ser Gly Pro Gly Leu Val Lys Pro Ser Glu
1               5                   10                  15

Thr Leu Ser Leu Thr Cys Ala Val Ser Gly Gly Ser Leu Ser Ser Val
            20                  25                  30

Asn Tyr Tyr Trp Ser Trp Ile Arg Gln His Pro Gly Lys Gly Leu Glu
        35                  40                  45

Trp Ile Gly Tyr Ile Tyr Tyr Ser Gly Ser Thr Asn Tyr Asn Pro Ser
    50                  55                  60

Leu Lys Ser Arg Val Thr Met Ser Leu Asp Thr Ser Lys Asn Gln Phe
65                  70                  75                  80

Ser Leu Lys Leu Ser Ser Val Thr Ala Ala Asp Thr Ala Val Tyr Tyr
            85                  90                  95

Cys Ala Thr Pro Gly Ala Ile Met Gly Ala Leu His Ile Trp Gly Gln
            100                 105                 110

Gly Thr Leu Val Thr Val Ser Ser Ala Ser Thr Lys Gly Pro Ser Val
            115                 120                 125

Phe Pro Leu Ala Pro Ser Ser Lys Ser Thr Ser Gly Gly Thr Ala Ala
        130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
            165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
            195                 200                 205

Pro Ser Asn Thr Lys Val Asp Lys Lys Val Glu Pro Pro Lys Ser Gly
210                 215                 220

Gly Gly Gly Ser Gly Gly Gly Gly Ser Gly Gly Gly Gly Ser Met Lys
225                 230                 235                 240

Gln Ile Glu Asp Lys Ile Glu Glu Ile Leu Ser Lys Ile Tyr His Ile
                245                 250                 255

Glu Asn Glu Ile Ala Arg Ile Lys Lys Leu Ile Gly Glu Val
            260                 265                 270

<210> SEQ ID NO 111
<211> LENGTH: 32
```

```
<212> TYPE: PRT
<213> ORGANISM: Artificial Sequence
<220> FEATURE:
<223> OTHER INFORMATION: Synthetic

<400> SEQUENCE: 111

Met Lys Gln Ile Glu Asp Lys Ile Glu Ile Leu Ser Lys Ile Tyr
1               5                   10                  15

His Ile Glu Asn Glu Ile Ala Arg Ile Lys Lys Leu Ile Gly Glu Val
            20                  25                  30

<210> SEQ ID NO 112
<211> LENGTH: 265
<212> TYPE: PRT
<213> ORGANISM: Artificial Sequence
<220> FEATURE:
<223> OTHER INFORMATION: Synthetic

<400> SEQUENCE: 112

Gln Val Gln Leu Val Gln Ser Gly Gly Gly Leu Ile Gln Pro Gly Gly
1               5                   10                  15

Ser Leu Arg Leu Ser Cys Ala Ala Ser Gly Phe Thr Val Ser Leu Ser
            20                  25                  30

His Met Asn Trp Val Arg Gln Ala Pro Gly Lys Gly Leu Glu Trp Val
        35                  40                  45

Ser Ile Thr Tyr Gly Asp Gly Asn Ser Asp Tyr Ala Asp Ser Val Lys
    50                  55                  60

Gly Arg Phe Thr Ile Ser Arg Asp Asn Ser Lys Asn Thr Leu Tyr Leu
65                  70                  75                  80

Gln Met Asn Ser Leu Arg Ala Glu Asp Thr Ala Val Tyr Tyr Cys Ala
                85                  90                  95

Arg Glu Tyr Tyr Tyr Gly Met Asp Val Trp Gly Gln Gly Thr Thr Val
            100                 105                 110

Thr Val Ser Ser Ala Ser Thr Lys Gly Pro Ser Val Phe Pro Leu Ala
        115                 120                 125

Pro Ser Ser Lys Ser Thr Ser Gly Gly Thr Ala Ala Leu Gly Cys Leu
    130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Gln Thr Tyr Ile Cys Asn Val Asn His Lys Pro Ser Asn Thr
        195                 200                 205

Lys Val Asp Lys Lys Val Glu Pro Pro Lys Ser Gly Gly Gly Gly Ser
    210                 215                 220

Gly Gly Gly Gly Ser Gly Gly Gly Ser Pro Gly Ser Gly Tyr Ile
225                 230                 235                 240

Pro Glu Ala Pro Arg Asp Gly Gln Ala Tyr Val Arg Lys Asp Gly Glu
                245                 250                 255

Trp Val Leu Leu Ser Thr Phe Leu Gly
            260                 265

<210> SEQ ID NO 113
<211> LENGTH: 221
<212> TYPE: PRT
<213> ORGANISM: Artificial Sequence
```

<220> FEATURE:
<223> OTHER INFORMATION: Synthetic

<400> SEQUENCE: 113

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Val Leu Tyr Ser
            20                  25                  30

Ser Asn Asn Lys Asn Tyr Leu Ala Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Gln Gln
                85                  90                  95

Tyr Tyr Ser Leu Pro Leu Thr Phe Gly Gly Gly Thr Lys Leu Glu Ile
            100                 105                 110

Lys Arg Thr Val Ala Ala Pro Ser Val Phe Ile Phe Pro Pro Ser
        115                 120                 125

Asp Glu Gln Leu Lys Ser Gly Thr Ala Ser Val Val Cys Leu Leu Asn
130                 135                 140

Asn Phe Tyr Pro Arg Glu Ala Lys Val Gln Trp Lys Val Asp Asn Ala
145                 150                 155                 160

Leu Gln Ser Gly Asn Ser Gln Glu Ser Val Thr Glu Gln Asp Ser Lys
                165                 170                 175

Asp Ser Thr Tyr Ser Leu Ser Ser Thr Leu Thr Leu Ser Lys Ala Asp
            180                 185                 190

Tyr Glu Lys His Lys Val Tyr Ala Cys Glu Val Thr His Gln Gly Leu
        195                 200                 205

Ser Ser Pro Val Thr Lys Ser Phe Asn Arg Gly Glu Cys
    210                 215                 220

<210> SEQ ID NO 114
<211> LENGTH: 267
<212> TYPE: PRT
<213> ORGANISM: Artificial Sequence
<220> FEATURE:
<223> OTHER INFORMATION: Synthetic

<400> SEQUENCE: 114

Gln Val Gln Leu Gln Glu Ser Gly Gly Gly Val Val Gln Pro Gly Arg
1               5                   10                  15

Ser Leu Arg Leu Ser Cys Ala Ala Ser Gly Phe Thr Phe Ser Ser Tyr
            20                  25                  30

Ala Met His Trp Val Arg Gln Ala Pro Gly Lys Gly Leu Glu Trp Val
        35                  40                  45

Ala Val Ile Ser Tyr Asp Gly Ser Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Tyr Gly Asp Tyr Leu Leu Asp Tyr Trp Gly Gln Gly Thr
            100                 105                 110

Leu Val Thr Val Ser Ser Ala Ser Thr Lys Gly Pro Ser Val Phe Pro

```
                    115                 120                 125
Leu Ala Pro Ser Ser Lys Ser Thr Ser Gly Gly Thr Ala Ala Leu Gly
            130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
            195                 200                 205

Asn Thr Lys Val Asp Lys Lys Val Glu Pro Pro Lys Ser Gly Gly Gly
            210                 215                 220

Gly Ser Gly Gly Gly Gly Ser Gly Gly Gly Ser Pro Gly Ser Gly
225                 230                 235                 240

Tyr Ile Pro Glu Ala Pro Arg Asp Gly Gln Ala Tyr Val Arg Lys Asp
                245                 250                 255

Gly Glu Trp Val Leu Leu Ser Thr Phe Leu Gly
            260                 265

<210> SEQ ID NO 115
<211> LENGTH: 215
<212> TYPE: PRT
<213> ORGANISM: Artificial Sequence
<220> FEATURE:
<223> OTHER INFORMATION: Synthetic

<400> SEQUENCE: 115

Leu Ser Ala Leu Thr Gln Pro Ala Ser Ala Ser Gly Ser Pro Gly Gln
1               5                   10                  15

Ser Val Thr Ile Ser Cys Thr Gly Thr Ser Ser Asp Val Gly Gly Tyr
            20                  25                  30

Asn Tyr Ala Ser Trp Tyr Gln Gln His Pro Gly Lys Ala Pro Lys Leu
        35                  40                  45

Leu Ile Tyr Glu Val Thr Lys Arg Pro Ser Gly Val Pro Asp Arg Phe
50                  55                  60

Ser Ser Ser Lys Ser Gly Asn Thr Ala Ser Leu Thr Val Ser Gly Leu
65                  70                  75                  80

Gln Ala Glu Asp Glu Ala Asp Tyr Tyr Cys Ser Ser Tyr Thr Gly Thr
                85                  90                  95

Leu Leu Leu Phe Gly Gly Gly Thr Lys Leu Thr Val Leu Gly Gln Pro
            100                 105                 110

Lys Ala Ala Pro Ser Val Thr Leu Phe Pro Pro Ser Ser Glu Glu Leu
            115                 120                 125

Gln Ala Asn Lys Ala Thr Leu Val Cys Leu Ile Ser Asp Phe Tyr Pro
            130                 135                 140

Gly Ala Val Thr Val Ala Trp Lys Ala Asp Ser Ser Pro Val Lys Ala
145                 150                 155                 160

Gly Val Glu Thr Thr Pro Ser Lys Gln Ser Asn Asn Lys Tyr Ala
                165                 170                 175

Ala Ser Ser Tyr Leu Ser Leu Thr Pro Glu Gln Trp Lys Ser His Arg
            180                 185                 190

Ser Tyr Ser Cys Gln Val Thr His Glu Gly Ser Thr Val Glu Lys Thr
            195                 200                 205

Val Ala Pro Thr Glu Cys Ser
```

<210> SEQ ID NO 116
<211> LENGTH: 276
<212> TYPE: PRT
<213> ORGANISM: Artificial Sequence
<220> FEATURE:
<223> OTHER INFORMATION: Synthetic

<400> SEQUENCE: 116

Gln Val Gln Leu Val Gln Ser Gly Ala Glu Leu Lys Lys Pro Gly Glu
1               5                   10                  15

Ser Leu Lys Ile Ser Cys Thr Ala Ser Gly Tyr Ser Phe Thr Asn Tyr
            20                  25                  30

Trp Ile Ala Trp Val Arg Gln Met Pro Gly Lys Gly Leu Glu Trp Met
        35                  40                  45

Gly Ile Val Asn Pro Ala Asp Ser Asp Thr Arg Tyr Ser Pro Ala Phe
    50                  55                  60

Gln Gly Gln Val Thr Met Ser Ala Asp Lys Ser Phe Asn Thr Ala Tyr
65                  70                  75                  80

Leu Gln Trp Ser Arg Leu Lys Ala Ser Asp Thr Ala Met Tyr Tyr Cys
                85                  90                  95

Ala Arg Leu Gly Gln Asp His Asn Ser Gly Trp Tyr Thr Tyr Phe His
            100                 105                 110

Pro Met Asp Val Trp Gly Gln Gly Thr Thr Val Thr Val Ser Ser Ala
        115                 120                 125

Ser Thr Lys Gly Pro Ser Val Phe Pro Leu Ala Pro Ser Ser Lys Ser
130                 135                 140

Thr Ser Gly Gly Thr Ala Ala Leu Gly Cys Leu Val Lys Asp Tyr Phe
145                 150                 155                 160

Pro Glu Pro Val Thr Val Ser Trp Asn Ser Gly Ala Leu Thr Ser Gly
                165                 170                 175

Val His Thr Phe Pro Ala Val Leu Gln Ser Ser Gly Leu Tyr Ser Leu
            180                 185                 190

Ser Ser Val Val Thr Val Pro Ser Ser Leu Gly Thr Gln Thr Tyr
        195                 200                 205

Ile Cys Asn Val Asn His Lys Pro Ser Asn Thr Lys Val Asp Lys Lys
    210                 215                 220

Val Glu Pro Pro Lys Ser Gly Gly Gly Ser Gly Gly Gly Gly Ser
225                 230                 235                 240

Gly Gly Gly Gly Ser Pro Gly Ser Gly Tyr Ile Pro Glu Ala Pro Arg
            245                 250                 255

Asp Gly Gln Ala Tyr Val Arg Lys Asp Gly Glu Trp Val Leu Leu Ser
        260                 265                 270

Thr Phe Leu Gly
        275

<210> SEQ ID NO 117
<211> LENGTH: 218
<212> TYPE: PRT
<213> ORGANISM: Artificial Sequence
<220> FEATURE:
<223> OTHER INFORMATION: Synthetic

<400> SEQUENCE: 117

Gln Ser Ala Leu Thr Gln Pro Ala Ser Val Ser Gly Ser Pro Gly Gln
1               5                   10                  15

```
Ser Ile Thr Ile Ser Cys Thr Gly Thr Arg Ser Asp Val Gly Gly Tyr
            20                  25                  30

Asn Tyr Val Ser Trp Tyr Gln Gln His Pro Gly Lys Ala Pro Lys Leu
        35                  40                  45

Leu Ile Phe Gly Val Asn Asp Arg Pro Ser Gly Val Ser Asp Arg Phe
 50                  55                  60

Ser Gly Ser Arg Thr Gly Asn Thr Ala Ser Leu Thr Ile Ser Gly Leu
 65                  70                  75                  80

Gln Pro Glu Asp Glu Ala Asp Tyr Tyr Cys Ser Ser Phe Thr Arg Gly
                 85                  90                  95

Thr Thr Leu Leu Val Phe Gly Gly Thr Lys Leu Thr Val Leu Gly
                100                 105                 110

Gly Gln Pro Lys Ala Ala Pro Ser Val Thr Leu Phe Pro Pro Ser Ser
            115                 120                 125

Glu Glu Leu Gln Ala Asn Lys Ala Thr Leu Val Cys Leu Ile Ser Asp
    130                 135                 140

Phe Tyr Pro Gly Ala Val Thr Val Ala Trp Lys Ala Asp Ser Ser Pro
145                 150                 155                 160

Val Lys Ala Gly Val Glu Thr Thr Thr Pro Ser Lys Gln Ser Asn Asn
                165                 170                 175

Lys Tyr Ala Ala Ser Ser Tyr Leu Ser Leu Thr Pro Glu Gln Trp Lys
            180                 185                 190

Ser His Arg Ser Tyr Ser Cys Gln Val Thr His Glu Gly Ser Thr Val
        195                 200                 205

Glu Lys Thr Val Ala Pro Thr Glu Cys Ser
    210                 215

<210> SEQ ID NO 118
<211> LENGTH: 272
<212> TYPE: PRT
<213> ORGANISM: Artificial Sequence
<220> FEATURE:
<223> OTHER INFORMATION: Synthetic

<400> SEQUENCE: 118

Gln Leu Gln Leu Gln Glu Ser Gly Pro Gly Leu Val Lys Pro Ser Glu
1               5                  10                  15

Thr Leu Ser Leu Thr Cys Thr Val Ser Gly Gly Ser Ile Ser Ser Thr
            20                  25                  30

Thr Tyr Tyr Trp Gly Trp Ile Arg Gln Pro Pro Gly Lys Gly Leu Glu
        35                  40                  45

Trp Ile Ala Ser Ile Tyr Tyr Ser Gly Ser Thr Tyr Tyr Asn Pro Ser
 50                  55                  60

Leu Lys Ser Arg Leu Thr Val Ser Val Asp Thr Ser Lys Asn Gln Phe
 65                  70                  75                  80

Ser Leu Lys Leu Ser Ser Val Thr Ala Ala Asp Thr Ala Val Tyr Tyr
                 85                  90                  95

Cys Ala Arg Gln Trp Lys Trp Phe Gly Glu Ala Trp Tyr Phe Asp Leu
            100                 105                 110

Trp Gly Arg Gly Thr Leu Val Thr Val Ser Ser Ala Ser Thr Lys Gly
        115                 120                 125

Pro Ser Val Phe Pro Leu Ala Pro Ser Ser Lys Ser Thr Ser Gly Gly
    130                 135                 140

Thr Ala Ala Leu Gly Cys Leu Val Lys Asp Tyr Phe Pro Glu Pro Val
145                 150                 155                 160
```

```
Thr Val Ser Trp Asn Ser Gly Ala Leu Thr Ser Gly Val His Thr Phe
                165                 170                 175

Pro Ala Val Leu Gln Ser Ser Gly Leu Tyr Ser Leu Ser Ser Val Val
            180                 185                 190

Thr Val Pro Ser Ser Ser Leu Gly Thr Gln Thr Tyr Ile Cys Asn Val
        195                 200                 205

Asn His Lys Pro Ser Asn Thr Lys Val Asp Lys Lys Val Glu Pro Pro
    210                 215                 220

Lys Ser Gly Gly Gly Ser Gly Gly Gly Ser Gly Gly Gly Gly
225                 230                 235                 240

Ser Pro Gly Ser Gly Tyr Ile Pro Glu Ala Pro Arg Asp Gly Gln Ala
                245                 250                 255

Tyr Val Arg Lys Asp Gly Glu Trp Val Leu Leu Ser Thr Phe Leu Gly
            260                 265                 270
```

<210> SEQ ID NO 119
<211> LENGTH: 215
<212> TYPE: PRT
<213> ORGANISM: Artificial Sequence
<220> FEATURE:
<223> OTHER INFORMATION: Synthetic

<400> SEQUENCE: 119

```
Glu Ile Val Leu Thr Gln Ser Pro Gly Thr Leu Ser Leu Ser Pro Gly
1               5                   10                  15

Glu Arg Ala Ser Leu Ser Cys Arg Ala Ser Gln Ser Val Ser Ser Ser
            20                  25                  30

Tyr Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Ser Ser Pro
                85                  90                  95

Phe Thr Phe Gly Gly Gly Thr Lys Val Glu Ile Lys Arg Thr Val Ala
            100                 105                 110

Ala Pro Ser Val Phe Ile Phe Pro Pro Ser Asp Glu Gln Leu Lys Ser
        115                 120                 125

Gly Thr Ala Ser Val Val Cys Leu Leu Asn Asn Phe Tyr Pro Arg Glu
    130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
            180                 185                 190

Tyr Ala Cys Glu Val Thr His Gln Gly Leu Ser Ser Pro Val Thr Lys
        195                 200                 205

Ser Phe Asn Arg Gly Glu Cys
    210                 215
```

<210> SEQ ID NO 120
<211> LENGTH: 276
<212> TYPE: PRT
<213> ORGANISM: Artificial Sequence
<220> FEATURE:

<223> OTHER INFORMATION: Synthetic

<400> SEQUENCE: 120

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Pro Phe Thr Ser Tyr
            20                  25                  30

Gly Ile Ser Trp Val Arg Gln Ala Pro Gly Gln Gly Leu Glu Trp Met
        35                  40                  45

Gly Trp Ile Ser Thr Tyr Asn Gly Asn Thr Asn Tyr Ala Gln Lys Phe
    50                  55                  60

Gln Gly Arg Val Thr Met Thr Thr Asp Thr Ser Thr Thr Thr Gly Tyr
65                  70                  75                  80

Met Glu Leu Arg Arg Leu Arg Ser Asp Asp Thr Ala Val Tyr Tyr Cys
                85                  90                  95

Ala Arg Asp Tyr Thr Arg Gly Ala Trp Phe Gly Glu Ser Leu Ile Gly
            100                 105                 110

Gly Phe Asp Asn Trp Gly Gln Gly Thr Leu Val Thr Val Ser Ser Ala
        115                 120                 125

Ser Thr Lys Gly Pro Ser Val Phe Pro Leu Ala Pro Ser Ser Lys Ser
    130                 135                 140

Thr Ser Gly Gly Thr Ala Ala Leu Gly Cys Leu Val Lys Asp Tyr Phe
145                 150                 155                 160

Pro Glu Pro Val Thr Val Ser Trp Asn Ser Gly Ala Leu Thr Ser Gly
                165                 170                 175

Val His Thr Phe Pro Ala Val Leu Gln Ser Ser Gly Leu Tyr Ser Leu
            180                 185                 190

Ser Ser Val Val Thr Val Pro Ser Ser Leu Gly Thr Gln Thr Tyr
        195                 200                 205

Ile Cys Asn Val Asn His Lys Pro Ser Asn Thr Lys Val Asp Lys Lys
    210                 215                 220

Val Glu Pro Pro Lys Ser Gly Gly Gly Ser Gly Gly Gly Ser
225                 230                 235                 240

Gly Gly Gly Gly Ser Pro Gly Ser Gly Tyr Ile Pro Glu Ala Pro Arg
                245                 250                 255

Asp Gly Gln Ala Tyr Val Arg Lys Asp Gly Glu Trp Val Leu Leu Ser
            260                 265                 270

Thr Phe Leu Gly
        275

<210> SEQ ID NO 121
<211> LENGTH: 214
<212> TYPE: PRT
<213> ORGANISM: Artificial Sequence
<220> FEATURE:
<223> OTHER INFORMATION: Synthetic

<400> SEQUENCE: 121

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Thr Val Ser Ser Thr
            20                  25                  30

Ser Leu Ala Trp Tyr Gln Gln Lys Pro Gly Gln Ala Pro Arg Leu Leu
        35                  40                  45

Ile Tyr Gly Ala Ser Ser Arg Ala Thr Gly Ile Pro Asp Arg Phe Ser
    50                  55                  60

```
Gly Ser Gly Ser Gly Thr Asp Phe Thr Leu Thr Ile Ser Arg Leu Glu
 65                  70                  75                  80

Pro Glu Asp Phe Ala Val Tyr Tyr Cys Gln Gln His Asp Thr Ser Leu
             85                  90                  95

Thr Phe Gly Gly Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 122
<211> LENGTH: 5
<212> TYPE: PRT
<213> ORGANISM: Artificial Sequence
<220> FEATURE:
<223> OTHER INFORMATION: Synthetic

<400> SEQUENCE: 122

Gly Gly Gly Gly Ser
1               5

<210> SEQ ID NO 123
<211> LENGTH: 15
<212> TYPE: PRT
<213> ORGANISM: Artificial Sequence
<220> FEATURE:
<223> OTHER INFORMATION: Synthetic

<400> SEQUENCE: 123

Gly Gly Gly Gly Ser Gly Gly Gly Gly Ser Gly Gly Gly Gly Ser
1               5                   10                  15

<210> SEQ ID NO 124
<211> LENGTH: 15
<212> TYPE: PRT
<213> ORGANISM: Artificial Sequence
<220> FEATURE:
<223> OTHER INFORMATION: Synthetic

<400> SEQUENCE: 124

Glu Ala Ala Ala Lys Glu Ala Ala Ala Lys Glu Ala Ala Ala Lys
1               5                   10                  15

<210> SEQ ID NO 125
<211> LENGTH: 25
<212> TYPE: PRT
<213> ORGANISM: Artificial Sequence
<220> FEATURE:
<223> OTHER INFORMATION: Synthetic

<400> SEQUENCE: 125
```

Glu Ala Ala Ala Lys Glu Ala Ala Lys Glu Ala Ala Lys Glu
1               5                   10                  15

Ala Ala Ala Lys Glu Ala Ala Lys
            20              25

<210> SEQ ID NO 126
<211> LENGTH: 1273
<212> TYPE: PRT
<213> ORGANISM: Artificial Sequence
<220> FEATURE:
<223> OTHER INFORMATION: Synthetic

<400> SEQUENCE: 126

Met Phe Val Phe Leu Val Leu Leu Pro Leu Val Ser Ser Gln Cys Val
1               5                   10                  15

Asn Leu Thr Thr Arg Thr Gln Leu Pro Pro Ala Tyr Thr Asn Ser Phe
            20                  25                  30

Thr Arg Gly Val Tyr Tyr Pro Asp Lys Val Phe Arg Ser Ser Val Leu
        35                  40                  45

His Ser Thr Gln Asp Leu Phe Leu Pro Phe Phe Ser Asn Val Thr Trp
    50                  55                  60

Phe His Ala Ile His Val Ser Gly Thr Asn Gly Thr Lys Arg Phe Asp
65                  70                  75                  80

Asn Pro Val Leu Pro Phe Asn Asp Gly Val Tyr Phe Ala Ser Thr Glu
                85                  90                  95

Lys Ser Asn Ile Ile Arg Gly Trp Ile Phe Gly Thr Thr Leu Asp Ser
            100                 105                 110

Lys Thr Gln Ser Leu Leu Ile Val Asn Asn Ala Thr Asn Val Val Ile
        115                 120                 125

Lys Val Cys Glu Phe Gln Phe Cys Asn Asp Pro Phe Leu Gly Val Tyr
    130                 135                 140

Tyr His Lys Asn Asn Lys Ser Trp Met Glu Ser Glu Phe Arg Val Tyr
145                 150                 155                 160

Ser Ser Ala Asn Asn Cys Thr Phe Glu Tyr Val Ser Gln Pro Phe Leu
                165                 170                 175

Met Asp Leu Glu Gly Lys Gln Gly Asn Phe Lys Asn Leu Arg Glu Phe
            180                 185                 190

Val Phe Lys Asn Ile Asp Gly Tyr Phe Lys Ile Tyr Ser Lys His Thr
        195                 200                 205

Pro Ile Asn Leu Val Arg Asp Leu Pro Gln Gly Phe Ser Ala Leu Glu
    210                 215                 220

Pro Leu Val Asp Leu Pro Ile Gly Ile Asn Ile Thr Arg Phe Gln Thr
225                 230                 235                 240

Leu Leu Ala Leu His Arg Ser Tyr Leu Thr Pro Gly Asp Ser Ser Ser
                245                 250                 255

Gly Trp Thr Ala Gly Ala Ala Ala Tyr Tyr Val Gly Tyr Leu Gln Pro
            260                 265                 270

Arg Thr Phe Leu Leu Lys Tyr Asn Glu Asn Gly Thr Ile Thr Asp Ala
        275                 280                 285

Val Asp Cys Ala Leu Asp Pro Leu Ser Glu Thr Lys Cys Thr Leu Lys
    290                 295                 300

Ser Phe Thr Val Glu Lys Gly Ile Tyr Gln Thr Ser Asn Phe Arg Val
305                 310                 315                 320

Gln Pro Thr Glu Ser Ile Val Arg Phe Pro Asn Ile Thr Asn Leu Cys
                325                 330                 335

```
Pro Phe Gly Glu Val Phe Asn Ala Thr Arg Phe Ala Ser Val Tyr Ala
            340                 345                 350

Trp Asn Arg Lys Arg Ile Ser Asn Cys Val Ala Asp Tyr Ser Val Leu
            355                 360                 365

Tyr Asn Ser Ala Ser Phe Ser Thr Phe Lys Cys Tyr Gly Val Ser Pro
            370                 375                 380

Thr Lys Leu Asn Asp Leu Cys Phe Thr Asn Val Tyr Ala Asp Ser Phe
385                 390                 395                 400

Val Ile Arg Gly Asp Glu Val Arg Gln Ile Ala Pro Gly Gln Thr Gly
                405                 410                 415

Lys Ile Ala Asp Tyr Asn Tyr Lys Leu Pro Asp Asp Phe Thr Gly Cys
            420                 425                 430

Val Ile Ala Trp Asn Ser Asn Asn Leu Asp Ser Lys Val Gly Gly Asn
            435                 440                 445

Tyr Asn Tyr Leu Tyr Arg Leu Phe Arg Lys Ser Asn Leu Lys Pro Phe
    450                 455                 460

Glu Arg Asp Ile Ser Thr Glu Ile Tyr Gln Ala Gly Ser Thr Pro Cys
465                 470                 475                 480

Asn Gly Val Glu Gly Phe Asn Cys Tyr Phe Pro Leu Gln Ser Tyr Gly
                485                 490                 495

Phe Gln Pro Thr Asn Gly Val Gly Tyr Gln Pro Tyr Arg Val Val Val
            500                 505                 510

Leu Ser Phe Glu Leu Leu His Ala Pro Ala Thr Val Cys Gly Pro Lys
            515                 520                 525

Lys Ser Thr Asn Leu Val Lys Asn Lys Cys Val Asn Phe Asn Phe Asn
    530                 535                 540

Gly Leu Thr Gly Thr Gly Val Leu Thr Glu Ser Asn Lys Lys Phe Leu
545                 550                 555                 560

Pro Phe Gln Gln Phe Gly Arg Asp Ile Ala Asp Thr Thr Asp Ala Val
                565                 570                 575

Arg Asp Pro Gln Thr Leu Glu Ile Leu Asp Ile Thr Pro Cys Ser Phe
            580                 585                 590

Gly Gly Val Ser Val Ile Thr Pro Gly Thr Asn Thr Ser Asn Gln Val
            595                 600                 605

Ala Val Leu Tyr Gln Asp Val Asn Cys Thr Glu Val Pro Val Ala Ile
    610                 615                 620

His Ala Asp Gln Leu Thr Pro Thr Trp Arg Val Tyr Ser Thr Gly Ser
625                 630                 635                 640

Asn Val Phe Gln Thr Arg Ala Gly Cys Leu Ile Gly Ala Glu His Val
                645                 650                 655

Asn Asn Ser Tyr Glu Cys Asp Ile Pro Ile Gly Ala Gly Ile Cys Ala
            660                 665                 670

Ser Tyr Gln Thr Gln Thr Asn Ser Pro Arg Arg Ala Arg Ser Val Ala
            675                 680                 685

Ser Gln Ser Ile Ile Ala Tyr Thr Met Ser Leu Gly Ala Glu Asn Ser
    690                 695                 700

Val Ala Tyr Ser Asn Asn Ser Ile Ala Ile Pro Thr Asn Phe Thr Ile
705                 710                 715                 720

Ser Val Thr Thr Glu Ile Leu Pro Val Ser Met Thr Lys Thr Ser Val
                725                 730                 735

Asp Cys Thr Met Tyr Ile Cys Gly Asp Ser Thr Glu Cys Ser Asn Leu
            740                 745                 750
```

```
Leu Leu Gln Tyr Gly Ser Phe Cys Thr Gln Leu Asn Arg Ala Leu Thr
            755                 760                 765

Gly Ile Ala Val Glu Gln Asp Lys Asn Thr Gln Glu Val Phe Ala Gln
770                 775                 780

Val Lys Gln Ile Tyr Lys Thr Pro Pro Ile Lys Asp Phe Gly Gly Phe
785                 790                 795                 800

Asn Phe Ser Gln Ile Leu Pro Asp Pro Ser Lys Pro Ser Lys Arg Ser
            805                 810                 815

Phe Ile Glu Asp Leu Leu Phe Asn Lys Val Thr Leu Ala Asp Ala Gly
            820                 825                 830

Phe Ile Lys Gln Tyr Gly Asp Cys Leu Gly Asp Ile Ala Ala Arg Asp
            835                 840                 845

Leu Ile Cys Ala Gln Lys Phe Asn Gly Leu Thr Val Leu Pro Pro Leu
850                 855                 860

Leu Thr Asp Glu Met Ile Ala Gln Tyr Thr Ser Ala Leu Leu Ala Gly
865                 870                 875                 880

Thr Ile Thr Ser Gly Trp Thr Phe Gly Ala Gly Ala Ala Leu Gln Ile
                885                 890                 895

Pro Phe Ala Met Gln Met Ala Tyr Arg Phe Asn Gly Ile Gly Val Thr
            900                 905                 910

Gln Asn Val Leu Tyr Glu Asn Gln Lys Leu Ile Ala Asn Gln Phe Asn
            915                 920                 925

Ser Ala Ile Gly Lys Ile Gln Asp Ser Leu Ser Ser Thr Ala Ser Ala
            930                 935                 940

Leu Gly Lys Leu Gln Asp Val Val Asn Gln Asn Ala Gln Ala Leu Asn
945                 950                 955                 960

Thr Leu Val Lys Gln Leu Ser Ser Asn Phe Gly Ala Ile Ser Ser Val
                965                 970                 975

Leu Asn Asp Ile Leu Ser Arg Leu Asp Lys Val Glu Ala Glu Val Gln
            980                 985                 990

Ile Asp Arg Leu Ile Thr Gly Arg Leu Gln Ser Leu Gln Thr Tyr Val
            995                 1000                1005

Thr Gln Gln Leu Ile Arg Ala Ala Glu Ile Arg Ala Ser Ala Asn
    1010                1015                1020

Leu Ala Ala Thr Lys Met Ser Glu Cys Val Leu Gly Gln Ser Lys
    1025                1030                1035

Arg Val Asp Phe Cys Gly Lys Gly Tyr His Leu Met Ser Phe Pro
    1040                1045                1050

Gln Ser Ala Pro His Gly Val Val Phe Leu His Val Thr Tyr Val
    1055                1060                1065

Pro Ala Gln Glu Lys Asn Phe Thr Thr Ala Pro Ala Ile Cys His
    1070                1075                1080

Asp Gly Lys Ala His Phe Pro Arg Glu Gly Val Phe Val Ser Asn
    1085                1090                1095

Gly Thr His Trp Phe Val Thr Gln Arg Asn Phe Tyr Glu Pro Gln
    1100                1105                1110

Ile Ile Thr Thr Asp Asn Thr Phe Val Ser Gly Asn Cys Asp Val
    1115                1120                1125

Val Ile Gly Ile Val Asn Asn Thr Val Tyr Asp Pro Leu Gln Pro
    1130                1135                1140

Glu Leu Asp Ser Phe Lys Glu Glu Leu Asp Lys Tyr Phe Lys Asn
    1145                1150                1155

His Thr Ser Pro Asp Val Asp Leu Gly Asp Ile Ser Gly Ile Asn
```

| | | | | 1160 | | | | 1165 | | | | 1170 | | |
|---|---|---|---|---|---|---|---|---|---|---|---|---|---|---|
| Ala | Ser | Val | Val | Asn | Ile | Gln | Lys | Glu | Ile | Asp | Arg | Leu | Asn | Glu |
| | 1175 | | | | | 1180 | | | | | 1185 | | | |
| Val | Ala | Lys | Asn | Leu | Asn | Glu | Ser | Leu | Ile | Asp | Leu | Gln | Glu | Leu |
| | 1190 | | | | | 1195 | | | | | 1200 | | | |
| Gly | Lys | Tyr | Glu | Gln | Tyr | Ile | Lys | Trp | Pro | Trp | Tyr | Ile | Trp | Leu |
| | 1205 | | | | | 1210 | | | | | 1215 | | | |
| Gly | Phe | Ile | Ala | Gly | Leu | Ile | Ala | Ile | Val | Met | Val | Thr | Ile | Met |
| | 1220 | | | | | 1225 | | | | | 1230 | | | |
| Leu | Cys | Cys | Met | Thr | Ser | Cys | Cys | Ser | Cys | Leu | Lys | Gly | Cys | Cys |
| | 1235 | | | | | 1240 | | | | | 1245 | | | |
| Ser | Cys | Gly | Ser | Cys | Cys | Lys | Phe | Asp | Glu | Asp | Asp | Ser | Glu | Pro |
| | 1250 | | | | | 1255 | | | | | 1260 | | | |
| Val | Leu | Lys | Gly | Val | Lys | Leu | His | Tyr | Thr | | | | | |
| | 1265 | | | | | 1270 | | | | | | | | |

ANTIBODIES AGAINST SARS-CoV-2 SPIKE PROTEIN

CROSS-REFERENCE TO RELATED APPLICATIONS

This application is a continuation of International Application No. PCT/CN2021/129036, filed Nov. 5, 2021, which claims the benefit under 35 U.S.C. § 119(e) of United States Provisional Application No. 63/184,548, filed May 5, 2021, and 63/110,977, filed Nov. 6, 2020.

SEQUENCE LISTING

The instant application contains a sequence listing which has been submitted electronically as ASCII format and is hereby incorporated by reference in its entirety. Said ASCII copy, created Nov. 3, 2021, is named 325285US_ST25 and is 113,067 bytes in size.

BACKGROUND

The continuous spreading of SARS-CoV-2, a novel coronavirus and cause of the coronavirus disease 2019 (COVID-19), poses an unprecedented health crisis that was declared a pandemic by the World Health Organization (WHO) on Mar. 11, 2020. It has led to over 205 million confirmed cases and more than 4.3 million deaths around the world as of 12 Aug. 2021. Even though several approved vaccines and antibody drugs have curbed the infection speed at the end of 2020, the rapid spread and emergence of several dominant new SARS-CoV-2 lineages increased concerns for the effectiveness of current neutralizing antibodies (nAbs) and vaccines. Uncontrolled transmission promoted the virus evolution, which generated several prevalent strains, including these variants of concerns (VOC) B.1.1.7 (alpha), B.1.351 (beta), B.1.617.2 (delta), and P.1 (gamma).

Tracking the virus evolution, D614G is the first identified dominant mutation to increase SARS-CoV-2 infectivity without enhancing disease severity and immune-escape by antibodies, which has a vital role in the viral evolution and emergence of further variants. N501Y independently emerged in different variants, including B.1.1.7 variant (501Y.V1) first identified in September 2020 in UK, B.1.351 variant (501Y.V2) first reported in December, 2020 in South Africa, and P1 variant (501Y.V3) identified in Brazil. N501Y mutation confers a ~10 times fold increase of affinity between RBD and hACE2, however, unlike D614G mutation, neutralization effect of immunized sera and nAbs were affected by the N501Y variants. In addition, B.1.351 variant caused more severe disease and in-hospital mortality. The variant B.1.617.1 gained attention in India in February, 2021 has three key mutations in spike: L452R, E484Q, and P681R; another similar VOC, B.1.617.2, with mutations L452R, T478K, and P681R shows apparently increased transmissibility, is highly prevalent in India, and now spreads globally. In addition, B.1.351 and P.1 sera showed significantly reduced neutralization against B.1.617.2, indicating that individuals infected previously by these variants may be more susceptible to reinfection by B.1.617.2.

Among the three N501Y versions of VOC, E484K is a key mutation mediating immune escape against nAbs or immunized nAbs. By evaluating the effect of mRNA vaccines on the 10 globally circulating strains of SARS-CoV-2, Wilfredo et al. reported that 5/10 pseudoviruses harboring K417N/T, E484K, and N501Y were highly resistant to neutralization of immunized nAbs. The multiple mutants (E484K+K417N+N501Y) completely abolishe the binding to Bamlanivimab (LY-CoV555), which has been approved with an Emergency Use Authorization (EUA). Based on the binding epitopes, et SARS-CoV-2 nAbs are divided into three classes: class 1 are ACE2 competing nAbs that bind in receptor-binding motif (RBM) of spike; class 2 cross-reacts with SARS-CoV and binds the base of RBD; class 3 are N-terminal domain (NTD) recognizing nAbs. Many highly potent neutralizing mAbs in class 1 and class 3 showed reduced or lost inhibitory activity against viruses containing an E484K spike mutation. For B.1.617.2 variant, most approved nAbs maintained the neutralization activities with small, up to 5-fold reduction, while LY-CoV555 was severely reduced.

Monoclonal antibodies (mAbs) targeting the viral surface proteins have shown excellent neutralization efficacy in previous treatment of SARS, MERS and Ebola, and therefore are of particular interest to combat the current pandemic. Since the outbreak of COVID-19, the spike glycoprotein has been the main antigen targeted for development of therapeutic mAbs. Most neutralizing antibodies bind to the receptor binding domain (RBD) of the viral spike protein. Some non-RBD binding antibodies to the N-terminal domain (NTD) also appear to potently neutralize SARS-CoV-2.

Neutralizing antibodies have been derived from multiple sources, including memory B cells from SARS-CoV-2 convalescent patients, previous SARS neutralizing antibodies, immunized humanized H2L2 mice, nanobodies from alpaca, and single domain human antibodies from a pre-established library. New and better antibodies are needed for prevention and treatment of the infections by SARS-CoV-2. Especially, there is an urgent need for variant resistant neutralizing antibodies.

SUMMARY

The present disclosure provides antibodies and fragments thereof capable of binding to the SARS-CoV-2 spike protein. The antibody or fragment thereof comprises a heavy chain variable region (VH) comprising heavy chain complementarity determining regions CDRH1, CDRH2, and CDRH3, and a light chain variable region (VL) comprising light chain complementarity determining regions CDRL1, CDRL2, and CDRL3. In some embodiments, the CDRH1, CDRH2, CDRH3, CDRL1, CDRL2, and CDRL3, respectively, comprise the amino acid sequences of (a) SEQ ID NO:5-10; (b) SEQ ID NO:27-32; (c) SEQ ID NO:49-54; (d) SEQ ID NO:71-76; or (e) SEQ ID NO:89-94. In some embodiments, the antibody or fragment thereof does not bind to the SARS-CoV spike protein.

Also provided, in another embodiment, is a trimeric antibody comprising three fusion polypeptides, each fusion polypeptide comprising an antigen binding domain fused to a trimerization domain, wherein the antigen binding domain has binding specificity to the receptor binding motif (RBM) of the receptor binding domain (RBD) of the SARS-Cov-2 spike protein.

In some embodiments, the trimerization domain is capable of mediating stable association of the trimeric antigen binding molecule. In some embodiments, the trimerization domain comprises an amino acid sequence selected from the group consisting of SEQ ID NO:103, 107 and 111, preferably SEQ ID NO:103.

In some embodiments, the trimeric antibody further comprises a peptide linker between the antigen binding domain and the trimerization domain. In some embodiments, the peptide linker is a flexible linker, preferably comprising the amino acid sequence of SEQ ID NO:122 or 123. In some embodiments, the peptide linker is from 5 to 50 amino acid residues in length, preferably from 5 to 20 amino acid residues in length.

In some embodiments, the antigen binding domain binds to at least one of amino acid residues selected from the group consisting of 438, 447-456, 489-495, and 507-508 of SEQ ID NO:126. In some embodiments, the antigen binding domain comprises a fragment of the present disclosure.

Also provided, in one embodiment, is an antibody or fragment thereof, wherein the antibody or fragment thereof has specificity to the SARS-CoV-2 spike protein, and competes with an antibody or fragment thereof disclosed here in binding to the SARS-CoV-2 spike protein, or binds to the same epitope as an antibody or fragment thereof disclosed herein.

Also provided, in one embodiment, is a method for detecting a SARS-CoV-2 virus, comprising contacting the antibody or fragment thereof disclosed herein with a sample, wherein binding of the antibody or fragment thereof to the sample indicates that the sample contains a SARS-CoV-2 virus.

Also provided are methods for treating or preventing a SARS-CoV-2 viral infection in a subject, comprising administering to the subject an effective amount of the antibody or fragment thereof disclosed herein. In some embodiments, the subject suffers from a COVID-19 symptom.

DETAILED DESCRIPTION

Figure 1:
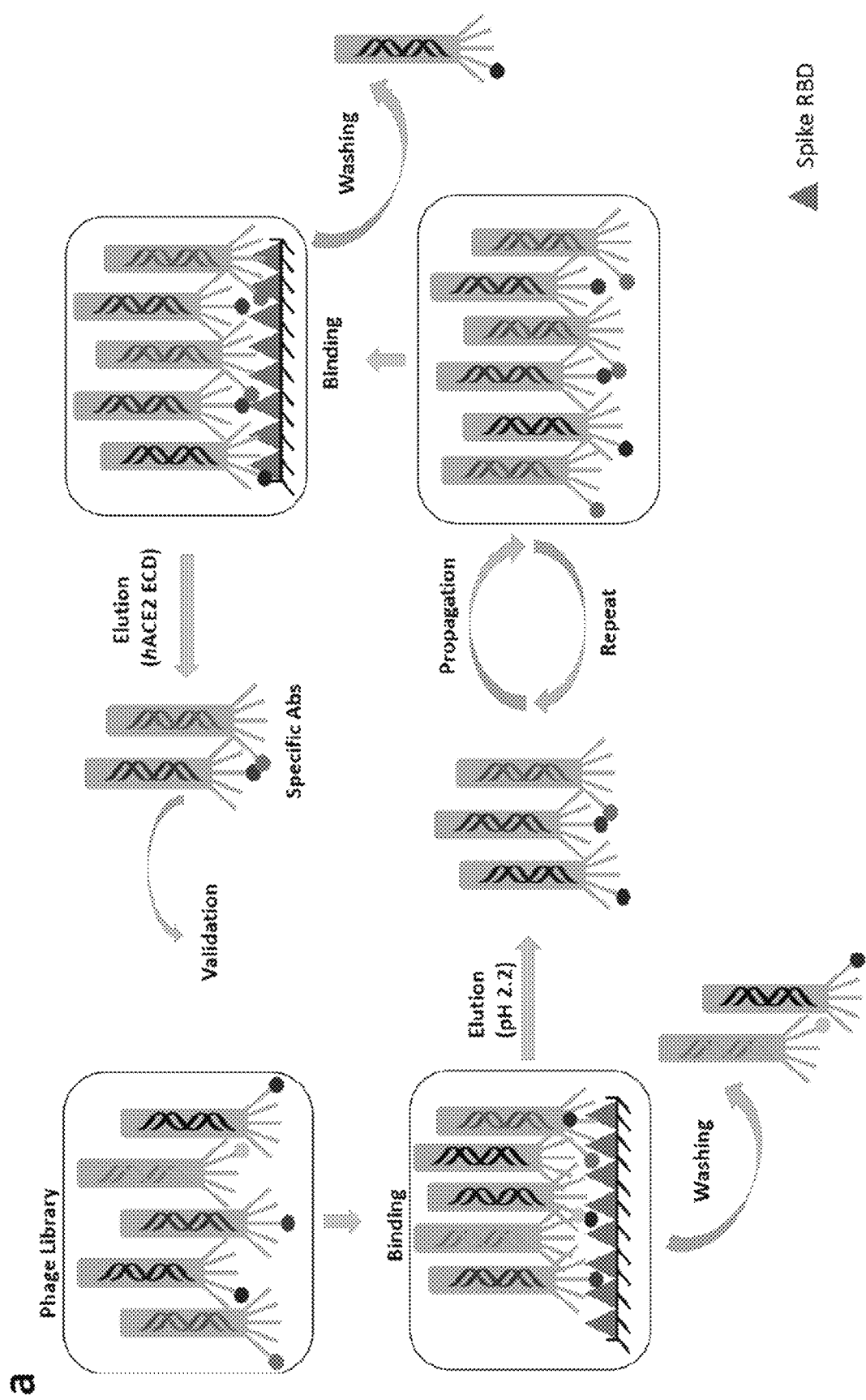
FIG. 1 Selection of scFv antibodies targeting spike protein. a. Work flow of the panning process against S-RBD. b. Output vs panning round for the antigen S-RBD-hFc during three rounds of screening. c. Phage ELISA results of 22 unique antibodies with positive readouts ($OD_{405}$ ratio S-RBD-hFc/hFc>2).
Figure 1:
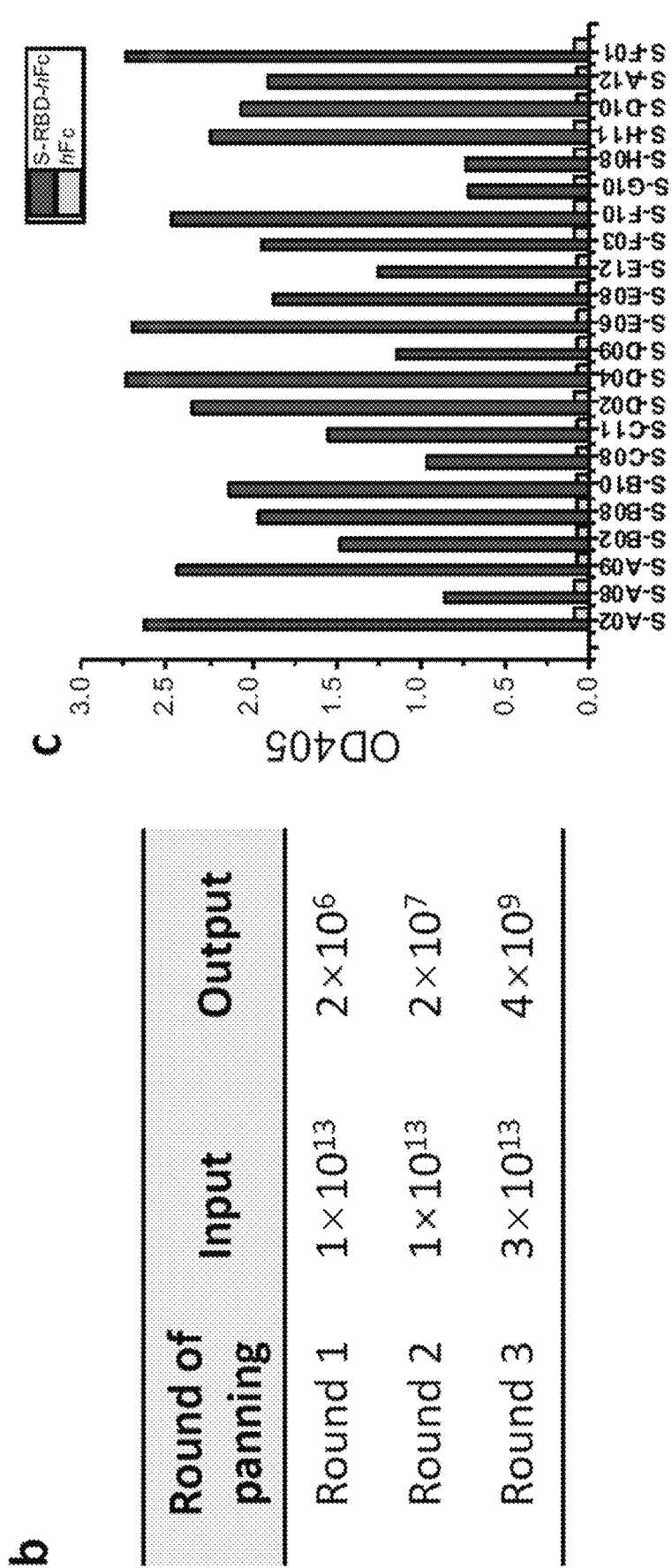

In order that the present disclosure may be more readily understood, certain terms are first defined. Additional definitions are set forth throughout the detailed description.

The term "antibody" as referred to herein includes whole antibodies and any antigen binding fragment (i.e., "antigen-binding portion") or single chains thereof. Whole antibodies are glycoproteins comprising at least two heavy (H) chains and two light (L) chains inter-connected by disulfide bonds. Each heavy chain is comprised of a heavy chain variable region (abbreviated herein as $V_H$) and a heavy chain constant region. The heavy chain constant region is comprised of three domains, $C_H1$, $C_H2$, and $C_H3$. Each light chain is comprised of a light chain variable region (abbreviated herein as $V_L$) and a light chain constant region. The light chain constant region is comprised of one domain, $C_L$. The $V_H$ and $V_L$ regions can be further subdivided into regions of hypervariability, termed complementarity determining regions (CDRs), interspersed with regions that are more conserved, termed framework regions (FR). Each $V_H$ and $V_L$ is composed of three CDRs and four FRs, arranged from amino-terminus to carboxy terminus in the following order: FR1, CDR1, FR2, CDR2, FR3, CDR3, and FR4. The variable regions of the heavy and light chains contain a binding domain that interacts with an antigen. The constant regions of the antibodies can mediate the binding of the immunoglobulin to host tissues or factors, including various cells of the immune system (e.g., effector cells) and the first component (C1q) of the classical complement system.

The term "antigen-binding portion" of an antibody (or simply "antibody portion" or "fragment"), as used herein, refers to one or more fragments of an antibody that retain the ability to specifically bind to an antigen (e.g., a LAG-3 protein). It has been shown that the antigen-binding function of an antibody can be performed by fragments of a full-length antibody. Examples of binding fragments encompassed within the term "antigen binding portion" of an antibody include (i) a Fab fragment, a monovalent fragment consisting of the $V_L$, $V_H$, $C_L$ and $C_H1$ domains; (ii) a $F(ab')_2$ fragment, a bivalent fragment comprising two Fab fragments linked by a disulfide bridge at the hinge region; (iii) a Fab' fragment, which is essentially a Fab with part of the hinge region (see, FUNDAMENTAL IMMUNOLOGY (Paul ed., 3.sup.rd ed. 1993); (iv) a Fd fragment consisting of the $V_H$ and $C_H1$ domains; (v) a $F_v$ fragment consisting of the $V_L$ and $V_H$ domains of a single arm of an antibody, (vi) a dAb fragment (Ward et al., (1989) Nature 341:544-546), which consists of a $V_H$ domain; (vii) an isolated complementarity determining region (CDR); and (viii) a nanobody, a heavy chain variable region containing a single variable domain and two constant domains. Furthermore, although the two domains of the $F_v$ fragment, $V_L$ and $V_H$, are coded for by separate genes, they can be joined, using recombinant methods, by a synthetic linker that enables them to be made as a single protein chain in which the $V_L$ and $V_H$ regions pair to form monovalent molecules (known as single chain $F_v$ (scFv); see e.g., Bird et al. (1988) Science 242:423-426; and Huston et al. (1988) Proc. Natl. Acad. Sci. USA 85:5879-5883). Such single chain antibodies are also intended to be encompassed within the term "antigen binding portion" of an antibody. These antibody fragments are obtained using conventional techniques known to those with skill in the art, and the fragments are screened for utility in the same manner as are intact antibodies.

The terms "monoclonal antibody" or "monoclonal antibody composition" as used herein refer to a preparation of antibody molecules of single molecular composition. A monoclonal antibody composition displays a single binding specificity and affinity for a particular epitope.

The term "human antibody", as used herein, is intended to include antibodies having variable regions in which both the framework and CDR regions are derived from human germline immunoglobulin sequences. Furthermore, if the antibody contains a constant region, the constant region also is derived from human germline immunoglobulin sequences. The human antibodies of the disclosure can include amino acid residues not encoded by human germline immunoglobulin sequences (e.g., mutations introduced by random or site-specific mutagenesis in vitro or by somatic mutation in vivo). However, the term "human antibody", as used herein, is not intended to include antibodies in which CDR sequences derived from the germline of another mammalian species, such as a mouse, have been grafted onto human framework sequences.

As used herein, an antibody that "specifically binds the SARS-CoV-2 spike protein" or "has specificity to the SARS-CoV-2 spike protein" is intended to refer to an antibody that binds to the SARS-CoV-2 spike protein but does not substantially bind to non-SARS-CoV-2 spike proteins. Preferably, the antibody binds to a SARS-CoV-2 spike protein with "high affinity", namely with a $K_D$ of $1 \times 10^{-7}$ M or less, more preferably $5 \times 10^{-8}$ M or less, more preferably $3 \times 10^{-8}$ M or less, more preferably $1 \times 10^{-8}$ M or less, more preferably $3 \times 10^{-9}$ M or less or even more preferably $1 \times 10^{-9}$ M or less.

The phrases "an antibody recognizing an antigen" and "an antibody specific for an antigen" are used interchangeably herein with the term "an antibody which binds specifically to an antigen."

Various aspects of the disclosure are described in further detail in the following subsections.

Antibodies Against the SARS-Cov-2 Spike RBD

The present disclosure provides antibodies and fragments thereof capable of binding to the SARS-CoV-2 spike protein. As demonstrated in the accompanying experimental examples, these antibodies have excellent neutralization abilities.

The present disclosure provides antibodies and fragments having specificity to the SARS-CoV-2 spike protein, in particular the receptor binding domain (RBD). The antibodies of the disclosure are characterized by particular functional features or properties of the antibodies.

SARS-CoV-2 is a single-stranded RNA-enveloped virus. Its entire genome is 29,881 bp in length (GenBank no. MN908947), encoding 9860 amino acids. Gene fragments express structural and nonstructural proteins. The S, E, M, and N genes encode structural proteins, whereas nonstructural proteins, such as 3-chymotrypsin-like protease, papain-like protease, and RNA-dependent RNA polymerase, are encoded by the ORF region.

A glycosylated S (spike) protein covers the surface of SARS-CoV-2 and binds to the host cell receptor angiotensin-converting enzyme 2 (ACE2), mediating viral cell entry. When the S protein binds to the receptor, TM protease serine 2 (TMPRSS2), a type 2 TM serine protease located on the host cell membrane, promotes virus entry into the cell by activating the S protein. Once the virus enters the cell, the viral RNA is released, polyproteins are translated from the RNA genome, and replication and transcription of the viral RNA genome occur via protein cleavage and assembly of the replicase-transcriptase complex. Viral RNA is replicated, and structural proteins are synthesized, assembled, and packaged in the host cell, after which viral particles are released.

The total length of the spike protein is 1273 aa and consists of a signal peptide (amino acids 1-13) located at the N-terminus, the 51 subunit (14-685 residues), and the S2 subunit (686-1273 residues); the last two regions are responsible for receptor binding and membrane fusion, respectively. In the 51 subunit, there is an N-terminal domain (14-305 residues) and a receptor-binding domain (RBD, 319-541 residues); the fusion peptide (FP) (788-806 residues), heptapeptide repeat sequence 1 (HR1) (912-984 residues), HR2 (1163-1213 residues), TM domain (1213-1237 residues), and cytoplasm domain (1237-1273 residues) comprise the S2 subunit.

Three potent neutralizing antibodies were discovered in this example. Interestingly, they do not cross-react with the SARS-CoV spike protein (FIG. 2b), which is likely due to differences in the epitope (~70% difference) in the receptor binding site between SARS-CoV and SAR-CoV-2 targeted by these antibodies. In addition, neither of the three antibodies bind to other five HCoVs (FIG. 2c-g). Moreover, autoreactivity assay in a HEp-2 cell ruled out that S-E6 and S-D4 originate from autoimmune responses, whereas S-B8 showed weak to moderate autoreactivity, which was increased in the S-B8 putative germline antibody.

The structural studies on S-E6 and S-B8 revealed several striking features of these combinatorial antibodies. The primary immune response to viral infection is followed by a secondary response that generates functionally better antibodies, where the binding energy can be refined by somatic hypermutation. The secondary immune response is for later encounter of the same antigen, and is the basis of vaccination. In cases of pandemics, such as SARS-CoV-2, avian influenza or Ebola virus, if the infection is not dealt with by the immune system in the first few days, the patient has a high probability of dying, and as a consequence, the immune system will not have enough time to refine the immune response. Consistently, neutralizing antibodies isolated from SARS-CoV-2 convalescent patients contain only a few amino-acid mutations that may be a result of weak B cell stimulation due to rapid viral clearance. Neutralizing antibodies isolated from convalescent patients shortly after infection may then possibly not be fully refined (matured). In comparison, S-B8 and S-E6 exhibited higher levels of SHM, many of which are involved in specific interactions with SARS-CoV-2 RBD (S-RBD). Nine of 13 SHM residues in S-B8 and eight of 22 in S-E6 are located in the antibody-antigen interface. While some of these SHM residues only use their peptide backbone, others rely on specific side chains for S-RBD binding. Interestingly, SHM in CDRH1 of S-E6 generates a $_{33}NY_{34}$ sequence that is similar to the $_{32}NY_{33}$ motif in IGHV3-53/3-66 antibodies, which are the most frequent germlines used in targeting the S-RBD, indicative that the combinatorial antibody library and the maturation process can yield alternate antibody solutions The instant inventors screened a combinatorial human antibody library with the SARS-CoV-2 S RBD, and identified three highly potent antibodies that selectively bind the S protein and neutralize authentic SARS-CoV-2 virus. Compared to neutralizing antibodies from COVID-19 patients with generally low somatic hypermutation (SHM), these antibodies contain over 13-22 SHMs, many of which are involved in specific interactions in their crystal structures with SARS-CoV-2 spike RBD.

Figure 3:
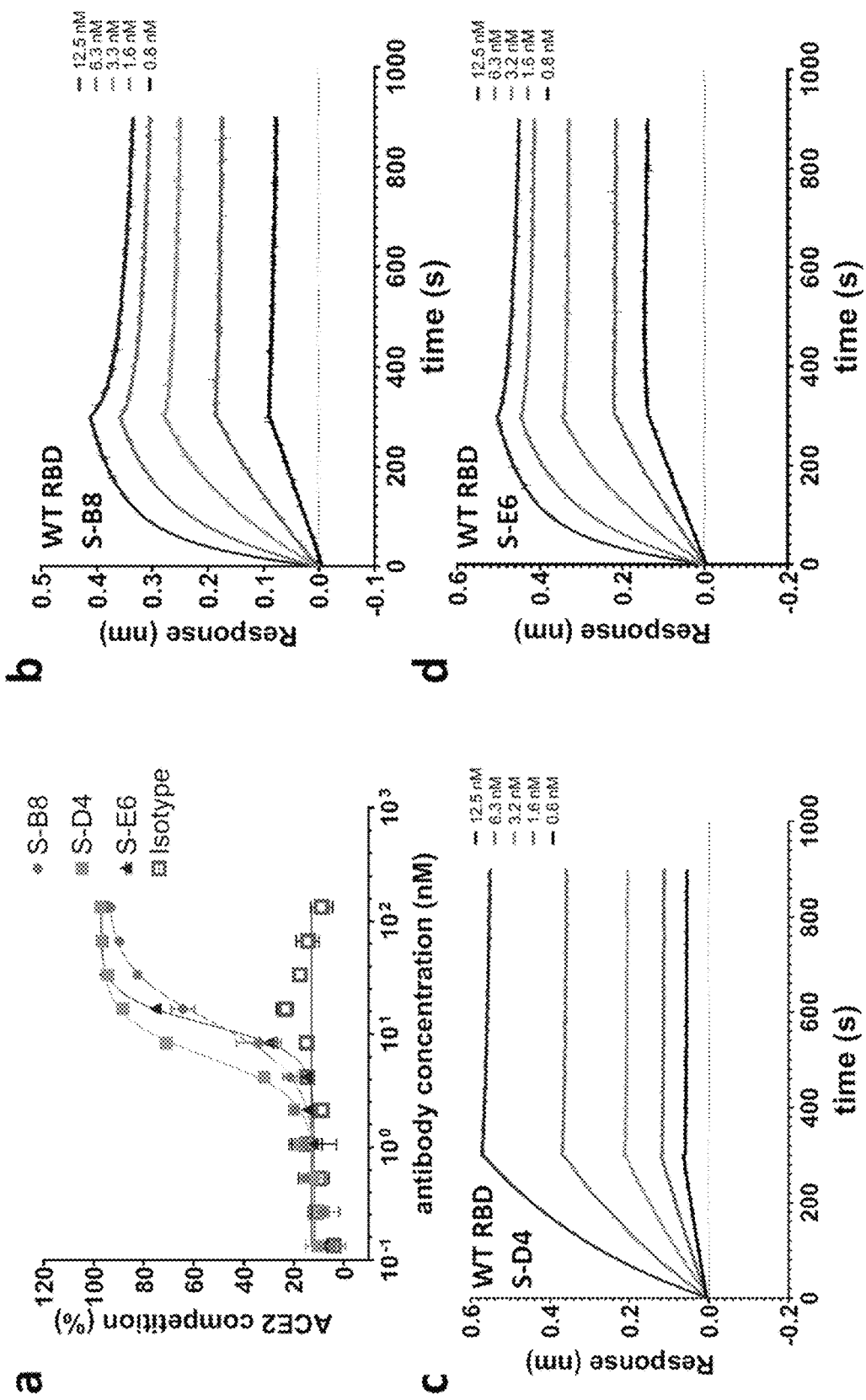
FIG. 3 Competitive ELISA of antibodies with hACE2 and binding kinetics to the spike protein. a The three antibodies were titrated for competition with hACE2-ECD for binding to S-RBD and the fitting curves are shown. b-d Binding kinetics with wild-type (WT)S-RBD were measured by biolayer interferometry (BLI). Biotinylated S-RBD was loaded onto the SA biosensor for detection of binding kinetics with S-B8 (b) and S-E6 (d), while S-RBD amine coupled onto AR2G sensor was utilized for S-D4 (c), with detection on an Octet. All curves were fitted by a 1:1 binding model using the Data Analysis software (Forte Bio). e-g Binding kinetics with N501Y S-RBD were measured by biolayer interferometry (BLI). The method used was same as above, binding curves of S-B8 (e), S-D4 (f) and S-E6 (g) were shown. h The association-rate ($k_{on}$), dissociation-rate ($k_{off}$) and dissociation constant ($K_D$) of the three competitive antibodies to WT S-RBD and N501Y S-RBD are shown.
Figure 3:
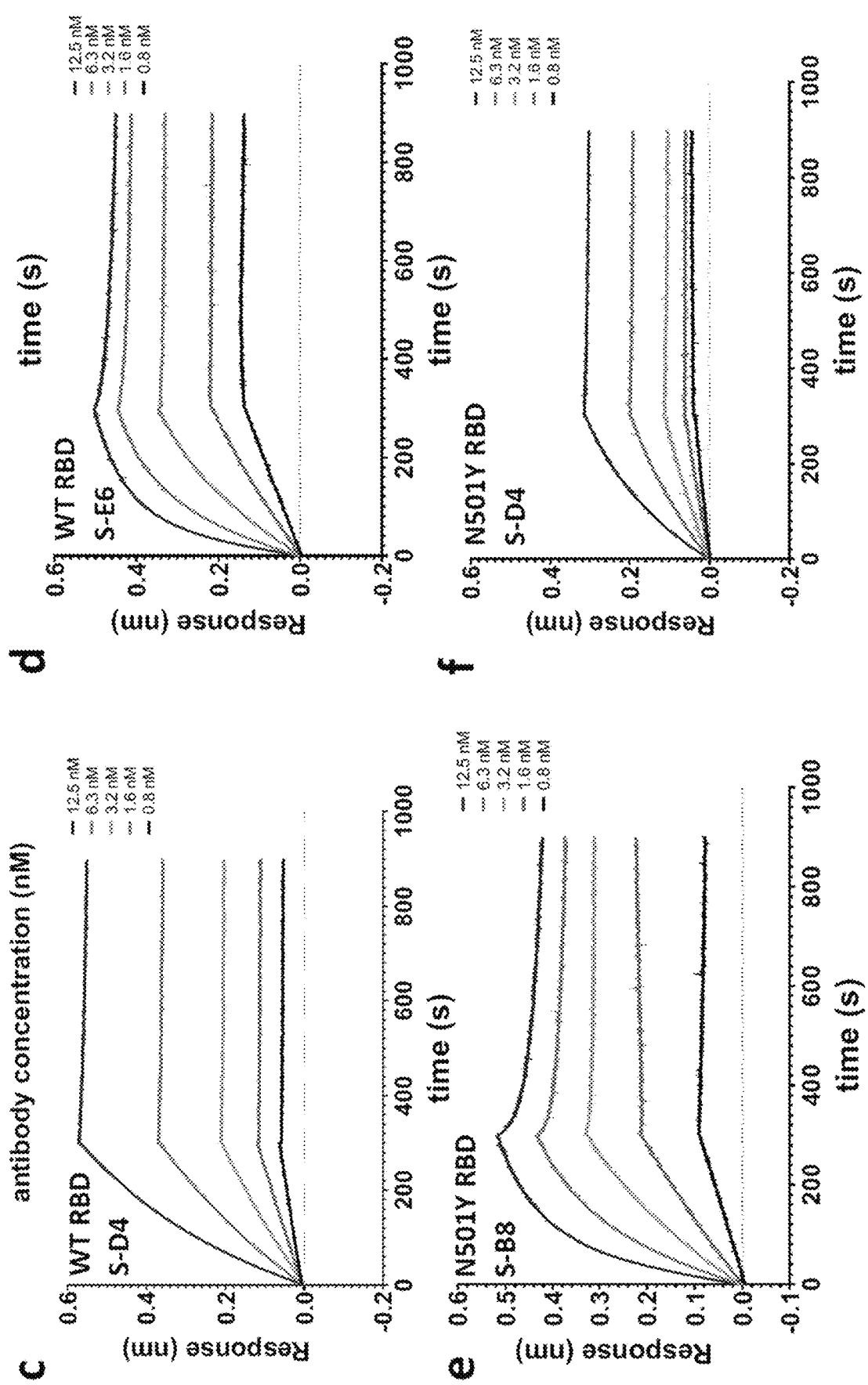
Figure 3:
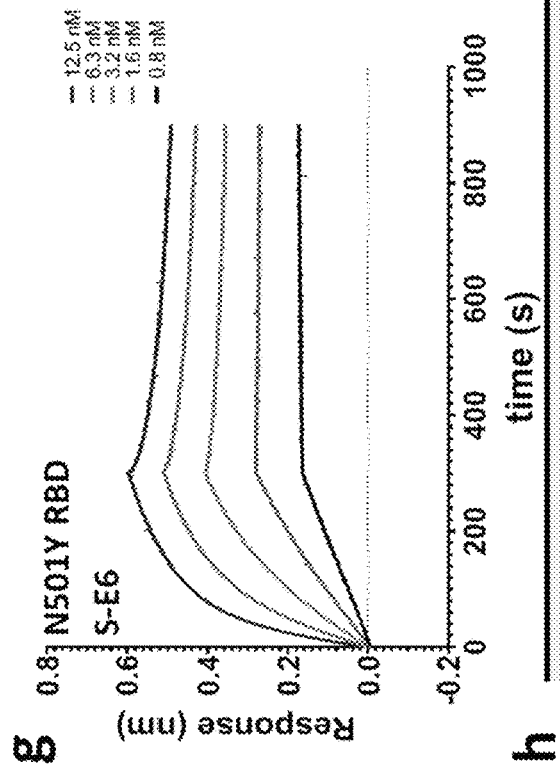
Figure 5:
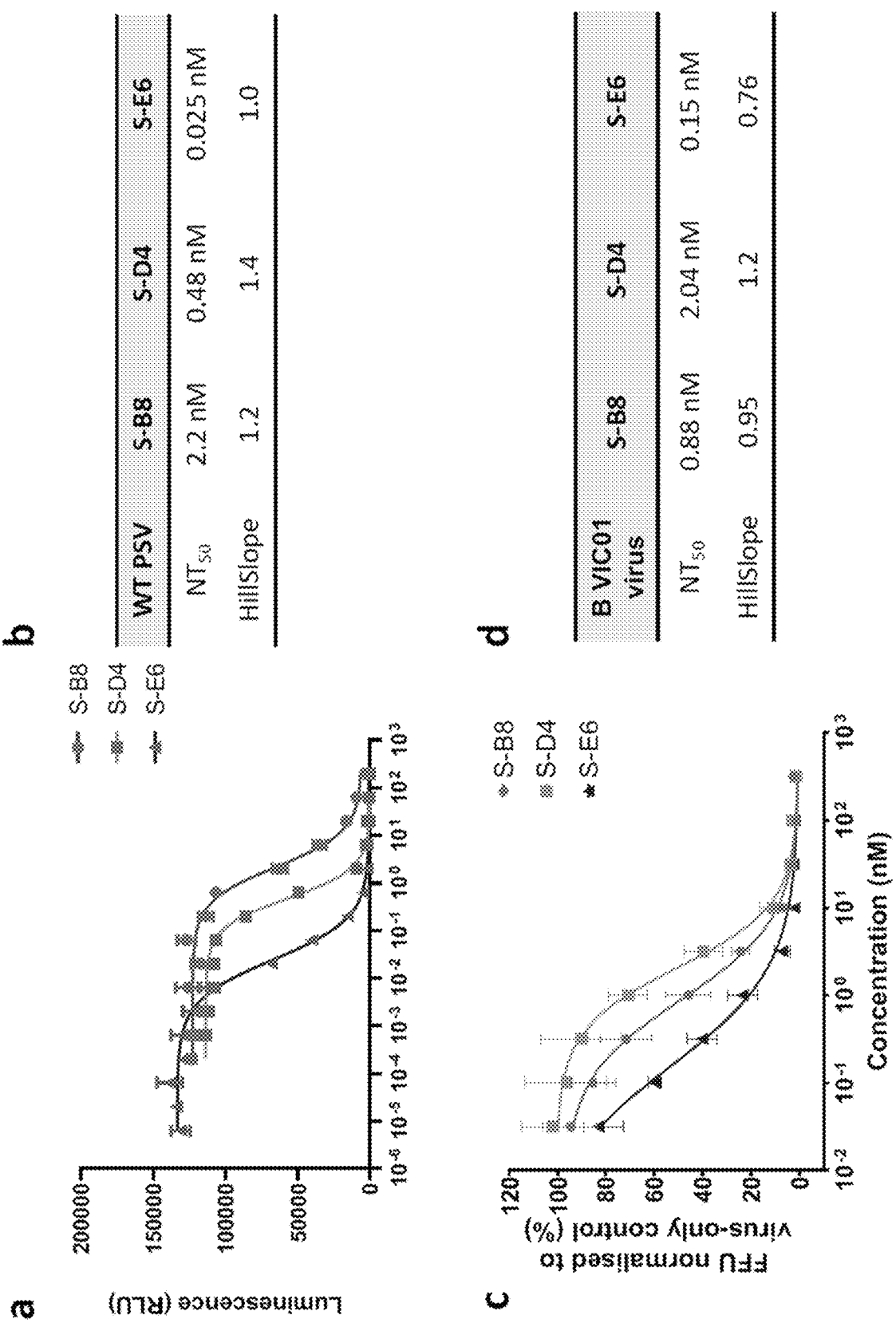
FIG. 5 Neutralization assay for the hACE2 competitive antibodies. a Neutralization ability of the three hACE2 competitive antibodies to WT SARS-CoV-2 pseudovirus was tested and fitted. c A microneutralization assay was adopted for testing of the three antibodies. $NT_{50}$ and HillSlope for each antibody on authentic SARS-CoV-2 are summarized in b and d. e, f Neutralization ability of the three hACE2 competitive antibodies to SARS-CoV-2 N501Y+D614G mutant pseudovirus was tested and fitted, $NT_{50}$ and HillSlope are shown. g Neutralization of three antibodies to real virus B.1.1.7 strain, $NT_{50}$ and HillSlope for each antibody are shown in h.
Figure 5:
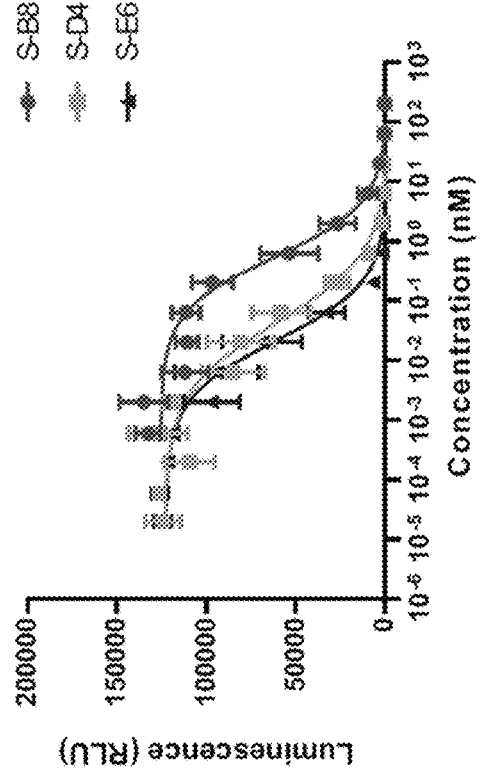
Figure 5:
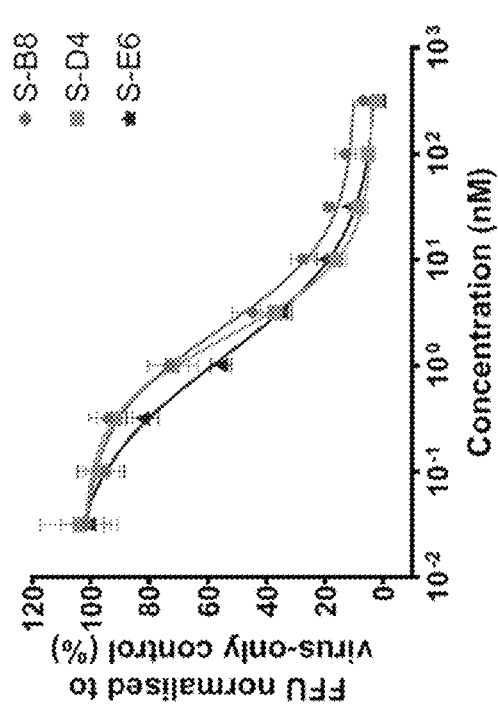
Figure 7:
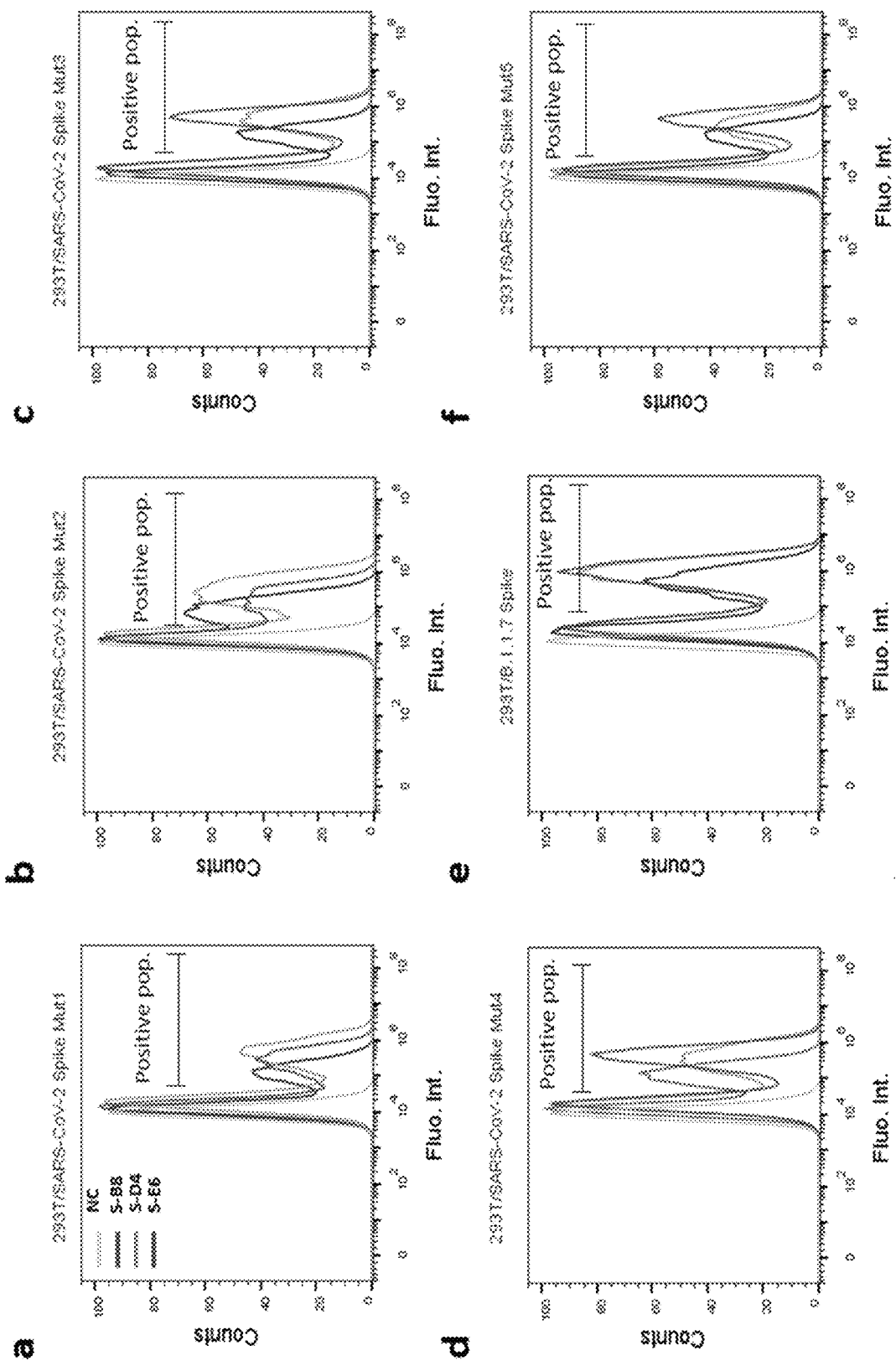
FIG. 7 FACS analysis of antibody binding to cell surface-expressed mutated spike protein. HEK293T cells transfected with expression plasmid encoding the mutated full-length spike of SARS-CoV-2 were incubated with the three hACE2 competitive IgG4 antibodies. The cells were then stained with FITC labeled anti-human IgG Fc secondary antibody and analyzed by FACS. Cells stained with only secondary antibody were set as negative control (NC). Positive binding cells populations were labeled as positive pop. a Mut1: D215H, b Mut2: S247R, c Mut3: D614G, d Mut4: N439K+D614G, e B.1.1.7: spike of U.K. variant, f Mut5: N501Y+D614G, g Mut 6: N501Y+E484K+D614G, h Mut 7: N501Y+E484K+K417N+D614G, i Mut 8: N501Y+K417N+D614G. Grey line: NC, Red line: S-B8, Green line: S-D4, Blue line: S-E6. j Mean Fluorescent Intensity of Abs to each mutant are listed.
Figure 7:
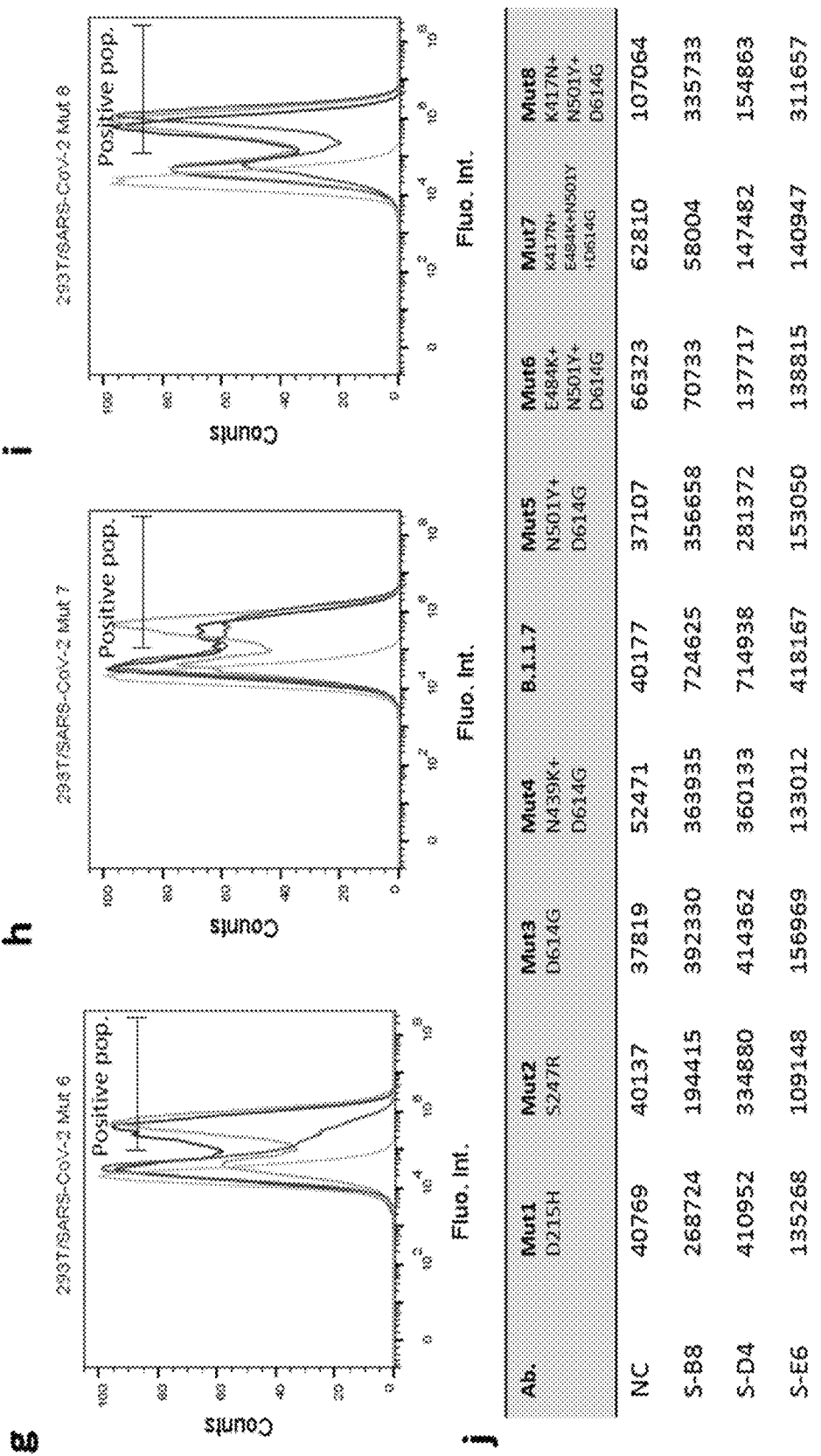

The three antibodies, S-B8, S-D4 and S-E6, all competed strongly with the human ACE2 protein in binding to the S RDB, in a dose-dependent manner (FIG. 3). Moreover, they showed potent neutralization against wild-type SARS-CoV-2 PSV infection in a dose-dependent manner (FIG. 5). Also importantly, these antibodies were able to bind to certain natural mutants of the spike protein, such as D215H, S247R, D614G, N439K+D614G, N501Y+D614G, E484K+N501Y+D614G, K417N+E484K+N501Y+D614G, and K417N+N501Y+D614G (FIG. 7). These data demonstrate that these antibodies can be suitable therapeutic agents against these natural SARS-CoV-2 variants.

In accordance with one embodiment of the present disclosure, therefore, provided is an antibody or fragment thereof that has specificity to the SARS-CoV-2 spike protein. The antibody or fragment includes a heavy chain variable region (VH) comprising heavy chain complementarity determining regions CDRH1, CDRH2, and CDRH3, and a light chain variable region (VL) comprising light chain complementarity determining regions CDRL1, CDRL2, and CDRL3.

In some embodiments, the CDRH1, CDRH2, CDRH3, CDRL1, CDRL2, and CDRL3 have the CDR sequences of those antibodies disclosed herein, such as those provided in Tables 1A-1E.

In one embodiment, the reference antibody is S-B8, which has a VH sequence of SEQ ID NO:1 and a VL sequence of SEQ ID NO:2. Its CDR sequences are SEQ ID NO:5-10 according to Kabat numbering, and SEQ ID NO:11-16 according to Chothia numbering. In some embodiments, the antibody or fragment thereof of the disclosure has CDRH1, CDRH2, CDRH3, CDRL1, CDRL2, and CDRL3 having the amino acid sequences of SEQ ID NO:5-10, respectively. In some embodiments, the antibody or fragment thereof of the disclosure has CDRH1, CDRH2, CDRH3, CDRL1, CDRL2, and CDRL3 having the amino acid sequences of SEQ ID NO:11-16, respectively.

In one embodiment, the reference antibody is S-D4, which has a VH sequence of SEQ ID NO:23 and a VL sequence of SEQ ID NO:24. Its CDR sequences are SEQ ID NO:27-32 according to Kabat numbering, and SEQ ID NO:33-38 according to Chothia numbering. In some embodiments, the antibody or fragment thereof of the disclosure has CDRH1, CDRH2, CDRH3, CDRL1, CDRL2, and CDRL3 having the amino acid sequences of SEQ ID NO:27-32, respectively. In some embodiments, the antibody or fragment thereof of the disclosure has CDRH1, CDRH2, CDRH3, CDRL1, CDRL2, and CDRL3 having the amino acid sequences of SEQ ID NO:33-38, respectively.

In one embodiment, the reference antibody is S-E6, which has a VH sequence of SEQ ID NO:45 and a VL sequence of SEQ ID NO:46. Its CDR sequences are SEQ ID NO:49-54 according to Kabat numbering, and SEQ ID NO:55-60 according to Chothia numbering. In some embodiments, the antibody or fragment thereof of the disclosure has CDRH1, CDRH2, CDRH3, CDRL1, CDRL2, and CDRL3 having the amino acid sequences of SEQ ID NO:49-54, respectively. In some embodiments, the antibody or fragment thereof of the disclosure has CDRH1, CDRH2, CDRH3, CDRL1, CDRL2, and CDRL3 having the amino acid sequences of SEQ ID NO:55-60, respectively.

In one embodiment, the reference antibody is S-B2, which has a VH sequence of SEQ ID NO:67 and a VL sequence of SEQ ID NO:68. Its CDR sequences are SEQ ID NO:71-76 according to Kabat numbering, and SEQ ID NO:77-82 according to Chothia numbering. In some embodiments, the antibody or fragment thereof of the disclosure has CDRH1, CDRH2, CDRH3, CDRL1, CDRL2, and CDRL3 having the amino acid sequences of SEQ ID NO:71-76, respectively. In some embodiments, the antibody or fragment thereof of the disclosure has CDRH1, CDRH2, CDRH3, CDRL1, CDRL2, and CDRL3 having the amino acid sequences of SEQ ID NO:77-82, respectively.

In one embodiment, the reference antibody is S-D9, which has a VH sequence of SEQ ID NO:85 and a VL sequence of SEQ ID NO:86. Its CDR sequences are SEQ ID NO:89-94 according to Kabat numbering, and SEQ ID NO:95-100 according to Chothia numbering. In some embodiments, the antibody or fragment thereof of the disclosure has CDRH1, CDRH2, CDRH3, CDRL1, CDRL2, and CDRL3 having the amino acid sequences of SEQ ID NO:89-94, respectively. In some embodiments, the antibody or fragment thereof of the disclosure has CDRH1, CDRH2, CDRH3, CDRL1, CDRL2, and CDRL3 having the amino acid sequences of SEQ ID NO:95-100, respectively.

Also provided, in one embodiment, is an antibody or fragment thereof, wherein the antibody or fragment thereof has specificity to the SARS-CoV-2 spike protein, and competes with an antibody or fragment thereof of the present disclosure in binding to the SARS-CoV-2 spike protein, or binds to the same epitope as the antibody or fragment thereof. In one embodiment, the antibody or fragment thereof is a blocking antibody or fragment thereof. In one embodiment, the antibody or fragment thereof is a non-blocking antibody or fragment thereof.

In various embodiments, the antibody can be, for example, a human antibody. In other embodiments, the VH and/or VL amino acid sequences can have at least 85%, 90%, 95%, 96%, 97%, 98%, or 99% sequence identify to the sequences set forth above. An antibody having $V_H$ and $V_L$ regions having high (i.e., 80% or greater) homology to the $V_H$ and $V_L$ regions of the sequences set forth above, can be obtained by mutagenesis (e.g., site-directed or PCR-mediated mutagenesis) of nucleic acids of $V_H$ and/or $V_L$ amino acid sequences, followed by testing of the encoded altered antibody for retained function (i.e., the functions set forth above) using the functional assays described herein.

The CDR regions recited in this disclosure can also be changed to each of its biological variants. A biological variant of CDR sequence is derived from the original sequence by one, two or three amino acid addition, deletion and/or substitutions. In some embodiments, the substitution is conservative amino acid substitution.

A "conservative amino acid substitution" is one in which the amino acid residue is replaced with an amino acid residue having a similar side chain. Families of amino acid residues having similar side chains have been defined in the art, including basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), nonpolar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine). Thus, a nonessential amino acid residue in an immunoglobulin polypeptide is preferably replaced with another amino acid residue from the same side chain family. In another embodiment, a string of amino acids can be replaced with a structurally similar string that differs in order and/or composition of side chain family members.

Trimeric Antibodies

The instant discovered that trimeric formats of the instant antibodies exhibited higher neutralization activities than their dimer counterparts. Also importantly and yet unexpectedly, the trimeric format neutralized the immune-escape strain B.1.351 (beta) potently with an $NT_{50}$ of 36 pM and completely neutralized another immune-escape strain, B.1.617.2 (delta), with an $NT_{50}$ of 7 pM.

Example 3 systematically compared the effects of different trimeric tags, linkers between antibody and trimeric tags for the antibody neutralization. It was discovered that fusing with the T4F tag with a flexible linker (e.g., G4S) resulted in significantly increased binding avidity of S-E6 to spike RBD. Also surprisingly, it neutralized the immune-escape variant (E484K, K417N, N501Y, and D614G) pseudovirus (PSV) ultrapotently with $NT_{50}$ of 0.036 nM, and shows an 8.9-fold increase of potency against B.1.617.2 PSV. By applying this trimeric format engineering method to other RMB-engaging nAbs, similar neutralizing effects enhancement resulted. The $NT_{50}$ values can improve up to 30-fold.

Based on the interaction epitopes, nAbs have been divided into three classes (Chen, et al., *Nature Medicine* 2021, 27). Class 1 antibodies block soluble hACE2 binding and bind multiple proximal sites in the receptor binding motif (RBM) of the RBD. Class 2 nAbs bind the base of the RBD of the spike protein. Class 3 nAbs recognize the NTD of the spike protein. The instant data show that class 1 antibodies achieved the best enhancement by reformatting to trimers. Class 2 and class 3 antibodies, however, showed similar $NT_{50}$ with impaired inhibition rates.

The sequence of the spike protein is known (Table A) Amino acids 11-304 constitutes the N-terminal domain (NTD), and amino acid 319-541 constitute the receptor binding domain (RBD) Amino acid residues within the receptor binding motif (RBM) include 438, 447-456, 489-495, and 507-508 (shown in boxed in Table A).

TABLE A

Sequence and domains of SARS-CoV-2 Spike Protein (SEQ ID NO: 126)

```
   1 MFVFLVLLPL VSSQCVNLTT RTQLPPAYTN SFTRGVYYPD KVFRSSVLHS TQDLFLPFFS
  61 NVTWFHAIHV SGTNGTKRFD NPVLPFNDGV YFASTEKSNI IRGWIFGTTL DSKTQSLLIV
 121 NNATNVVIKV CEFQFCNDPF LGVYYHKNNK SWMESEFRVY SSANNCTFEY VSQPFLMDLE
 181 GKQGNFKNLR EFVFKNIDGY FKIYSKHTPI NLVRDLPQGF SALEPLVDLP IGINITRFQT
 241 LLALHRSYLT PGDSSSGWTA GAAAYYVGYL QPRTFLLKYN ENGTITDAVD CALDPLSETK
 301 CTLKSFTVEK GIYQTSNFRV QPTESIVRFP NITNLCPFGE VFNATRFASV YAWNRKRISN
 361 CVADYSVLYN SASFSTFKCY GVSPTKLNDL CFTNVYADSF VIRGDEVRQI APGQTGKIAD
 421 YNYKLPDDFT GCVIAWNSNN LDSKVGGNYN YLYRLFRKSN LKPFERDIST EIYQAGSTPC
 481 NGVEGFNCYF PLQSYGFQPT NGVGYQPYRV VVLSFELLHA PATVCGPKKS TNLVKNKCVN
 541 FNFNGLTGTG VLTESNKKFL PFQQFGRDIA DTTDAVRDPQ TLEILDITPC SFGGVSVITP
 601 GTNTSNQVAV LYQDVNCTEV PVAIHADQLT PTWRVYSTGS NVFQTRAGCL IGAEHVNNSY
 661 ECDIPIGAGI CASYQTQTNS PRRARSVASQ SIIAYTMSLG AENSVAYSNN SIAIPTNPTI
 721 SVTTEILPVS MTKTSVDCTM YICGDSTECS NLLLQYGSFC TQLNRALTGI AVEQDKNTQE
 781 VPAQVKQTYK TPPIKDPGGF NPSQILPDPS KPSKRSPIED LLFNKVTLAD AGPIKQYGDC
 841 LGDIAARDLI CAQKFNGLTV LPPLLTDEMI AQYTSALLAG TITSGWTPGA GAALQIPFAM
 901 QMAYRPNGIG VTQNVLYENQ KLIANQFNSA IGKIQDSLSS TASALGKLQD VVNQNAQALN
 961 TLVKQLSSNF GAISSVLNDI LSRLDKVEAE VQIDRLITGR LQSLQTYVTQ QLIRAAEIRA
1021 SANLAATKMS ECVLGQSKRV DFCGKGYHLM SFPQSAPHGV VFLHVTYVPA QEKNFTTAPA
1081 ICHDGKAHFP REGVFVSNGT HWFVTQRNFY EPQIITTDNT PVSGNCDVVI GIVNNTVYDP
1141 LQPELDSFKE ELDKYFKNHT SPDVDLGDIS GINASVVNIQ KEIDRLNEVA KNLNESLIDL
```

TABLE A-continued

Sequence and domains of SARS-CoV-2 Spike Protein (SEQ ID NO: 126)

1201 QELGKYEQYI KWPWYIWLGF IAGLIAIVMV TIMLCCMTSC CSCLKGCCSC GSCCKFDEDD

1261 SEPVLKGVKL HYT

In accordance with one embodiment of the present disclosure, therefore, provided is a trimeric antibody that includes an antibody or fragment fused to a trimerization domain.

As demonstrated, the antibody or antigen-binding fragment has binding specificity to the SARS-CoV-2 spike protein, and preferably binds to the receptor binding motif (RBM) of the receptor binding domain (RBD) (class 1 neutralization antibody). The RBM is known to include amino acid residues 438, 447-456, 489-495, and 507-508 of SEQ ID NO: 126. Therefore, in some embodiments, the antibody or antigen-binding fragment has binding specificity to the SARS-CoV-2 spike protein and binds to at least one of residues 438, 447-456, 489-495, and 507-508 of SEQ ID NO: 126.

In some embodiments, the antibody or antigen-binding fragment includes VH and VL sequences as exemplified in the instant application. For instance, the antibody or fragment thereof comprises a heavy chain variable region (VH) comprising heavy chain complementarity determining regions CDRH1, CDRH2, and CDRH3, and a light chain variable region (VL) comprising light chain complementarity determining regions CDRL1, CDRL2, and CDRL3. In some embodiments, the CDRH1, CDRH2, CDRH3, CDRL1, CDRL2, and CDRL3, respectively, comprise the amino acid sequences of (a) SEQ ID NO:5-10; (b) SEQ ID NO:27-32; (c) SEQ ID NO:49-54; (d) SEQ ID NO:71-76; or (e) SEQ ID NO:89-94. In some embodiments, the antibody or fragment thereof does not bind to the SARS-CoV spike protein.

The antibody or antigen-binding fragment in the trimeric antibody can take any format known in the art, such as a Fab fragment, a scFv fragment, or a nanobody. When a Fab fragment is used, as demonstrated herein, the VH and VL further include CH1 and CL, respectively. In some embodiments, the trimerization domain is fused to the CH1. In some embodiments, the trimerization domain is fused to the CL.

A trimerization domain is a peptide sequence that is capable of mediating stable association of a trimeric molecule. Trimerization domains are known in the art, such as the domains in trimeric proteins responsible for mediating association of the trimeric protein.

Example trimerization domains include the T4 bacteriophage fibritin trimerization motif (T4F), the GCN4 trimeric leucine zipper motif (GCN4), and the human collagen XVIII derived homotrimerization domain (TIE). Example sequences are provided in SEQ ID NO:103, 107 and 111. A preferred trimerization domain is T4F (SEQ ID NO:103). In some embodiments, the trimerization domain is not longer than 100 amino acids, or not longer than 90, 80, 70, 60, or 50 amino acids.

In some embodiments, the fusion protein further includes a peptide linker between the antibody or antigen binding fragment and the trimerization domain. In some embodiments, the peptide linker is flexible, such as SEQ ID NO:122 or 123.

In some embodiments, the distance between antibody or antigen binding fragment and the trimerization domain is not longer than 100 amino acids, or not longer than 90, 80, 70, 60, 50, 40, 30, 25, 20, 15 or 10 amino acids. In some embodiments, the peptide linker is from 5 to 50 amino acid residues in length, preferably from 5 to 20 amino acid residues in length.

Bi-Functional Molecules

In some embodiments, the present disclosure provides bifunctional or bispecific molecules comprising an anti-spike protein antibody/fragment linked to at least one other functional molecule, e.g., another peptide or protein (e.g., another antibody or ligand for a receptor) to generate a bifunctional or bispecific molecule that binds to at least two different binding sites or target molecules. Thus, as used herein, "bispecific molecule" includes molecules that have three or more specificities. In a preferred embodiment, the bispecific molecule comprises a first binding specificity for the SARS-CoV-2 spike protein and a second binding specificity for a triggering molecule that recruits cytotoxic effector cells that can kill the SARS-CoV-2 virus. Examples of suitable triggering molecules are CD64, CD89, CD16, and CD3. See, e.g., Kufer et al., Trends in Biotech. 22(5):238-44, 2004.

In some embodiments, the second function/specificity can be for an anti-enhancement factor (EF), e.g., a molecule that binds to a surface protein involved in cytotoxic activity and thereby increases the immune response against the target virus or an infected cell. For example, the anti-enhancement factor can bind a cytotoxic T cell (e.g. via CD2, CD3, CD5, CD28, CD4, CD40, or ICAM-1), other immune regulatory molecules (e.g. via PD-1, PD-L1, CTLA-4, CD122, 4-1BB, TIM3, OX-40, OX40L, CD40L, LIGHT, ICOS, ICOSL, GITR, GITRL, TIGIT, CD27, VISTA, B7H3, B7H4, HEVM, BTLA, KIR, CD47 or CD73) or other immune cell, resulting in an increased immune response against the virus or an infected cell.

Bifunctional/bispecific molecules also encompass bi-epitopic ones, which have a first specificity to one portion of a target antigen and a second specificity to another portion of the same antigen. The other portion may or may not overlap with the first portion. In some embodiments, the binding to other portion may not, on its own, has the intended blocking activity, but enhances the activity of the first specificity. The enhancement, without being bound by any particular theory, may be due to tighter binding or stabilized conformation. In some embodiments, both bindings can independently exhibit the desired activities.

Bifunctional molecules that include not just antibody or antigen binding fragment are also provided. As a tumor antigen targeting molecule, an antibody or antigen-binding fragment specific to the spike protein, such as those described here, can be combined with an immune cytokine or ligand optionally through a peptide linker. The linked immune cytokines or ligands include, but not limited to, IL-2, IL-3, IL-4, IL-5, IL-6, IL-7, IL-10, IL-12, IL-13, IL-15, GM-CSF, TNF-α, CD40L, OX40L, CD27L, CD30L, 4-1BBL, LIGHT and GITRL.

Bispecific molecules can come in many different formats and sizes. At one end of the size spectrum, a bispecific molecule retains the traditional antibody format, except that, instead of having two binding arms of identical specificity, it has two binding arms each having a different specificity. At the other extreme are bispecific molecules consisting of two single-chain antibody fragments (scFv's) linked by a peptide chain, a so-called Bs(scFv)$_2$ construct. Intermediate-sized bispecific molecules include two different F(ab) fragments linked by a peptidyl linker. Bispecific molecules of these and other formats can be prepared by genetic engineering, somatic hybridization, or chemical methods. See, e.g., Kufer et al., supra; Cao and Suresh, Bioconjugate Chem. 9(6):635-44, 1988; and van Spriel et al., Immunol. Today 21(8):391-7, 2000; and the references cited therein.

Combinations and Pharmaceutical Compositions

In one embodiment, the treatment methods can further include administration of an effective amount of another agent. In some embodiments, the anti-spike protein antibody or fragment is co-administered with an effective amount of another agent. In some embodiments, the second agent is also an anti-spike antibody of fragment thereof. In some embodiments, the second agent is co-administered with the antibody or fragment thereof simultaneously or sequentially.

In some embodiments, the second agent is effective in reducing or inhibiting cytokine release storm. In some embodiments, the second agent is a corticosteroid. Non-limiting examples include methylprednisolone (in particular in patients with a rheumatic disease), dexamethasone (in particular in patients with FHLH).

In some embodiments, the second agent is a cytoablative therapy. Non-limiting examples include cyclophosphamide (in particular in patients with JIA and MAS), etoposide (in particular in patients with FHLH), rituximab (in particular in Epstein-Barr virus (EBV)-associated HLH), antithymocyte globulin (in particular for patients at bone marrow transplant phase of FHLH therapy), alemtuzumab (in particular in patients with FHLH or SLE-associated MAS).

In some embodiments, the second agent is a T-cell modulator. Non-limiting examples include calcineurin (e.g., cyclosporine) which prevents production of IL-2, and abatacept, which inhibits CD28 signaling of T cells. In some embodiments, the second agent is an anti-GM-CSF inhibitor or antibody.

In some embodiments, the second agent is a cytokine inhibitor, such inhibitors targeting INFγ, IL-1β, IL-18, IL-33, IL-6, and/or TNF.

In some embodiments, the second agent targets the underlying disease or condition, such as SARS-CoV-2 infection. Non-limiting examples include lopinavir, ritonavir, oseltamivir (Tamiflu), favipiravir, fingolimod, methylprednisolone, bevacizumab, chloroquine phosphate, chloroquine, hydroxychloroquine sulfate and remdesivir.

In another aspect, the present disclosure provides a pharmaceutical composition comprising an antibody of the present disclosure formulated together with a pharmaceutically acceptable earlier. It may optionally contain one or more additional pharmaceutically active ingredients, such as another antibody or a drug. The pharmaceutical compositions of the disclosure also can be administered in a combination therapy with, for example, an anti-viral agent, or a vaccine.

The pharmaceutical composition can comprise any number of excipients. Excipients that can be used include carriers, surface active agents, thickening or emulsifying agents, solid binders, dispersion or suspension aids, solubilizers, colorants, flavoring agents, coatings, disintegrating agents, lubricants, sweeteners, preservatives, isotonic agents, and combinations thereof. The selection and use of suitable excipients is taught in Gennaro, ed., Remington: *The Science and Practice of Pharmacy,* 20th Ed. (Lippincott Williams & Wilkins 2003), the disclosure of which is incorporated herein by reference. Preferably, a pharmaceutical composition is suitable for intravenous, intramuscular, subcutaneous, parenteral, spinal or epidermal administration (e.g., by injection or infusion). Depending on the route of administration, the active compound can be coated in a material to protect it from the action of acids and other natural conditions that may inactivate it. The phrase "parenteral administration" as used herein means modes of administration other than enteral and topical administration, usually by injection, and includes, without limitation, intravenous, intramuscular, intraarterial, intrathecal, intracapsular, intraorbital, intracardiac, intradermal, intraperitoneal, transtracheal, subcutaneous, subcuticular, intraarticular, subcapsular, subarachnoid, intraspinal, epidural and intrasternal injection and infusion. Alternatively, an antibody of the disclosure can be administered via a non-parenteral route, such as a topical, epidermal or mucosal route of administration, e.g., intranasally, orally, vaginally, rectally, sublingually or topically.

Pharmaceutical compositions can be in the form of sterile aqueous solutions or dispersions. They can also be formulated in a microemulsion, liposome, or other ordered structure suitable to high drug concentration.

The amount of active ingredient which can be combined with a carrier material to produce a single dosage form will vary depending upon the subject being treated and the particular mode of administration and will generally be that amount of the composition which produces a therapeutic effect. Generally, out of one hundred percent, this amount will range from about 0.01% to about ninety-nine percent of active ingredient, preferably from about 0.1% to about 70%, most preferably from about 1% to about 30% of active ingredient in combination with a pharmaceutically acceptable carrier.

Dosage regimens are adjusted to provide the optimum desired response (e.g., a therapeutic response). For example, a single bolus can be administered, several divided doses can be administered over time or the dose can be proportionally reduced or increased as indicated by the exigencies of the therapeutic situation. It is especially advantageous to formulate parenteral compositions in dosage unit form for ease of administration and uniformity of dosage. Dosage unit form as used herein refers to physically discrete units suited as unitary dosages for the subjects to be treated; each unit contains a predetermined quantity of active compound calculated to produce the desired therapeutic effect in association with the required pharmaceutical carrier. Alternatively, antibody can be administered as a sustained release formulation, in which case less frequent administration is required.

For administration of the antibody, the dosage ranges from about 0.0001 to 100 mg/kg, and more usually 0.01 to 5 mg/kg, of the host body weight. For example, dosages can be 0.3 mg/kg body weight, 1 mg/kg body weight, 3 mg/kg body weight, 5 mg/kg body weight or 10 mg/kg body weight or within the range of 1-10 mg/kg. An exemplary treatment regime entails administration once per week, once every two weeks, once every three weeks, once every four weeks, once a month, once every 3 months or once every 3 to 6 months. Preferred dosage regimens for an antibody of the disclosure include 1 mg/kg body weight or 3 mg/kg body weight via intravenous administration, with the antibody being given using one of the following dosing schedules: (i) every four weeks for six dosages, then every three months; (ii) every three weeks; (iii) 3 mg/kg body weight once followed by 1 mg/kg body weight every three weeks. In some methods, dosage is adjusted to achieve a plasma antibody concentration of about 1-1000 μg/mL and in some methods about 25-300 μg/mL.

A "therapeutically effective dosage" of an antibody of the disclosure preferably results in a decrease in severity of disease symptoms, an increase infrequency and duration of disease symptom-free periods, or a prevention of impairment or disability due to the disease affliction. For example, for the treatment of tumor bearing subjects, a "therapeutically effective dosage" preferably inhibits tumor growth by at least about 20%, more preferably by at least about 40%, even more preferably by at least about 60%, and still more preferably by at least about 80% relative to untreated subjects. A therapeutically effective amount of a therapeutic compound can decrease tumor size, or otherwise ameliorate symptoms in a subject, which is typically a human or can be another mammal.

Uses and Methods

The antibodies, antibody compositions and methods of the present disclosure have numerous in vitro and in vivo utilities involving, for example, detection of a SARS-CoV-2 spike protein or preventing or treating SARS-CoV-2 viral infection. In a preferred embodiment, the antibodies of the present disclosure are human antibodies. For example, these molecules can be administered to cells in culture, in vitro or ex vivo, or to human subjects, e.g., in vivo, to enhance immunity in a variety of situations. Accordingly, in one aspect, the disclosure provides a method of modifying an immune response in a subject comprising administering to the subject the antibody, or antigen-binding portion thereof, of the disclosure such that the immune response in the subject is modified. Preferably, the response is enhanced, stimulated or up-regulated.

Preferred subjects include human patients infected with the SARS-CoV-2 virus or is at risk of developing SARS-CoV-2 infection.

The disclosure further provides methods for detecting the presence of a SARS-CoV-2 virus in a sample, or measuring the amount of the SARS-CoV-2 virus, comprising contacting the sample, and a control sample, with an antibody or an antigen binding thereof of the present disclosure, under conditions that allow for formation of a complex between the antibody or portion thereof and the SARS-CoV-2 spike protein. The formation of a complex is then detected, wherein a difference complex formation between the sample compared to the control sample is indicative the presence of a SARS-CoV-2 virus in the sample. Moreover, the antibodies of the disclosure can be used to purify SARS-CoV-2 spike proteins.

EXAMPLES

The following examples are included to demonstrate preferred embodiments of the disclosure. It should be appreciated by those of skill in the art that the techniques disclosed in the examples which follow represent techniques discovered by the inventors to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the concept, spirit and scope of the disclosure. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the disclosure as defined by the appended claims.

Example 1. Identification of Human Antibodies

This example reports the selection of three potent SARS-CoV-2 antibodies, S-E6, S-B8 and S-D4, from a pre-pandemic human combinatorial antibody library.

Two of these antibodies showed highly potent neutralization effects with apparent neutralizing NT50 as low as 0.025 nM to pseudovirus and 0.25 nM to authentic SARS-CoV-2 virus. Antibody germline classification suggests that the most potent antibody, S-E6, is derived from a less common germline, IGHV4-31, compared to the most frequent IGHV3-53/3-66, IGHV1-2 or IGHV3-30 germlines reported so far. Furthermore, a high level of somatic hypermutation (up to 15 amino acids per molecule) was found for all three antibodies, despite being derived from different germline genes. X-ray structural studies revealed that these S-E6 and S-B8 antibodies bind to the receptor binding site, but with different angles of approach to the RBD and slightly different epitopes.

Materials and Methods:

Cell Culture

The Vero cell line (ATCC® CCL-81™) was maintained in a DMEM/F-12k media (Gibco, C11330500CP) containing 10% (v/v) FBS (Gibco, 1600074). The FreeStyle™ 293-F (HEK 293F, ThermoFisher Scientific, R79007) cell line was cultured in a Freestyle 293 expression media (ThermoFisher Scientific, 12338026). For establishing the HEK293T/hACE2 stable cell line, HEK293T cells (ATCC® ACS4500™) were transiently transfected with hACE2 fusion BFP encoding PB510 plasmid using PiggyBac Transposon System (System Biosciences, PB210PA-1), followed by addition of 2 μg/mL puromycin 6 h post-transfection. The resulting cells were kept in puromycin-containing media for an extra 2 days. Positive cells with BFP expression were sorted by a flow cytometry instrument (BD FACS Aria III). The sorted cells with overexpressed hACE2 were expanded and cultured in a DMEM media (Gibco, 10566016) supplemented with 10% FBS (v/v) and 10 μg/mL puromycin.

Expression and Purification of Recombinant SARS-CoV-2 Spike RBD, Human ACE2 and Antibodies The DNA sequences of codon-optimized SARS-CoV-2 Spike Receptor Binding Domain (S-RBD) and human ACE2 Extracellular Domain (hACE2-ECD) were cloned into a pFuse-Fc expression vector (Invivogen). A thrombin cleavage sequence was inserted between the RBD and Fc to generate a cleavable human Fc tag for future studies. The SARS-CoV-2 S-RBD-hFc and hACE2-ECD-mFc proteins were heterologously expressed in HEK293F cells by transient transfection and cultured for 4 days, then purified by Mabselect columns (Cytiva, 17-5199-01). Briefly, cell media with secreted Fc tagged recombinant proteins, 5-RBD-hFc and hACE2-ECD-mFc, were loaded onto a Mabselect column that was pre-washed and equilibrated with a PBS buffer (150 mM NaCl, 20 mM sodium phosphate, pH 7.2), and eluted using a pH 3.4 citrate acid buffer.

DNA sequences for the variable regions of the combinatorial antibodies were cloned into a full-length human IgG4 mutant construct (S228P) and expressed in HEK293F cells for 4 days and further purified by Mabselect chromatography. Purified recombinant proteins and antibodies were buffer-exchanged into a PBS buffer using centrifugal concentrators.

Function-Guided Phage Panning

SARS-CoV-2 S-RBD specific scFv antibodies were selected from a combinatorial human monoclonal scFv antibody phage library ($10^{11}$ members) after two rounds of affinity enrichment against the biotinylated S-RBD protein immobilized on the streptavidin-coated magnetic beads (Pierce, 21925), followed by a third round of competitive panning vs. hACE2-ECD protein. Briefly, phagemid (displaying the antibody library) binding to the antigen (S-RBD) was enriched at each cycle and eluted with Glycine-HCl (pH 2.2) in the first two rounds of screening. XL1-Blue cells were used to express and amplify the output phagemids for the next round of panning. To determine hACE2 competitive antibodies, a kinetic competitive panning method was adopted in the third round panning Instead of the conventional pH 2.2 buffer, an elution buffer containing a saturated concentration of hACE2-ECD protein (200 nM; for S-RBD and hACE2-ECD binding, $EC_{80}$=80 nM) was used to elute the phagemids twice. After three iterations, 96 positive colonies were selected and analyzed by phage ELISA. All of the positive clones were sequenced using Sanger sequencing. Both the DNA and protein sequences of CDR3 domains were analyzed using the international ImMunoGeneTics (IMGT) information platform (www.imgt.org).

Phage ELISA

Avidin (Pierce, 21121) was diluted to a final concentration of 2 ng/μL in a PBS buffer (Sigma, C3041). The resulting avidin solution was used to coat the 96-half well plates (25 μL/well) at 4° C. overnight. The coated plates were washed once with the PBS buffer (150 μL/well) followed by the addition and incubation of 25 μL biotinylated SARS-CoV-2 S-RBD-hFc solution (2 ng/μL) in each well at room temperature for 1 h. The PBST (PBS containing 0.05% Tween-20) buffer alone and the hFc solution (2 ng/μL) were used as the background and negative controls, respectively. After removal of the incubation solution, the resulting plates were rinsed once using the PBST buffer and incubated with a blocking solution containing 5% milk (v/v) in PBST (150 μL/well) at 37° C. for 1 h. After blocking and PBST washing (once), 50 μL of phagemid-containing XL1-Blue culture medium supernatants (by centrifuging the third round panning output XL1-Blue cells at 3000 g, 15 min) mixed with 10 μL 5% milk (v/v) in PBST was added to each well and incubated at 37° C. for 1 h. The resulting plates were rinsed eight times using PBST before subjecting to horseradish peroxidase (HRP) detection. A solution containing the secondary antibody, anti-M13 bacteriophage antibody conjugated with HRP (dilution factor 1:5000; Sino Biological, 11973-MM05T-H), was added into the above plates (150 μL/well) and incubated at 37° C. for 1 h. Plates were then washed eight times with PBST followed by the addition of 50 μL ABTS solution (Roche, 11684302001) into each well. After ~10 min incubation at room temperature, the absorbance change at 405 nm in each well was measured on a microplate reader (Enspire, PerkinElmer).

Competitive ELISA

Competition between the selected antibodies and hACE2 for binding to the SARS-CoV-2 spike protein RBD was measured. The recombinant hACE2-ECD was coated in PBS buffer at 2 ng/μL, 100 μL per well at 4° C. overnight, washed with PBS once, then blocked with 3% BSA in PBS. Biotinylated S-RBD (hFc tag removed by thrombin digestion) at a final concentration of 50 nM was incubated with 2-fold serial diluted S-B8, S-D4, and S-E6 antibodies (from 1-133 nM) at 4° C. for 30 min, in which an IgG4e1 isotype antibody was used as the negative control. The S-RBD and antibody mixture was then added to the hACE2-ECD coated plates and incubated at room temperature for 1 h, followed by 4 washes with PBST. The hACE2-ECD bound S-RBD in the plate was detected using a Streptavidin-HRP conjugated protein.

Affinity Determination by Biolayer Interferometry (BLI)

Binding affinities of S-D4 with SARS-CoV-2 wild-type or mutant S-RBD were performed by BLI on an Octet RED96 (Molecular Devices LLC, San Jose, CA, USA) using AR2G biosensors. The SARS-CoV-2 S-RBD fused hFc was first digested by thrombin to remove the Fc tag. The resulting S-RBD diluted in a PBS solution containing 0.02% Tween-20 and 0.05% BSA (PBST-B) (10 μg/mL) was loaded to the AR2G biosensor by amine coupling. The AR2G-S-RBD sensors were dipped into a PBST-B for 60 sec to establish a baseline, and then incubated with 2-fold serial diluted antibody solutions to record the progressive curves of association. Finally, sensors were incubated in a PBST-B buffer to record the progressive curves of dissociation. For S-B8 and S-E6 detections, S-RBD was first biotinylated before loading to a streptavidin (SA) sensor, the remaining procedure was same to that of S-D4. Sensor regeneration was performed by dipping the used sensors into a pH 3.4 citrate acid buffer, and equilibrated in a PBST-B buffer. Results were analyzed by ForteBio Data Analysis software.

Interaction of Antibodies with Cell Surface Expressed Spike by FACS

In a flow-cytometry binding experiment, the spike protein of either full-length SARS-CoV-2 or SARS, which was conjugated with P2A-EGFP, was transiently transfected into a HEK293T cell. After 24 h cultivation, cells were collected and re-suspended in an ice-cold FACS buffer (PBS, 0.05% BSA and 2 mM EDTA). The spike protein expressing cells (50,000 cells per tube) were then incubated with different anti-S-RBD antibodies for 20 min at 4° C., and washed with 1 mL ice-cold FACS buffer, spun, and re-suspended in a 100 μL ice-cold FACS buffer containing the Alexa555 conjugated secondary antibody that recognizes human Fc (1:800 v/v dilution, Life technology, A21433). After incubating at 4° C. for 15 min, the cells were washed twice and re-suspended in a FACS buffer, and then sorted and analyzed on a flow cytometer (CytoFLEX S, Beckman Culter) to determine relative binding level by the antibodies to the cell overexpressing wild-type spikes. Mean fluorescence intensities of Alexa555 in eGFP-positive cells were recorded and analyzed to evaluate antibody binding.

Size-Exclusion-High-Performance Liquid Chromatography (SEC-HPLC)

Twenty μL of 0.5 μg/μL purified S-RBD antibodies were applied to an Agilent Bio SEC-5, 500A HPLC system. The mobile phase used PBS buffer (pH 7.2) running at a flow rate of 0.35 mL/min. Absorbance was analyzed and integrated by retention time and area under the curve (AUC) to determine the percentage of aggregation, monomer and degradants compositions.

Cell-Cell Fusion Assay

The cell-cell fusion assay was established as follows. Briefly, hACE2 positive Vero cells (cells with endogenous hACE2 were sorted by FACS) were used as target cells. HEK293F cells that are transiently transfected with either SARS-CoV-2 spike-P2A-EGFP or SARS spike-P2A-EGFP were set as effector cells. The target Vero cells were first seeded into 24-well plates at a density of $1 \times 10^5$/well and cultivated at 37° C. for 4 h, followed by addition of effector cells, HEK293F/SARS spike-EGFP or HEK293F/SARS-CoV-2 spike-EGFP, at a ratio of 2:1, respectively. The co-cultures of cells were cultivated in a DMEM medium with 10% PBS, and treated with or without anti-SARS- CoV-2 spike antibodies at indicated concentrations. The recombinant SARS-CoV-2 S-RBD was used as a positive control. After cultivating at 37° C. for 6 h, the rates of cell-cell fusion were evaluated using a fluorescence microscope (EVOS M5000, Life Technologies). Five fields for microscopic analysis were randomly selected in each treated group, the numbers of fused and unfused EGFP positive cells were counted.

Preparation of Pseudovirus

HEK293T cells were co-transfected with both NL4-3 mCherry Luciferase plasmid (addgene, 44965) and pcDNA3.1 Wild-type or mutant SARS-CoV-2 spikeΔ19 plasmid (encoding SARS-CoV-2 spike protein, with 19 AA truncated in C terminal) using Lipofectamine 3000 (Invitrogen, L3000-015) following the manufacturer's instruction. Pseudotyped particles were readily released into the supernatant. The supernatants containing SARS-CoV-2 pseudovirus were harvested at 48 h post-transfection, filtered (0.45 μm pore size, Sartorius, 16533-K), and mixed with the Lenti-X Concentrator (Takara, 631231) overnight at 4° C. The mixture was then centrifuged at 1500 g for 45 min at 4° C. The cell pellets were collected and re-suspended in a DMEM medium and stored at −80° C. until use.

Pseudovirus-Based Neutralization Assay

To detect the neutralization ability of selected antibodies against infection of coronavirus pseudovirus (PSV), HEK293T/hACE2 cells were first seeded into 96-well white bottom plates at a density of $1\times10^4$/well, and cultivated overnight. The PSV was pre-incubated with an equal volume of different concentrations of selected antibodies (dilution factor: 3.16, from 200 nM to 200 fM for S-B8 and S-D4, 200 nM to 6.3 fM for S-E6) in DMEM at 37° C. for 30 min. DMEM with or without PSV in the absence of antibodies were set as controls. After incubation, the PSV mixture was transferred to the culture plates containing HEK293T/hACE2 cells. The DMEM media containing PSV and antibodies were replaced with fresh media after 16 h treatment, cells were incubated for an additional 48 h. PSV infection efficacy was evaluated by luciferase activity using Bright-Lumi™ Firefly Luciferase Reporter Gene Assay Kit (Beyotime, RG015M). Fifty microliter of luciferase substrate was added to each well, and the relative luminescence unit (RLU) values were measured on an Envision plate reader (PerkinElmer, Ensight).

Authentic SARS-CoV-2 Virus Neutralization Assay

The study was performed in the CL3 Facility of the University of Oxford operating under license from the HSE, on the basis of an agreed Code of Practice, Risk Assessments (under ACDP) and Standard Operating Procedures. In brief, this rapid, high-throughput assay determines the concentration of antibody that produces a 50% reduction in infectious focus-forming units of different authentic SARS-CoV-2 strains in Vero cells, as follows. Quadruplicate, 0.5 $\log_{10}$ serial dilutions of antibody (11 steps from 100 nM to 1 pM) were pre-incubated with a fixed dose of SARS-CoV-2 (Victoria 01/2020 isolate) before incubation with Vero cells. A 1.5% carboxymethyl cellulose-containing overlay was used to prevent satellite focus formation. Twenty hours post-infection, the monolayers were fixed with 4% paraformaldehyde, permeabilized with 2% Triton X-100 and stained for N antigen using mAb EY 2A. After development with a peroxidase-conjugated antibody and True Blue peroxidase substrate, infectious foci were enumerated by ELISPOT reader. Data were analyzed using four-parameter logistic regression (Hill equation) in GraphPad Prism 8.3.

Autoreactivity Assay

The autoreactivity assay was performed using a HEp-2 anti-nuclear antibodies (ANA) kit (Medical & Biological Laboratories Co., Ltd, 4220-12CN) according to the manufacturer's instructions. Briefly, 35 μL of 0.1 mg/mL antibodies were loaded to the wells in a slide pre-seeded with fixed and permeabilized HEp-2 cells and incubated for 20 min at room temperature. Positive serum from autoimmune patients and negative serum from healthy donors provided by the kit were used as controls. After washing twice (5 min each), the FITC-conjugated secondary anti-human antibody was incubated with the cells for 20 min at room temperature. The slide was then washed and mounted with a coverslip before observation on a fluorescent microscope (ZEISS, Axio Observer A1) with a 20× objective.

Protein Production and Structure Determination

The coding sequence for receptor binding domain (RBD; residues 319-541) of the SARS-CoV-2 spike (S) protein was synthesized and cloned into a customized pFastBac vector, which was designed to fuse an N-terminal gp67 signal peptide and C-terminal $His_6$-tag to the target protein. To express the RBD protein, a recombinant bacmid DNA was generated from the sequencing-confirmed pFastBac construct using the Bac-to-Bac system (Life Technologies). Baculovirus was generated by transfecting purified bacmid DNA into Sf9 cells using FuGENE HD (Promega), and subsequently used to infect suspension cultures of High Five cells (Life Technologies) at a multiplicity of infection (MOI) of 5 to 10. Infected High Five cells were incubated at 28° C. with shaking at 110 rpm for 72 h for protein expression. RBD protein that was secreted into the supernatant was harvested and then concentrated with a 10 kDa MW cutoff Centramate cassette (Pall Corporation). The RBD protein was purified by affinity chromatography using Ni-NTA resin (QIAGEN), followed by size exclusion chromatography on a HiLoad Superdex 200 pg column (GE Healthcare), and buffer exchanged into 20 mM Tris-HCl pH 7.4 and 150 mM NaCl. Fabs were expressed in ExpiCHO cells and purified using CaptureSelect CH1-XL resin (ThermoFisher) and followed by size exclusion chromatography. The Fab/RBD complexes were formed by mixing the two components in an equimolar ratio and incubating overnight at 4° C. before setting-up crystal trials.

The Fab/RBD complexes were screened for crystallization using 384 conditions of the JCSG Core Suite (QIAGEN) on our robotic CrystalMation system (Rigaku) at The Scripps Research Institute. Crystals appeared in the first week, were harvested during the second week, and then flash-cooled in liquid nitrogen for X-ray diffraction experiments. Diffraction data were collected at cryogenic temperature (100 K) at beamline 23-ID-B of the Advanced Photon Source (APS) at Argonne National Laboratory with a beam wavelength of 1.033 Å and processed with HKL2000. Diffraction data were collected from crystals grown in conditions: 20% PEG 3350, 0.2 M sodium sulfate, pH 6.6 for the S-B8/RBD complex; and 20% isopropanol, 20% PEG 4000, 0.1 M citrate pH 5.6 for the S-E6/RBD complex. The X-ray structures were solved by molecular replacement (MR) using PHASER with MR models for the RBD and Fab from PDB 7JMW. Iterative model building and refinement were carried out in COOT and PHENIX, respectively. Epitope and paratope residues, as well as their interactions, were identified by using PISA program with buried surface area (BSA>0 $Å^2$) as the criterion.

Data Analysis and Statistics

The results were expressed as means±standard deviation (SD) unless otherwise indicated. Data analysis was performed by one-way analysis of variance (ANOVA) using Origin Pro 2019 statistical software or GraphPad Prism software. Significance was assumed at a P value <0.05.
Results
Selection of Antibodies Against SARS-CoV-2 Spike RBD This example constructed and overexpressed the SARS-CoV-2 spike RBD (S-RBD) linked to human Fc (hFc) with a thrombin digestion site. After affinity purification, recombinant SARS-CoV-2 S-RBD was biotinylated, immobilized on streptavidin-coated magnetic beads, and panned against a combinatorial scFv antibody phage library containing $10^{11}$ members generated from peripheral blood mononuclear cells (PBMC) of 50 healthy donors.

In the first two rounds, a pH 2.2 glycine-HCl solution was used to elute antibody-displaying phagemids bound to S-RBD. To enrich for antibodies that compete with hACE2, a "function-guided enrichment" strategy was used in the third round, where recombinant hACE2-ECD protein was used to elute S-RBD binding phagemids (FIG. 1a). After three rounds of panning, S-RBD-specific antibodies were enriched (FIG. 1b) and 22 unique antibodies were selected that specifically bound to S-RBD-hFc (FIG. 1c). Next-generation sequencing of the library revealed that 92% of human heavy-chain IGHV and 89% of the light-chain (IGLV and IGKV) germlines were covered, when aligned to the IMGT (international ImMunoGeneTics) database, enabling screening of antibodies encoded by diverse germlines. Of note, by analyzing ca. 400,000 sequences in the library (209,000 IGHV sequences, 93,000 IGKV sequences, and 87,000 IGLV sequences), the random selected antibodies displayed low SHM levels as expected for a naïve library, with over 70%, 61% and 80% sequences of IGHV, IGKV, and IGLV, respectively, having no more than 3 amino acid mutations.

Selected Anti-S-RBD Antibodies Retain Binding to Full-Length Spike

Figure 2:
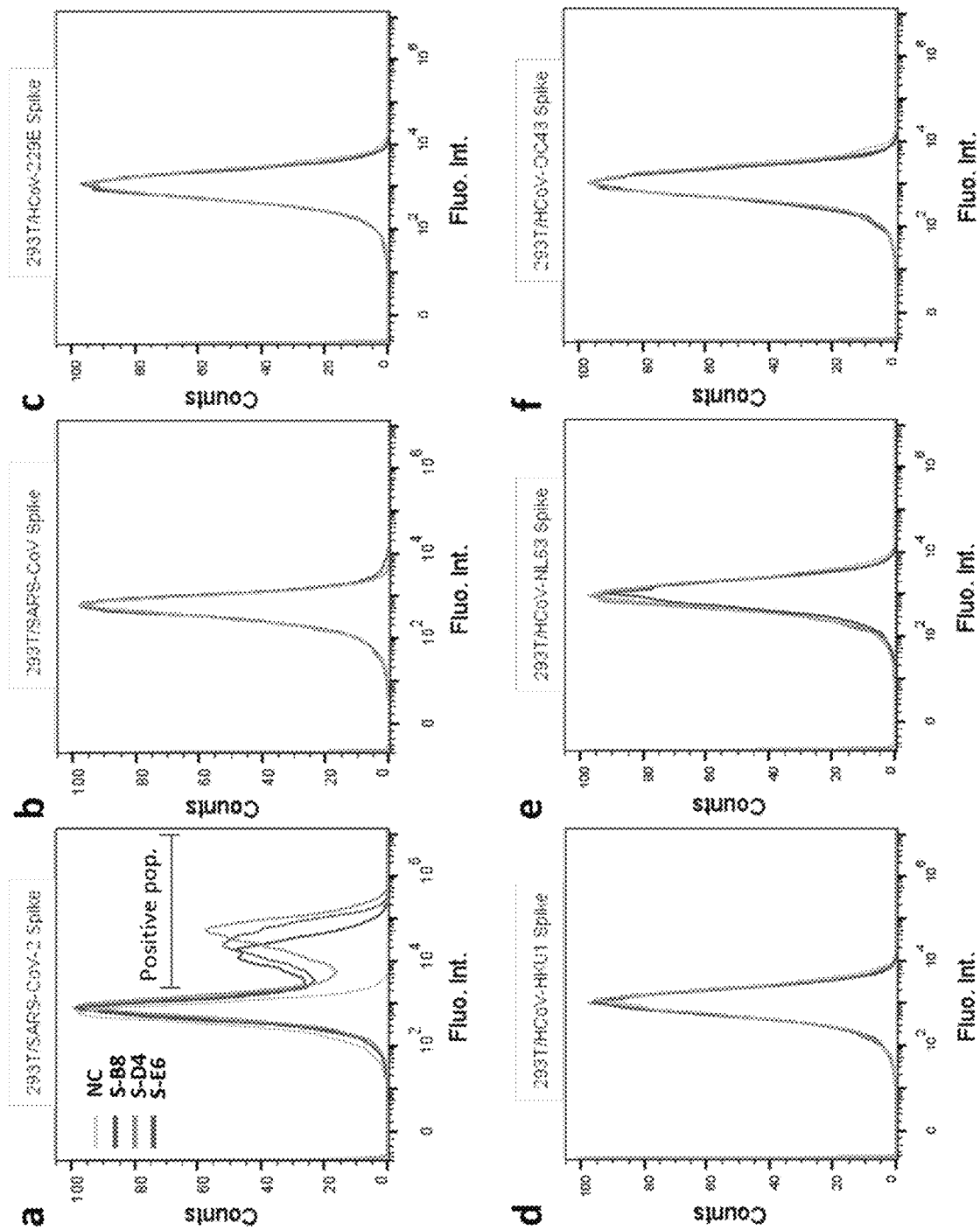
FIG. 2 Analysis of antibody binding to cell surface-expressed trimeric spike protein. a HEK293T cells transfected with expression plasmid encoding the full-length spike of SARS-CoV-2 were incubated with purified IgG4 antibody and stained with PE labeled anti-human IgG4 Fc secondary antibody, then analyzed by FACS. Positive binding cells populations were labeled as positive pop. b-g FACS of antibodies binding to SARS-CoV spike, HCoV-229E spike, HCoV-HKU1 spike, HCoV-NL63 spike, HCoV-OC43 spike, MERS spike. h FACS of antibodies binding to non-transfected HEK293T cells. Cells stained with only secondary antibody were used as negative control (NC). i Mean fluorescent intensity (MFI) of antibodies for SARS-CoV-2 spike binding.
Figure 2:
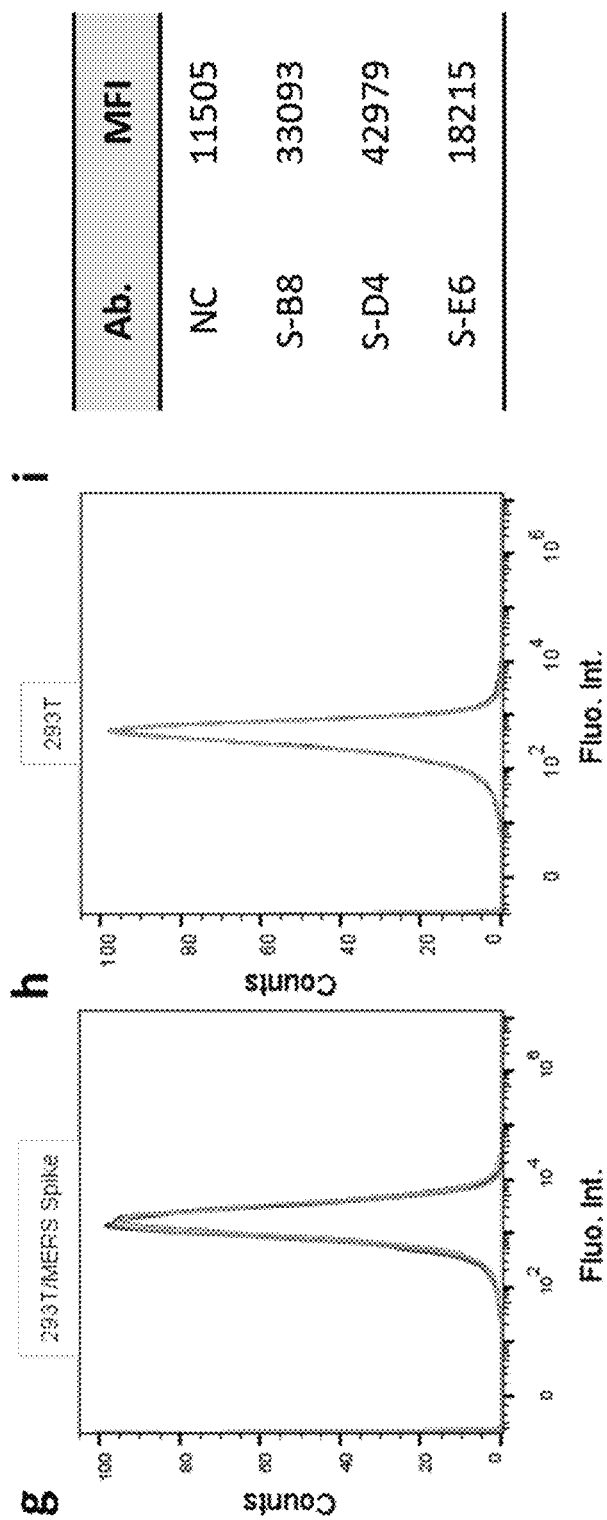

The scFv antibodies were then converted to full-length monoclonal antibodies (mAbs) by cloning into a human IgG4e1(S228P) vector. HEK293F cells were adapted for expression of combinatorial antibodies that were secreted into culture supernatants. Three of the best performing antibodies, S-B8, S-D4, and S-E6, were purified to homogeneity with yields of 8.1, 9.6 and 17 mg/L, respectively, whereas S-RBD-hFc (IgG1) was 58 mg/L. To characterize interactions between the anti-S-RBD antibodies and full-length spike, HEK293T cells were transiently transfected with either SARS-CoV-2 spike-P2A-EGFP or SARS spike-P2A-EGFP. Flow-cytometry (FACS) showed that all three antibodies in full-length-IgG4 format retained their ability to bind full-length SARS-CoV-2 spike with no cross-reactivity with other HCoV spikes, including SARS-CoV (FIG. 2b), HCoV-229E (FIG. 2c), HCoV-HKU1 (FIG. 2d), HCoV-NL63 (FIG. 2e), HCoV-OC43 (FIG. 2f), MERS-CoV (FIG. 2g), or with non-transfected cells (FIG. 2h).

Relevant sequences of the antibodies are shown in the tables below.

TABLE 1A

Antibody S-B8

| Name | Sequence | SEQ ID NO: |
|---|---|---|
| S-B8-VH-Protein | QVQLVQSGGGLIQPGGSLRLSCAASGFTVSLSHMNWVRQAPGKGLEWVSITY GDGNSDYADSVKGRFTISRDNSKNTLYLQMNSLRAEDTAVYYCAREYYYGMD V WGQGTTVTVSS | 1 |
| S-B8-VL-Protein | DIVMTQSPDSLAVSLGERATINCKSSQSVLYSSNNKNYLAWYQQKPGQPPKL LIYWASTRESGVPDRFSGSGSGTDFTLTISSLQAEDVAVYYCQQYYSLPLTF GGGTKLEIKR | 2 |
| S-B8-VH-DNA | CAGGTTCAGCTGGTACAGTCTGGAGGAGGCTTGATCCAGCCGGGGGGGTCCC TGAGACTCTCCTGTGCAGCCTCTGGGTTCACCGTCAGTCTCTCCCACATGAA CTGGGTCCGCCAGGCTCCAGGGAAGGGACTGGAGTGGGTCTCAATTACTTAT GGCGATGGTAACTCAGACTATGCAGACTCCGTGAAGGGCCGATTCACCATCT CCAGAGACAATTCCAAGAACACGCTGTATCTGCAAATGAACAGCCTGAGAGC TGAGGACACGGCTGTGTATTACTGTGCGAGAGAATACTACTACGGTATGGAC GTCTGGGGCCAAGGGACCACGGTCACCGTCTCCTCA | 3 |
| S-B8-VL-DNA | GACATCGTGATGACCCAGTCTCCAGACTCCCTGGCTGTGTCTCTGGGCGAGA GGGCCACCATCAACTGCAAGTCCAGCCAGAGTGTTTTATACAGCTCCAACAA TAAGAACTACTTAGCTTGGTACCAGCAGAAACCAGGACAGCCTCCTAAGCTG CTCATTTACTGGGCATCTACCCGGGAATCCGGGGTCCCTGACCGATTCAGTG GCAGCGGGTCTGGGACAGATTTCACTCTCACCATCAGCAGCCTGCAGGCTGA AGATGTGGCAGTTTATTACTGTCAACAATATTATAGTCTTCCTCTCACTTTC GGCGGAGGGACCAAGCTGGAGATCAAACGT | 4 |
| VH CDR1 (Kabat) | LSHMN | 5 |
| VH CDR2 | ITYGDGNSDYADSVKG | 6 |
| VH CDR3 | EYYYGMDV | 7 |
| VL CDR1 | KSSQSVLYSSNNKNYLA | 8 |
| VL CDR2 | WASTRES | 9 |
| VL CDR3 | QQYYSLPLT | 10 |
| VH CDR1 (Chothia) | GFTVSLSH | 11 |

TABLE 1A-continued

| | Antibody S-B8 | |
|---|---|---|
| Name | Sequence | SEQ ID NO: |
| VH CDR2 | TYGDGNS | 12 |
| VH CDR3 | AREYYYGMDV | 13 |
| VL CDR1 | QSVLYSSNNKY | 14 |
| VL CDR2 | WAS | 15 |
| VL CDR3 | QQYYSLPLT | 16 |
| S-B8 scFv Protein | MAQVQLVQSGGGLIQPGGSLRLSCAASGFTVSLSHMNWVRQAPGKGLEWVSI TYGDGNSDYADSVKGRFTISRDNSKNTLYLQMNSLRAEDTAVYYCAREYYYG MDVWGQGTTVTVSSGGGGSGGGGSGGGGSDIVMTQSPDSLAVSLGERATINC KSSQSVLYSSNNKNYLAWYQQKPGQPPKLLIYWASTRESGVPDRFSGSGSGT DFTLTISSLQAEDVAVYYCQQYYSLPLTFGGGTKLEIKR | 17 |
| S-B8 scFv DNA | ATGGCACAGGTTCAGCTGGTACAGTCTGGAGGAGGCTTGATCCAGCCGGGGG GGTCCCTGAGACTCTCCTGTGCAGCCTCTGGGTTCACCGTCAGTCTCTCCCA CATGAACTGGGTCCGCCAGGCTCCAGGGAAGGGACTGGAGTGGGTCTCAATT ACTTATGGCGATGGTAACTCAGACTATGCAGACTCCGTGAAGGGCCGATTCA CCATCTCCAGAGACAATTCCAAGAACACGCTGTATCTGCAAATGAACAGCCT GAGAGCTGAGGACACGGCTGTGTATTACTGTGCGAGAGAATACTACTACGGT ATGGACGTCTGGGGCCAAGGGACCACGGTCACCGTCTCCTCAGGCGGCGGCG GCTCTGGCGGAGGTGGCAGCGGCGGTGGCGGATCCGACATCGTGATGACCCA GTCTCCAGACTCCCTGGCTGTGTCTCTGGGCGAGAGGGCCACCATCAACTGC AAGTCCAGCCAGAGTGTTTTATACAGCTCCAACAATAAGAACTACTTAGCTT GGTACCAGCAGAAACCAGGACAGCCTCCTAAGCTGCTCATTTACTGGGCATC TACCCGGGAATCCGGGGTCCCTGACCGATTCAGTGGCAGCGGGTCTGGGACA GATTTCACTCTCACCATCAGCAGCCTGCAGGCTGAAGATGTGGCAGTTTATT ACTGTCAACAATATTATAGTCTTCCTCTCACTTTCGGCGGAGGGACCAAGCT GGAGATCAAACGT | 18 |
| S-B8-(Fab)3-G4S-linker-protein | QVQLVQSGGGLIQPGGSLRLSCAASGFTVSLSHMNWVRQAPGKGLEWVSITY GDGNSDYADSVKGRFTISRDNSKNTLYLQMNSLRAEDTAVYYCAREYYYGMD VWGQGTTVTVSSASTKGPSVFPLAPSSKSTSGGTAALGCLVKDYFPEPVTVS WNSGALTSGVHTFPAVLQSSGLYSLSSVVTVPSSSLGTQTYICNVNHKPSNT KVDKKVEPPKSGGGGSPGSGYIPEAPRDGQAYVRKDGEWVLLSTFLGHHHHH H | 19 |
| S-B8-(Fab)3-G4S-linker-DNA | CAGGTTCAGCTGGTACAGTCTGGAGGAGGCTTGATCCAGCCGGGGGGGTCCC TGAGACTCTCCTGTGCAGCCTCTGGGTTCACCGTCAGTCTCTCCCACATGAA CTGGGTCCGCCAGGCTCCAGGGAAGGGACTGGAGTGGGTCTCAATTACTTAT GGCGATGGTAACTCAGACTATGCAGACTCCGTGAAGGGCCGATTCACCATCT CCAGAGACAATTCCAAGAACACGCTGTATCTGCAAATGAACAGCCTGAGAGC TGAGGACACGGCTGTGTATTACTGTGCGAGAGAATACTACTACGGTATGGAC GTCTGGGGCCAAGGGACCACGGTCACCGTCTCCTCAgcctccaccaagggcc catcggtcttccccctggcaccctcctccaagagcacctctgggggcacagc ggccctgggctgcctggtcaaggactacttccccgaaccggtgacggtgtcg tggaactcaggcgccctgaccagcggcgtgcacaccttcccggctgtcctac agtcctcaggactctactccctcagcagcgtggtgactgtgccctctagcag cttgggcacccagacctacatctgcaacgtgaatcacaagcccagcaacacc aaggtggacaagaaagttgagcccccgaaatctggcggtggcggatccCAG GATCAGGTTATATTCCTGAAGCTCCAAGAGATGGGCAAGCTTACGTTCGTAA AGATGGCGAATGGGTATTACTTTCTACCTTTTTAGGACATCATCATCATCAT CAC | 20 |
| S-B8-(Fab)3-(G4S)x3-linker-protein | QVQLVQSGGGLIQPGGSLRLSCAASGFTVSLSHMNWVRQAPGKGLEWVSITY GDGNSDYADSVKGRFTISRDNSKNTLYLQMNSLRAEDTAVYYCAREYYYGMD VWGQGTTVTVSSASTKGPSVFPLAPSSKSTSGGTAALGCLVKDYFPEPVTVS WNSGALTSGVHTFPAVLQSSGLYSLSSVVTVPSSSLGTQTYICNVNHKPSNT KVDKKVEPPKSGGGGSGGGGSGGGGSPGSGYIPEAPRDGQAYVRKDGEWVLL STFLGHHHHHH | 21 |
| S-B8-(Fab)3-(G4S)x3-linker-DNA | CAGGTTCAGCTGGTACAGTCTGGAGGAGGCTTGATCCAGCCGGGGGGGTCCC TGAGACTCTCCTGTGCAGCCTCTGGGTTCACCGTCAGTCTCTCCCACATGAA CTGGGTCCGCCAGGCTCCAGGGAAGGGACTGGAGTGGGTCTCAATTACTTAT GGCGATGGTAACTCAGACTATGCAGACTCCGTGAAGGGCCGATTCACCATCT CCAGAGACAATTCCAAGAACACGCTGTATCTGCAAATGAACAGCCTGAGAGC TGAGGACACGGCTGTGTATTACTGTGCGAGAGAATACTACTACGGTATGGAC GTCTGGGGCCAAGGGACCACGGTCACCGTCTCCTCAGCCTCCACCAAGGGCC CATCGGTCTTCCCCCTGGCACCCTCCTCCAAGAGCACCTCTGGGGGCACAGC GGCCCTGGGCTGCCTGGTCAAGGACTACTTCCCCGAACCGGTGACGGTGTCG TGGAACTCAGGCGCCCTGACCAGCGGCGTGCACACCTTCCCGGCTGTCCTAC AGTCCTCAGGACTCTACTCCCTCAGCAGCGTGGTGACTGTGCCCTCTAGCAG CTTGGGCACCCAGACCTACATCTGCAACGTGAATCACAAGCCCAGCAACACC AAGGTGGACAAGAAAGTTGAGCCCCCGAAATCTGGTGGAGGAGGTTCTGGAG | 22 |

TABLE 1A-continued

Antibody S-B8

| Name | Sequence | SEQ ID NO: |
|------|----------|------------|
| | GCGGTGGAAGTGGTGGCGGAGGTAGCCCAGGATCAGGTTATATTCCTGAAGC TCCAAGAGATGGGCAAGCTTACGTTCGTAAAGATGGCGAATGGGTATTACTT TCTACCTTTTTAGGACATCATCATCATCATCAC | |

TABLE 1B

Antibody S-D4

| Name | Sequence | SEQ ID NO: |
|------|----------|------------|
| S-D4-VH-Protein | QVQLQESGGGWQPGRSLRLSCEVSGFTFSDYGMHWVRQAPGKGLEWWAVIWSEGSTEYYADSVKGRFTISRDNSKDTLYLQMNSLRAEDTAVYYCARPGYPTSTDRSPAAAGARQYYYYGMDVWGQGTTVTVSS | 23 |
| S-D4-VL-Protein | NFMLTQPHSVSESPGKTVTISCTRSGGSGAANYVQWYQQRPGSSPTTLIYEDSRRPPGVPDRFSGSVDTSSNSASLTISGLQTEDEADYYCQSYDSSNHWFGGGTKLTVLG | 24 |
| S-D4-VH-DNA | CAGGTGCAGCTGCAGGAGTCCGGGGGAGGCGTAGTCCAGCCTGGGAGGTCCCTGAGACTCTCCTGTGAAGTGTCTGGATTCACTTTCAGTGACTATGGCATGCACTGGGTCCGCCAGGCTCCAGGCAAGGGGCTGGAGTGGGTGGCAGTTATATGGTCTGAAGGAAGTACTGAATACTACGCAGACTCCGTGAAGGGCCGATTCACCATCTCTAGAGACAATTCCAAGGACACGCTTTATCTGCAAATGAACAGCCTGAGAGCCGAGGACACGGCTGTCTATTACTGTGCGAGACCAGGTTATCCAACATCAACCGACCGTTCACCAGCAGCAGCTGGTGCAAGGCAATACTACTACTACGGTATGGACGTCTGGGGCCAAGGGACCACGGTCACCGTCTCCTCA | 25 |
| S-D4-VL-DNA | AATTTTATGCTGACTCAGCCCCACTCTGTGTCTGGGTCTCCGGGGAAGACCGTTACCATCTCCTGCACCCGCAGCGGTGGCAGCGGGGCCGCCAACTATGTACAGTGGTACCAACAGCGCCCGGGCAGTTCCCCCACCACTCTGATCTATGAAGATAGTCGAAGACCCCCCTGGGGTCCCTGATCGGTTCTCTGGCTCCGTCGACACGTCCTCCAACTCTGCCTCCCTCACCATCTCTGGACTGCAGACTGAAGACGAGGCTGACTACTACTGTCAGTCTTATGATAGTAGTAATCACGTGGTCTTCGGCGGAGGGACCAAGCTGACCGTCCTAGGT | 26 |
| VHCDR1 (Kabat) | DYGMH | 27 |
| VH CDR2 | VIWSEGSTEYYADSVKG | 28 |
| VH CDR3 | PGYPTSTDRSPAAAGARQYYYYGMDV | 29 |
| VL CDR1 | TRSGGSGAANYVQ | 30 |
| VL CDR2 | EDSRRPP | 31 |
| VL CDR3 | QSYDSSNHW | 32 |
| VH CDR1 (Chothia) | GFTFSDYG | 33 |
| VH CDR2 | IWSEGSTE | 34 |
| VH CDR3 | ARPGYPTSTDRSPAAAGARQYYYYGMDV | 35 |
| VL CDR1 | GGSGAANY | 36 |
| VL CDR2 | EDS | 37 |
| VL CDR3 | QSYDSSNHW | 38 |
| S-D4 scFv Protein | QVQLQESGGGVVQPGRSLRLSCEVSGFTFSDYGMHWVRQAPGKGLEWVAVIWSEGSTEYYADSVKGRFTISRDNSKDTLYLQMNSLRAEDTAVYYCARPGYPTSTDRSPAAAGARQYYYYGMDVWGQGTTVTVSSGGGGSGGGGSGGGGSNFMLTQPHSVSESPGKTVTISCTRSGGSGAANYVQWYQQRPGSSPTTLIYEDSRRPPGVPDRFSGSVDTSSNSASLTISGLQTEDEADYYCQSYDSSNHVVFGGGTKLTVLG | 39 |
| S-D4 scFv DNA | CAGGTGCAGCTGCAGGAGTCCGGGGGAGGCGTAGTCCAGCCTGGGAGGTCCCTGAGACTCTCCTGTGAAGTGTCTGGATTCACTTTCAGTGACTATGGCATGCACTGGGTCCGCCAGGCTCCAGGCAAGGGGCTGGAGTGGGTGGCAGTTATATGGTCTGAAGGAAGTACTGAATACTACGCAGACTCCGTGAAGGGCCGATTCACCATCTCTAGAGACAATTCCAAGGACACGCTTTATCTGCAAATGAACAGCCTGAGAGCCGAGGACACGGCTGTCTATTACTGTGCGAGACCAGGTTATCCAACATCAACCGACCGTTCACCAGCAGCAGCTGGTGCAAGGCAATACTACTACTACGGTATGGACGTCTGGGGCCAAGGGACCACGGTCACCGTCTCCTCAGGCGGCGGCGGCTCTGGCGGAGGTGGCAGCGGCGGTGGCGGATCCAATTTTATGCTGACTCAGCCCCACTCTGTGTCGAGTCTCCGGGGAAGACCGTTACCATCCTGCACCCGCAGCGGTGGCAGCGGGGCCGCCAACTATGTACAGTGGTACCAACAGCGCCCGGGCAGTTCCCCCACCACTCTGATCTATGAAGATAGTCGAAGACCCCCTGGGGTCCCTGATCGGTTCTCTGGCTCCGTC | 40 |

TABLE 1B-continued

Antibody S-D4

| Name | Sequence | SEQ ID NO: |
|---|---|---|
| | GACACGTCCTCCAACTCTGCCTCCCTCACCATCTCTGGACTGCAGACTGAAGACGAGGCTGACTACTACTGTCAGTCTTATGATAGTAGTAATCACGTGGTCTTCGGCGGAGGGACCAAGCTGACCGTCCTAGGT | |
| S-D4-(Fab)3-G4S-linker-protein | QVQLQESGGGVVQPGRSLRLSCEVSGFTFSDYGMHWVRQAPGKGLEWVAVIWSEGSTEYYADSVKGRFTISRDNSKDTLYLQMNSLRAEDTAVYYCARPGYPTSTDRSPAAAGARQYYYYGMDVWGQGTTVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPPKSGGGGSPGSGYIPEAPRDGQAYVRKDGEWVLLSTFLGHHHHHH | 41 |
| S-D4-(Fab)3-G4S-linker-DNA | CAGGTGCAGCTGCAGGAGTCCGGGGGAGGCGTAGTCCAGCCTGGGAGGTCCCTGAGACTCTCCTGTGAAGTGTCTGGATTCACTTTCAGTGACTATGGCATGCACTGGGTCCGCCAGGCTCCAGGCAAGGGGCTGGAGTGGGTGGCAGTTATATGGTCTGAAGGAAGTACTGAATACTACGCAGACTCCGTGAAGGGCCGATTCACCATCTCTAGAGACAATTCCAAGGACACGCTTTATCTGCAAATGAACAGCCTGAGAGCCGAGGACACGGCTGTCTATTACTGTGCGAGACCAGGTTATCCAACATCAACCGACCGTTCACCAGCAGCAGCTGGTGCAAGGCAATACTACTACTACGGTATGGACGTCTGGGGCCAAGGGACCACGGTCACCGTCTCCTCAGCCTCCACCAAGGGCCCATCGGTCTTCCCCCTGGCACCCTCCTCCAAGAGCACCTCTGGGGGCACAGCGGCCCTGGGCTGCCTGGTCAAGGACTACTTCCCCGAACCGGTGACGGTGTCGTGGAACTCAGGCGCCCTGACCAGCGGCGTGCACACCTTCCCGGCTGTCCTACAGTCCTCAGGACTCTACTCCCTCAGCAGCGTGGTGACTGTGCCCTCTAGCAGCTTGGGCACCCAGACCTACATCTGCAACGTGAATCACAAGCCCAGCAACACCAAGGTGGACAAGAAAGTTGAGCCCCCGAAATCTGGCGGTGGCGGATCCCCAGGATCAGGTTATATTCCTGAAGCTCCAAGAGATGGGCAAGCTTAC | 42 |
| S-D4-(Fab)3-(G4S)x3-linker-protein | GTTCGTAAAGATGGCGAATGGGTATTACTTTCTACCTTTTTAGGACATCATCATCATCATCACQVQLQESGGGVVQPGRSLRLSCEVSGFTFSDYGMHWVRQAPGKGLEWVAVIWSEGSTEYYADSVKGRFTISRDNSKDTLYLQMNSLRAEDTAVYYCARPGYPTSTDRSPAAAGARQYYYYGMDVWGQGTTVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPPKSGGGGSGGGGSGGGGSPGSGYIPEAPRDGQAYVRKDGEWVLLSTFLGHHHHHH | 43 |
| S-D4-(Fab)3-(G4S)x3-linker-DNA | CAGGTGCAGCTGCAGGAGTCCGGGGGAGGCGTAGTCCAGCCTGGGAGGTCCCTGAGACTCTCCTGTGAAGTGTCTGGATTCACTTTCAGTGACTATGGCATGCACTGGGTCCGCCAGGCTCCAGGCAAGGGGCTGGAGTGGGTGGCAGTTATATGGTCTGAAGGAAGTACTGAATACTACGCAGACTCCGTGAAGGGCCGATTCACCATCTCTAGAGACAATTCCAAGGACACGCTTTATCTGCAAATGAACAGCCTGAGAGCCGAGGACACGGCTGTCTATTACTGTGCGAGACCAGGTTATCCAACATCAACCGACCGTTCACCAGCAGCAGCTGGTGCAAGGCAATACTACTACTACGGTATGGACGTCTGGGGCCAAGGGACCACGGTCACCGTCTCCTCAGCCTCCACCAAGGGCCCATCGGTCTTCCCCCTGGCACCCTCCTCCAAGAGCACCTCTGGGGGCACAGCGGCCCTGGGCTGCCTGGTCAAGGACTACTTCCCCGAACCGGTGACGGTGTCGTGGAACTCAGGCGCCCTGACCAGCGGCGTGCACACCTTCCCGGCTGTCCTACAGTCCTCAGGACTCTACTCCCTCAGCAGCGTGGTGACTGTGCCCTCTAGCAGCTTGGGCACCCAGACCTACATCTGCAACGTGAATCACAAGCCCAGCAACACCAAGGTGGACAAGAAAGTTGAGCCCCCGAAATCTGGTGGAGGAGGTTCTGGAGGCGGTGGAAGTGGTGGCGGAGGTAGCCCAGGATCAGGTTATATTCCTGAAGCTCAAGAGATGGGCAAGCTTACGTTCGTAAAGATGGCGAATGGGTATTACTTTCTACCTTTTTAGGACATCATCATCATCATCAC | 44 |

TABLE 1C

Antibody S-E6

| Name | Sequence | SEQ ID NO: |
|---|---|---|
| S-E6-VH-Protein | QVTLRESGPGLVKPSETLSLTCAVSGGSLSSVNYYWSWIRQHPGKGLEWIGYIYYSGSTNYNPSLKSRVTMSLDTSKNQFSLKLSSVTAADTAVYYCATPGAIMSGSSSNIGSNTVSWGQGTLVTVSS | 45 |

TABLE 1C-continued

Antibody S-E6

| Name | Sequence | SEQ ID NO: |
|---|---|---|
| S-E6-VL-Protein | QAVLTQPSSASSTPGQRVIISCSGSSSNIGSNTVSWYQQVPGAAPKLLIYFDYRRPSGVPDRFSGTRSGTSASLGISGLQSEDEADYYCAAWDDSLSAWVFGRGTKLTVLG | 46 |
| S-E6-VH-DNA | CAGGTCACCTTGAGGGAGTCTGGTCCAGGACTGGTGAAGCCTTCGGAGACCCTGTCCCTCACCTGCGCTGTCTCTGGTGGCTCTCTCAGCAGTGTTAATTACTACTGGAGCTGGATCCGCCAGCACCCAGGGAAGGGCCTGGAGTGGATTGGGTACATCTATTACAGTGGGAGTACCAACTACAACCCGTCCCTCAAGAGTCGAGTCACCATGTCACTGGACACGTCCAAGAACCAGTTCTCCCTGAAACTGAGCTCTGTGACTGCCGCGGACACGGCCGTCTATTACTGTGCGACCCCCGGAGCTATTATGGGTGCTCTTCATATCTGGGGCCAAGGCACCCTGGTCACCGTCTCCTCA | 47 |
| S-E6-VL-DNA | CAGGCTGTGCTCACTCAGCCGTCCTCGGCGTCCTCGACCCCCGGGCAGAGGGTCATCATCTCTTGTTCTGGGAGCAGCTCCAATATCGGGAGTAACACTGTCAGCTGGTACCAGCAGGTCCCAGGAGCGGCCCCCAAACTCCTCATCTACTTTGATTATCGACGTCCCTCAGGGGTCCCTGACCGCTTCTCTGGCACCAGGTCTGGCACCTCTGCCTCCCTGGGCATCAGTGGGCTCCAGTCTGAGGATGAGGCTGATTATTACTGTGCCGCATGGGATGACAGCCTGAGTGCTTGGGTGTTCGGCAGAGGGACCAAGCTGACCGTCCTAGGT | 48 |
| VH CDR1 (Kabat) | SVNYYWS | 49 |
| VH CDR2 | YIYYSGSTNYNPSLKS | 50 |
| VH CDR3 | PGAIMGALHI | 51 |
| VL CDR1 | SGSSSNIGSNTVS | 52 |
| VL CDR2 | FDYRRPS | 53 |
| VL CDR3 | AAWDDSLSAWV | 54 |
| VH CDR1 (Chothia) | GGSLSSVNYY | 55 |
| VH CDR2 | IYYSGST | 56 |
| VH CDR3 | ATPGAIMGALHI | 57 |
| VL CDR1 | SSNIGSNT | 58 |
| VL CDR2 | FDY | 59 |
| VL CDR3 | AAWDDSLSAWV | 60 |
| S-E6 scFv Protein | QVTLRESGPGLVKPSETLSLTCAVSGGSLSSVNYYWSWIRQHPGKGLEWIGYIYYSGSTNYNPSLKSRVTMSLDTSKNQFSLKLSSVTAADTAVYYCATPGAIMGALHIWGQGTLVTVSSGGGGSGGGGSGGGGSQAVLTQPSSASSTPGQRVIISCSGSSSNIGSNTVSWYQQVPGAAPKLLIYFDYRRPSGVPDRFSGTRSGTSASLGISGLQSEDEADYYCAAWDDSLSAWVFGRGTKLTVLG | 61 |
| S-E6 scFv DNA | CAGGTCACCTTGAGGGAGTCTGGTCCAGGACTGGTGAAGCCTTCGGAGACCCTGTCCCTCACCTGCGCTGTCTCTGGTGGCTCTCTCAGCAGTGTTAATTACTACTGGAGCTGGATCCGCCAGCACCCAGGGAAGGGCCTGGAGTGGATTGGGTACATCTATTACAGTGGGAGTACCAACTACAACCCGTCCCTCAAGAGTCGAGTCACCATGTCACTGGACACGTCCAAGAACCAGTTCTCCCTGAAACTGAGCTCTGTGACTGCCGCGGACACGGCCGTCTATTACTGTGCGACCCCCGGAGCTATTATGGGTGCTCTTCATATCTGGGGCCAAGGCACCCTGGTCACCGTCTCCTCAGGCGGCGGCGGCTCTGGCGGAGGTGGCAGCGGCGGTGGCGGATCCCAGGCTGTGCTCACTCAGCCGTCCTCGGCGTCCTCGACCCCCGGGCAGAGGGTCATCATCTCTTGTTCTGGGAGCAGCTCCAATATCGGGAGTAACACTGTCAGCTGGTACCAGCAGGTCCCAGGAGCGGCCCCCAAACTCCTCATCTACTTTGATTATCGACGTCCCTCAGGGGTCCCTGACCGCTTCTCTGGCACCAGGTCTGGCACCTCTGCCTCCCTGGGCATCAGTGGGCTCCAGTCTGAGGATGAGGCTGATTATTACTGTGCCGCATGGGATGACAGCCTGAGTGCTTGGGTGTTCGGCAGAGGGACCAAGCTGACCGTCCTAGGT | 62 |
| S-E6-(Fab)3-G4S-linker-protein | QVTLRESGPGLVKPSETLSLTCAVSGGSLSSVNYYWSWIRQHPGKGLEWIGYIYYSGSTNYNPSLKSRVTMSLDTSKNQFSLKLSSVTAADTAVYYCATPGAIMGALHIWGQGTLVTVSSASTKGPSVFPLAPSSKSTSGGTAALGCLVKDYFPEPVTVSWNSGALTSGVHTFPAVLQSSGLYSLSSVVTVPSSSLGTQTYICNVNHKPSNTKVDKKVEPPKSGGGGSPGSGYIPEAPRDGQAYVRKDGEWVLLSTFLGHHHHHH | 63 |

TABLE 1C-continued

Antibody S-E6

| Name | Sequence | SEQ ID NO: |
|---|---|---|
| S-E6-(Fab)3-G4S-linker-DNA | CAGGTCACCTTGAGGGAGTCTGGTCCAGGACTGGTGAAGCCTTCGGAGACCC<br>TGTCCCTCACCTGCGCTGTCTCTGGTGGCTCTCTCAGCAGTGTTAATTACTA<br>CTGGAGCTGGATCCGCCAGCACCCAGGGAAGGGCCTGGAGTGGATTGGGTAC<br>ATCTATTACAGTGGGAGTACCAACTACAACCCGTCCCTCAAGAGTCGAGTCA<br>CCATGTCACTGGACACGTCCAAGAACCAGTTCTCCCTGAAACTGAGCTCTGT<br>GACTGCCGCGGACACGGCCGTCTATTACTGTGCGACCCCCGGAGCTATTATG<br>GGTGCTCTTCATATCTGGGGCCAAGGCACCCTGGTCACCGTCTCCTCAGCCT<br>CCACCAAGGGCCCATCGGTCTTCCCCCTGGCACCCTCCTCCAAGAGCACCTC<br>TGGGGGCACAGCGGCCCTGGGCTGCCTGGTCAAGGACTACTTCCCCGAACCG<br>GTGACGGTGTCGTGGAACTCAGGCGCCCTGACCAGCGGCGTGCACACCTTCC<br>CGGCTGTCCTACAGTCCTCAGGACTCTACTCCCTCAGCAGCGTGGTGACTGT<br>GCCCTCTAGCAGCTTGGGCACCCAGACCTACATCTGCAACGTGAATCACAAG<br>CCCAGCAACACCAAGGTGGACAAGAAAGTTGAGCCCCCGAAATCTGGCGGTG<br>GCGGATCCCCAGGATCAGGTTATATTCCTGAAGCTCCAAGAGATGGGCAAGC<br>TTACGTTCGTAAAGATGGCGAATGGGTATTACTTTCTACCTTTTTAGGACAT<br>CATCATCATCAC | 64 |
| S-E6-(Fab)3-(G4S)x3-linker-protein | QVTLRESGPGLVKPSETLSLTCAVSGGSLSSVNYYWSWIRQHPGKGLEWIGY<br>IYYSGSTNYNPSLKSRVTMSLDTSKNQFSLKLSSVTAADTAVYYCATPGAIM<br>GALHIWGQGTLVTVSSASTKGPSVFPLAPSSKSTSGGTAALGCLVKDYFPEP<br>VTVSWNSGALTSGVHTFPAVLQSSGLYSLSSVVTVPSSSLGTQTYICNVNHK<br>PSNTKVDKKVEPPKSGGGGSGGGGSGGGGSPGSGYIPEAPRDGQAYVRKDGE<br>WVLLSTFLGHHHHHH | 65 |
| S-E6-(Fab)3-(G4S)x3-linker-DNA | CAGGTCACCTTGAGGGAGTCTGGTCCAGGACTGGTGAAGCCTTCGGAGACCC<br>TGTCCCTCACCTGCGCTGTCTCTGGTGGCTCTCTCAGCAGTGTTAATTACTA<br>CTGGAGCTGGATCCGCCAGCACCCAGGGAAGGGCCTGGAGTGGATTGGGTAC<br>ATCTATTACAGTGGGAGTACCAACTACAACCCGTCCCTCAAGAGTCGAGTCA<br>CCATGTCACTGGACACGTCCAAGAACCAGTTCTCCCTGAAACTGAGCTCTGT<br>GACTGCCGCGGACACGGCCGTCTATTACTGTGCGACCCCCGGAGCTATTATG<br>GGTGCTCTTCATATCTGGGGCCAAGGCACCCTGGTCACCGTCTCCTCAGCCT<br>CCACCAAGGGCCCATCGGTCTTCCCCCTGGCACCCTCCTCCAAGAGCACCTC<br>TGGGGGCACAGCGGCCCTGGGCTGCCTGGTCAAGGACTACTTCCCCGAACCG<br>GTGACGGTGTCGTGGAACTCAGGCGCCCTGACCAGCGGCGTGCACACCTTCC<br>CGGCTGTCCTACAGTCCTCAGGACTCTACTCCCTCAGCAGCGTGGTGACTGT<br>GCCCTCTAGCAGCTTGGGCACCCAGACCTACATCTGCAACGTGAATCACAAG<br>CCCAGCAACACCAAGGTGGACAAGAAAGTTGAGCCCCCGAAATCTGGTGAG<br>GAGGTTCTGGAGGCGGTGGAAGTGGTGGCGGAGGTAGCCCAGGATCAGGTTA<br>TATTCCTGAAGCTCCAAGAGATGGGCAAGCTTACGTTCGTAAAGATGGCGAA<br>TGGGTATTACTTTCTACCTTTTTAGGACATCATCATCATCATCAC | 66 |

TABLE 1D

Antibody S-B2

| Name | Sequence | SEQ ID NO: |
|---|---|---|
| S-B2-VH-Protein | QVQLQESGGGVVQPGRSLRLSCAASGFTFSSYAMHWVRQAPGKGLEWVAVIS<br>YDGSNKYYADSVKGRFTISRDNSKNTLYLQMNSLRAEDTAVYYCARDYGDYL<br>LDYWGQGTLVTVSS | 67 |
| S-B2-VL-Protein | LSALTQPASASGSPGQSVTISCTGTSSDVGGYNYASWYQQHPKGAPKLLIYE<br>VTKRPSGVPDRFSSSKSGNTASLTVSGLQAEDEADYYCSSYTGTLLLFGGGT<br>KLTVL | 68 |
| S-B2-VH-DNA | CAGGTGCAGCTGCAGGAGTCCGGGGGAGGCGTGGTCCAGCCTGGGAGGTCCC<br>TGAGACTCTCCTGTGCAGCCTCTGGATTCACCTTCAGTAGCTATGCTATGCA<br>CTGGGTCCGCCAGGCTCCAGGCAAGGGGCTGGAGTGGGTGGCAGTTATATCA<br>TATGATGGAAGCAATAAATACTACGCAGACTCCGTGAAGGGCCGATTCACCA<br>TCTCCAGAGACAATTCCAAGAACACGCTGTATCTGCAAATGAACAGCCTGAG<br>AGCTGAGGACACGGCTGTGTATTACTGTGCGAGAGACTACGGTGACTACCTC<br>CTTGACTACTGGGGCCAGGGCACCCTGGTCACCGTCTCCTCA | 69 |
| S-B2-VL-DNA | CTGTCTGCCCTGACTCAGCCTGCCTCCGCGTCCGGGTCTCCTGGACAGTCAG<br>TCACCATCTCCTGCACTGGAACCAGCAGTGACGTTGGTGGATATAACTATGC<br>CTCCTGGTACCAACAACACCCAGGTAAAGCCCCCAAATTCCTGATTTATGAG<br>GTCACAAAGCGGCCCTCAGGGGTCCCTGATCGCTTCTCTAGCTCCAAGTCTG<br>GCAACACGGCCTCCCTGACCGTCTCTGGGCTCCAGGCTGAGGACGAGGCTGA<br>TTATTACTGCAGCTCATATACAGGCACTTTGCTACTTTTCGGCGGAGGGACC<br>AAGCTGACCGTCCTT | 70 |

TABLE 1D-continued

Antibody S-B2

| Name | Sequence | SEQ ID NO: |
|---|---|---|
| VH CDR1 (Kabat) | SYAMH | 71 |
| VH CDR2 | VISYDGSNKYYADSVKG | 72 |
| VH CDR3 | DYGDYLLDY | 73 |
| VL CDR1 | TGTSSDVGGYNYAS | 74 |
| VL CDR2 | EVTKRPS | 75 |
| VL CDR3 | SSYTGTLLL | 76 |
| VH CDR1 (Chothia) | GFTFSSYA | 77 |
| VH CDR2 | ISYDGSNK | 78 |
| VH CDR3 | ARDYGDYLLDY | 79 |
| VL CDR1 | SSDVGGYNY | 80 |
| VL CDR2 | EVT | 81 |
| VL CDR3 | SSYTGTLLL | 82 |
| S-B2 scFv Protein | QVQLQESGGGVVQPGRSLRLSCAASGFTFSSYAMHWVRQAPGKGLEWVAVIS YDGSNKYYADSVKGRFTISRDNSKNTLYLQMNSLRAEDTAVYYCARDYGDYL LDYWGQGTLVTVSSGSGGGGSLSALTQPASASGSPGQSVTISCTGTSSDVGG YNYASWYQQHPGKAPKLLIYEVTKRPSGVPDRFSSSKSGNTASLTVSGLQAE DEADYYCSSYTGTLLLFGGGTKLTVL | 83 |
| S-B2 scFv DNA | CAGGTGCAGCTGCAGGAGTCCGGGGGAGGCGTGGTCCAGCCTGGGAGGTCCC TGAGACTCTCCTGTGCAGCCTCTGGATTCACCTTCAGTAGCTATGCTATGCA CTGGGTCCGCCAGGCTCCAGGCAAGGGGCTGGAGTGGGTGGCAGTTATATCA TATGATGGAAGCAATAAATACTACGCAGACTCCGTGAAGGGCCGATTCACCA TCTCCAGAGACAATTCCAAGAACACGCTGTATCTGCAAATGAACAGCCTGAG AGCTGAGGACACGGCTGTGTATTACTGTGCGAGAGACTACGGTGACTACCTC CTTGACTACTGGGGCCAGGGCACCCTGGTCACCGTCTCCTCAGGCAGCGGCG GTGGCGGATCCCTGTCTGCCCTGACTCAGCCTGCCTCCGCGTCCGGGTCTCC TGGACAGTCAGTCACCATCTCCTGCACTGGAACCAGCAGTGACGTTGGTGGA TATAACTATGCCTCCTGGTACCAACAACACCCAGGTAAAGCCCCCAAACTCC TGATTTATGAGGTCACAAAGCGGCCCTCAGGGGTCCCTGATCGCTTCTCTAG CTCCAAGTCTGGCAACACGGCCTCCCTGACCGTCTCTGGGCTCCAGGCTGAG GACGAGGCTGATTATTACTGCAGCTCATATACAGGCACTTTGCTACTTTTCG GCGGAGGGACCAAGCTGACCGTCCTT | 84 |

TABLE 1E

Antibody S-D9

| Name | Sequence | SEQ ID NO: |
|---|---|---|
| S-D9-VH-Protein | QVQLVQSGAELKKPGESLKISCTASGYSFTNYWIAWVRQMPGKGLEWMGIVN PADSDTRYSPAFQGQVTMSADKSFNTAYLQWSRLKASDTAMYYCARLGODHN SGWYTYFHPMDVWGQGTTVTVSS | 85 |
| S-D9-VL-Protein | QSALTQPASVSGSPGQSITISCTGTRSDVGGYNYVSWYQQHPGKAPKLLIFG VNDRPSGVSDRFSGSRTGNTASLTISGLQPEDEADYYCSSFTRGTTLLVFGG GTKLTVLG | 86 |
| S-D9-VH-DNA | CAGGTGCAGCTGGTGCAATCTGGAGCAGAACTGAAAAAGCCGGGGGAGTCTC TGAAGATCTCTTGTACGGCTTCTGGATATAGTTTTACCAACTACTGGATCGC CTGGGTGCGCCAGATGCCCGGGAAAGGCCTGGAGTGGATGGGAATCGTCAAT CCTGCTGACTCTGATACCAGATACAGCCCGGCCTTCCAAGGCCAGGTCACCA TGTCCGCCGACAAGTCCTTCAATACCGCCTACCTGCAGTGGAGTCGCCTGAA GGCTTCGGACACCGCCATGTATTACTGTGCGAGACTTGGGCAAGATCATAAT AGTGGCTGGTATACCTACTTCCACCCTATGGACGTCTGGGGCCAAGGGACCA CGGTCACCGTCTCCTCA | 87 |
| S-D9-VL-DNA | CAGTCTGCCCTGACTCAGCCTGCCTCCGTGTCTGGGTCTCCTGGACAGTCGA TCACCATCTCCTGCACTGGAACCAGAAGTGACGTTGGTGGTTATAATTATGT | 88 |

TABLE 1E-continued

Antibody S-D9

| Name | Sequence | SEQ ID NO: |
|---|---|---|
| | CTCTTGGTACCAACAGCACCCAGGCAAAGCCCCCAAACTCTTAATTTTTGGG<br>GTCAATGATCGGCCCTCAGGGGTTTCTGATCGCTTCTCTGGGTCCAGGACTG<br>GCAACACGGCCTCCCTGACCATCTCTGGGCTCCAACCTGAGGACGAGGCTGA<br>TTATTATTGCAGTTCGTTTACACGAGGCACCACTCTCCTGGTGTTCGGCGGA<br>GGGACCAAGCTGACCGTCCTAGGT | |
| VH CDR1 (Kabat) | NYWIA | 89 |
| VH CDR2 | IVNPADSDTRYSPAFQG | 90 |
| VH CDR3 | LGQDHNSGWYTYFHPMDV | 91 |
| VL CDR1 | TGTRSDVGGYNYVS | 92 |
| VL CDR2 | GVNDRPS | 93 |
| VL CDR3 | SSFTRGTTLLV | 94 |
| VH CDR1 (Chothia) | GYSFTNYW | 95 |
| VH CDR2 | VNPADSDT | 96 |
| VH CDR3 | ARLGQDHNSGWYTYFHPMDV | 97 |
| VL CDR1 | RSDVGGYNY | 98 |
| VL CDR2 | GVN | 99 |
| VL CDR3 | SSFTRGTTLLV | 100 |
| S-D9 scFv Protein | QVQLVQSGAELKKPGESLKISCTASGYSFTNYWIAWVRQMPGKGLEWMGIVN<br>PADSDTRYSPAFQGQVTMSADKSFNTAYLQWSRLKASDTAMYYCARLGQDHN<br>SGWYTYFHPMDVWGQGTTVTVSSGGGGSGGGGSGGGGSQSALTQPASVSGSP<br>GQSITISCTGTRSDVGGYNYVSWYQQHPGKAPKLLIFGVNDRPSGVSDRFSG<br>SRTGNTASLTISGLQPEDEADYYCSSFTRGTTLLVFGGGTKLTVLG | 101 |
| S-D9 scFv DNA | CAGGTGCAGCTGGTGCAATCTGGAGCAGAACTGAAAAAGCCGGGGAGTCTC<br>TGAAGATCTCTTGTACGGCTTCTGGATATAGTTTTACCAACTACTGGATCGC<br>CTGGGTGCGCCAGATGCCCGGGAAAGGCCTGGAGTGGATGGGAATCGTCAAT<br>CCTGCTGACTCTGATACCAGATACAGCCCGGCCTTCCAAGGCCAGGTCACCA<br>TGTCCGCCGACAAGTCCTTCAATACCGCCTACCTGCAGTGGAGTCGCCTGAA<br>GGCCTCGGACACCGCCATGTATTACTGTGCGAGACTTGGGCAAGATCATAAT<br>AGTGGCTGGTATACCTACTTCCACCCTATGGACGTCTGGGGCCAAGGGACCA<br>CGGTCACCGTCTCCTCAGGCGGCGGCGGCTCTGGCGGAGGTGGCAGCGGCGG<br>TGGCGGATCCCAGTCTGCCCTGACTCAGCCTGCCTCCGTGTCTGGGTCTCCT<br>GGACAGTCGATCACCATCTCCTGCACTGGAACCAGAAGTGACGTTGGTGGTT<br>ATAATTATGTCTCTTGGTACCAACAGCACCCAGGCAAAGCCCCCAAACTCTT<br>AATTTTTGGGGTCAATGATCGGCCCTCAGGGGTTTCTGATCGCTTCTCTGGG<br>TCCAGGACTGGCAACACGGCCTCCCTGACCATCTCTGGGCTCCAACCTGAGG<br>ACGAGGCTGATTATTATTGCAGTTCGTTTACACGAGGCACCACTCTCCTGGT<br>GTTCGGCGGAGGGACCAAGCTGACCGTCCTAGGT | 102 |

TABLE 1F

Trimerization Domain

| Name | Sequence | SEQ ID NO: |
|---|---|---|
| T4F Protein | PGSGYIPEAPRDGQAYVRKDGEWVLLS<br>TFLG | 103 |
| T4F DNA | CCAGGATCAGGTTATATTCCTGAAGCT<br>CCAAGAGATGGCCAAGCTTACGTTCGT<br>AAAGATGGCGAATGGGTATTACTTTCT<br>ACCTTTTTAGGA | 104 |

Antibody Binding and Competition with hACE2-ECD to SARS-CoV-2 S-RBD

To assess neutralization potential of the mAbs, this example investigated their ability to compete with ACE2-ECD for S-RBD binding by ELISA. S-B8, S-D4 and S-E6 all competed strongly with hACE2-ECD in a dose-dependent manner, with $IC_{50}$ values of 12.9±1.5 nM, 7.1±0.4 nM, and 12.2±0.7 nM, respectively (FIG. 3a). Competition between S-E6 and S-B8 or S-D4 for binding to S-RBD was also observed, indicating epitope overlap between the three antibodies. Kinetic parameters of on-rate ($k_{on}$), off-rate ($k_{off}$), and dissociation constant ($K_D$) for these antibodies were then determined by biolayer interferometry (FIGS. 3b-d, and h).

S-B8, S-D4, and S-E6 exhibited $K_D$ values of 170 pM, 120 pM and 110 pM, respectively, with S-D4 displaying a greatly reduced off-rate (FIG. 3c, h). Compared to the wild-type spike RBD, binding affinities of the three antibodies to the N501Y mutant S-RBD that is observed in the UK variant B.1.1.7 were similar with $K_D$ values of 130 pM, 97 pM and 210 pM for S-B8, S-D4, and S-E6, respectively (FIG. 3e-h). However, the binding abilities of all three antibodies were greatly affected by the E484K mutation in RBD that originally emerged in the South Africa variant B.1.351 and Brazil variant P.1, as shown by the dramatically decreased binding signals to E484K+N501Y RBD. For S-B8, binding to K417N+E484K+N501Y RBD is slightly greater than to E484K+N501Y RBD, whereas S-D4 and S-E6 exhibited similar weak binding to K417N+E484K+N501Y RBD.

This example then tested natural mutants of SARS-CoV-2 spike proteins that have been clinically associated with more severe illness and longer hospital stays, as well as the key amino-acid mutations of spike proteins in circulating variants such as B.1.1.7 and B.1.351 by FACS assay. Three mutant spike proteins (FIG. 7a-c), i.e. D215H (mut 1), S247R (mut 2), and D614G (mut 3), found in patients requiring treatment in an intensive care unit (ICU), spike mutant N439K+D614G found in mink (mut 4, FIG. 7d), B.1.1.7 spike (FIG. 7e), key mutation N501Y+D614G (mut 5, FIG. 7f) that enhances RBD affinity to hACE2 in rapidly spreading variants, E484K+N501Y+D614G (mut 6, FIG. 7g) found in B.1.351 and P.1 strains, K417N+E484K+N501Y+D614G (mut7, FIG. 7h) in the B.1.351 strain, and K417N+N501Y+D614G (mut 8, FIG. 7i), all displayed positive binding by FACS to S-B8, S-D4, and S-E6. These data indicate the antibody therapeutic potential against these natural SARS-CoV-2 variants isolated from severely affected patients and the circulating variants of concern.

By analyzing the mean fluorescent intensity (MFI) of each antibody to all of the mutants (FIG. 7j), this example found that binding of S-B8 to both mut 6 (to 18% of mut 3, FIG. 7g) and mut7 (to 14.7% of mut3, FIG. 7h) decreased significantly. Similarly, S-D4 binding to mut 6 and mut 7 detected decreased to 33.2% and 35.6% of mut 3, respectively (FIG. 7j). However, the MFI of S-E6 to mut 6 and mut 7 was similar to that of mut 3 (FIG. 7j) that differs from the BLI data and suggests some differences are detected on the spike expressed on cells versus that on the S-RBD for this antibody.

Inhibition of Cell-Cell Fusion Induced by SARS-CoV-2 Spike and hACE2

The S2 subunit of the SARS-CoV-2 spike mediates membrane fusion in hACE2 expressing cells and is essential for virus infection. hACE2 binding to SARS-CoV-2 is stronger than to the SARS-CoV spike ($K_D$ of 4.7 nM and 32 nM, respectively). To test whether these antibodies could inhibit spike-mediated membrane fusion of cells, this example established a cell-cell fusion assay using Vero cells overexpressing hACE2 as target cells, SARS-CoV-2 spike-P2A-EGFP transient transfected HEK293F cells as effector cells, and SARS-CoV spike-P2A-EGFP cells as a negative control.

Figure 4:
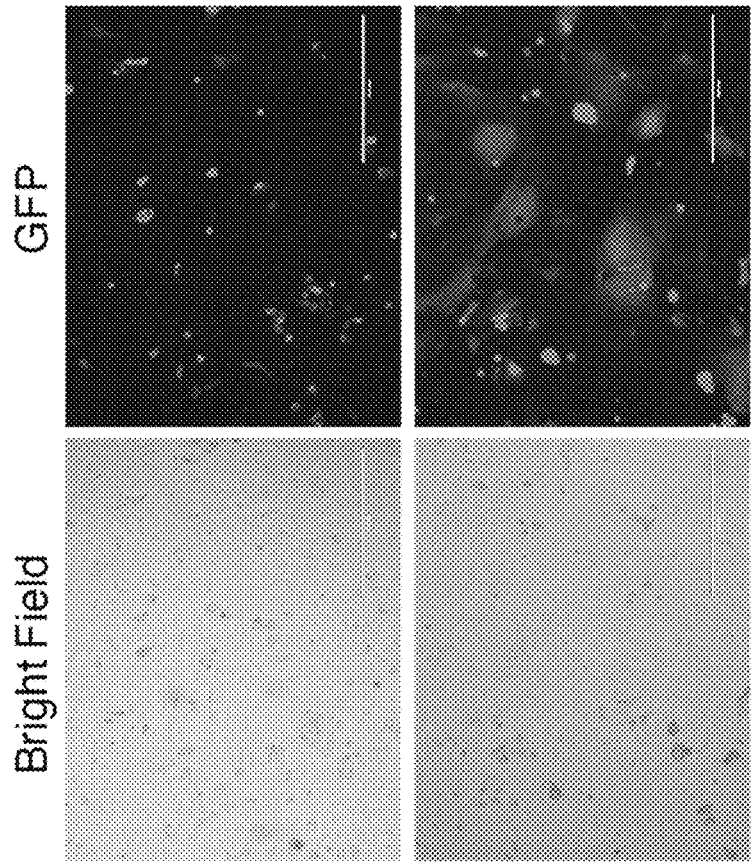
FIG. 4 Inhibition of syncytium formation by the antibodies. a Representative images of SARS-CoV-2 and SARS-CoV spike-mediated syncytium formation with hACE2 expressing cells 48 hours after co-culture. b, d Syncytium number calculation and inhibition rates when treated with 10 nM of hACE2 competitive antibodies are shown. S-RBD was used as the positive control. c, e Syncytium number and inhibition after treatment with antibodies and S-RBD at different concentrations are shown. The inhibition rates at 10 nM and 1 nM are summarized in f. Bars=400 μm. Error bars indicate SD, *P<0.05, P<0.01, *P<0.001, determined by Student's T-test.
Figure 4:
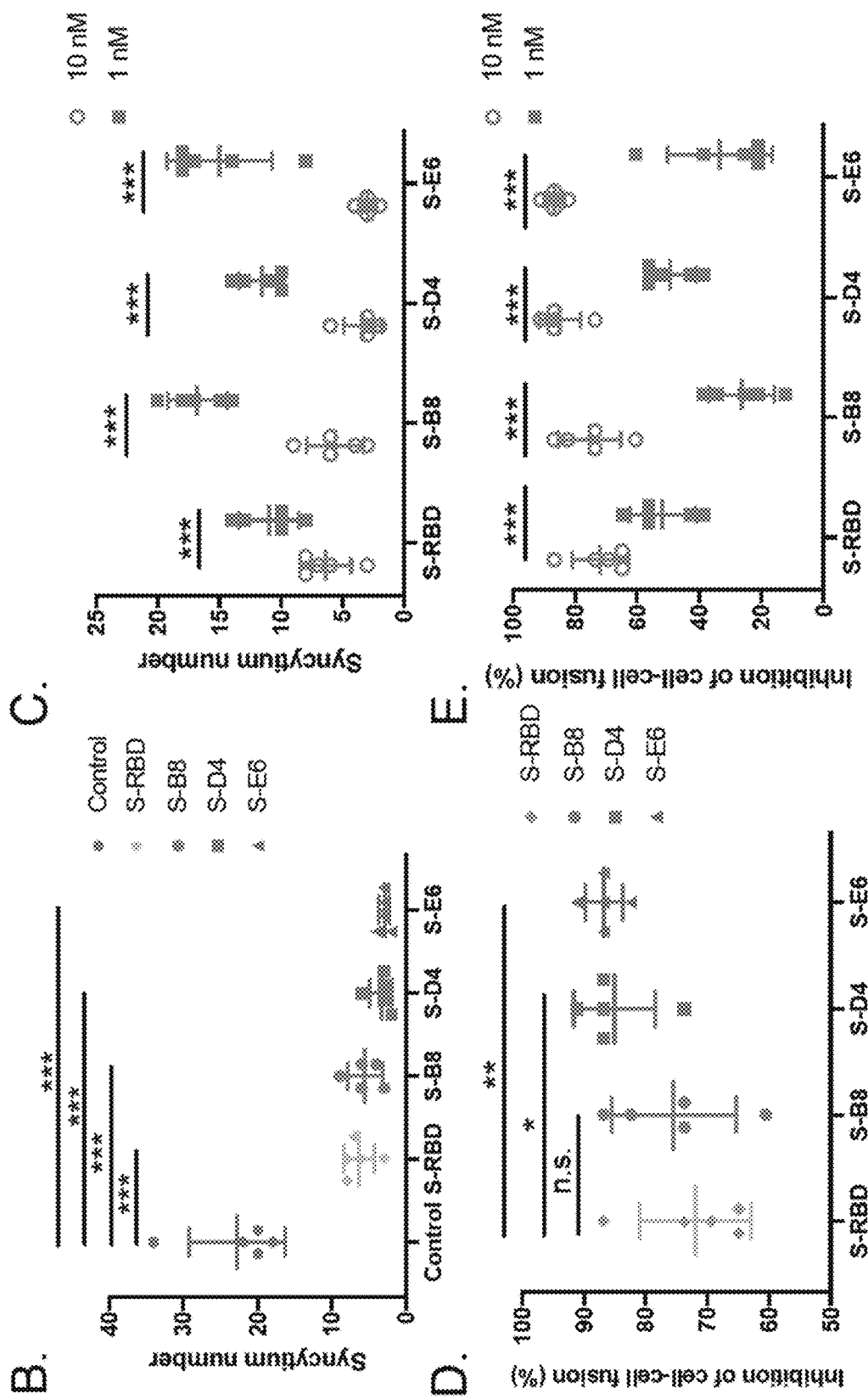

Spike-expressing HEK293F cells were mixed with S-B8, S-D4 or S-E6 at 10 nM or 1 nM just before adding to the Vero cells and syncytium formation observed 6 hours later. The SARS-CoV-2 spike induced significant cell-cell fusion as manifested by formation of larger EGFP positive cells, whereas the SARS-CoV spike barely induced syncytium formation (FIG. 4a). All three antibodies inhibited cell-cell fusion by SARS-CoV-2 at both 10 and 1 nM with 10 nM being significantly more potent (FIGS. 4b, c and f). At 10 nM, S-D4 and S-E6 exhibited over 80% inhibition of cell-cell fusion, which was slightly greater than recombinant S-RBD; S-D4 and S-E6 were also more potent than S-B8 at 1 and 10 nM (FIG. 4d, e).

Inhibition of SARS-CoV-2 Pseudovirus and Authentic Virus

To test neutralization against SARS-CoV-2 virus, this example first assessed the antibodies in a pseudovirus (PSV) infection assay. Pseudotyped particles were pre-incubated with S-B8 and S-D4 (from 200 nM to 200 fM) and S-E6 (200 nM to 6.3 fM), followed by infection of HEK293T/hACE2 cells. Luciferase activity resulting from infection was determined at 60 h post transfection. All three antibodies showed potent neutralization against wild-type SARS-CoV-2 PSV infection in a dose-dependent manner that went to completion. The $NT_{50}$ values of S-B8, S-D4, and S-E6 in the pseudovirus neutralization were determined to be 2.2±0.2 nM, 0.48±0.03 nM, and 0.025±0.002 nM, respectively (FIG. 5a) in a 1:1 interaction model with HillSlopes near 1.0 (FIG. 5b).

This example next tested antibody neutralization of authentic SARS-CoV-2 virus [BetaCoV/Australia/VIC01/2020; GenBank MT007544.1 (Victoria/01/2020), B VIC01]. Twenty hours after infection, intracellular virus was visualized and quantitated as percent infectivity. All three antibodies were capable of fully blocking infection by authentic virus B VIC01 (FIG. 5c) with $NT_{50}$ values for S-B8, S-D4 and S-E6 of 0.88±0.14 nM, 2.04±0.31 nM and 0.15±0.06 nM, respectively (FIG. 5d).

Due to the emergence of the N501Y mutation in the RBD of the B.1.1.7 strain (U.K. variant), this example also tested the neutralization abilities of the three antibodies to SARS-CoV-2 spike N501Y+D614G pseudovirus. All three antibodies appeared to display better neutralizing efficacy than to wild-type PSV. The $NT_{50}$ values of S-B8, S-D4, and S-E6 in N501Y+D614G spike pseudovirus neutralization were determined to be 0.53±0.09 nM, 0.042±0.008 nM, and 0.021±0.003 nM, respectively (FIG. 5e) in a 1:1 interaction model with HillSlopes near 1.0 (FIG. 5f). Tests on authentic SARS-CoV-2 UK variant (B.1.1.7) virus showed that all three antibodies maintain neutralization ability (FIG. 5g), with $NT_{50}$ values for S-B8, S-D4 and S-E6 of 2.16±0.28 nM, 1.88±0.20 nM and 1.15±0.14 nM, respectively (FIG. 5h). Compared to their ability to neutralize wild-type SARS-CoV-2 authentic virus, the ability of S-B8 and S-E6 to neutralize the B.1.1.7 variant decreased by approximately 2.4 and 7.6 fold, respectively (FIG. 5d, h). However, S-D4 showed slightly better potency.

As one might expect from the decrease in their binding affinity to E484K and E484K+K417N variants, all three antibodies showed dramatically decreased neutralization ability when tested against the E484K+K417N+N501Y spike mutant pseudovirus. Antibody concentrations of 200 nM were still not sufficient to completely block PSV infection. A similar decrease in neutralizing ability was observed for all three antibodies when tested against the authentic B.1.351 variant. However, S-D4 did show weak neutralization at high concentrations (>50 nM) against the B.1.351 variant.

S-B8 and S-E6 Bind the RBD and Sterically Block ACE2 Binding

Figure 6:
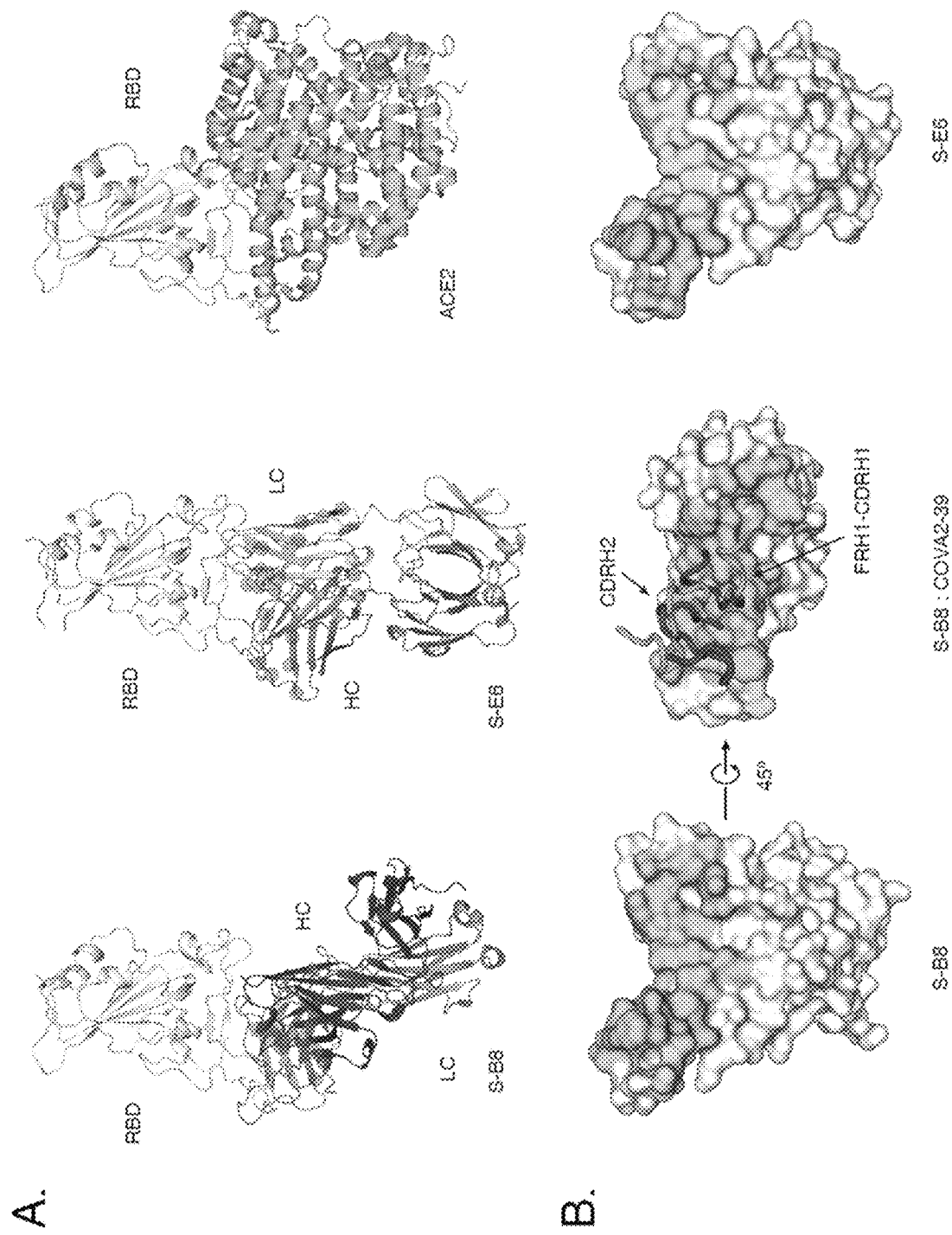
FIG. 6 Structural characterization of S-B8 and S-E6 integrating with SARS-CoV-2 S-RBD. Crystal structures are shown in ribbon representation with residues of interest in stick mode. The epitope surface on the RBD involved in interaction with the heavy and light chains of the antibodies are in orange and yellow, respectively. S-RBD is shown in white, S-B8 in blue and light blue for heavy and light chains, S-E6 heavy and light chains in orange and pink, and hACE2 in green. SHM residues are shown as semi-transparent magenta spheres and highlighted with magenta labels in c-h. a Structure comparison of S-B8 and S-E6 compared to hACE2 binding to the RBD in the same relative view. b Surface representation of S-RBD epitope residue interactions with S-B8 and S-E6. FRH1-CDRH1 and CDRH2 from both S-B8 (blue) and COVA2-39 (cyan, PDB 7JMP) are shown for comparison. c S-B8 CDRH1 and CDRH2 interaction with RBD. d Interaction between S-B8 and RBD ridge. e Interaction between S-E6 and RBD ridge. f Comparison to IGHV3-53 binding mode A. CC12.3 (pink for heavy chain and light pink for light chain) in complex with SARS-CoV-2 S-RBD (PDB 6XC7) illustrating the hydrogen bonding between the $_{32}NY_{33}$ motif and S-RBD. g Interaction between S-E6 and RBM mid-region. h Interaction between S-E6 and RBM on the opposite side of the S-RBD ridge.
Figure 6:
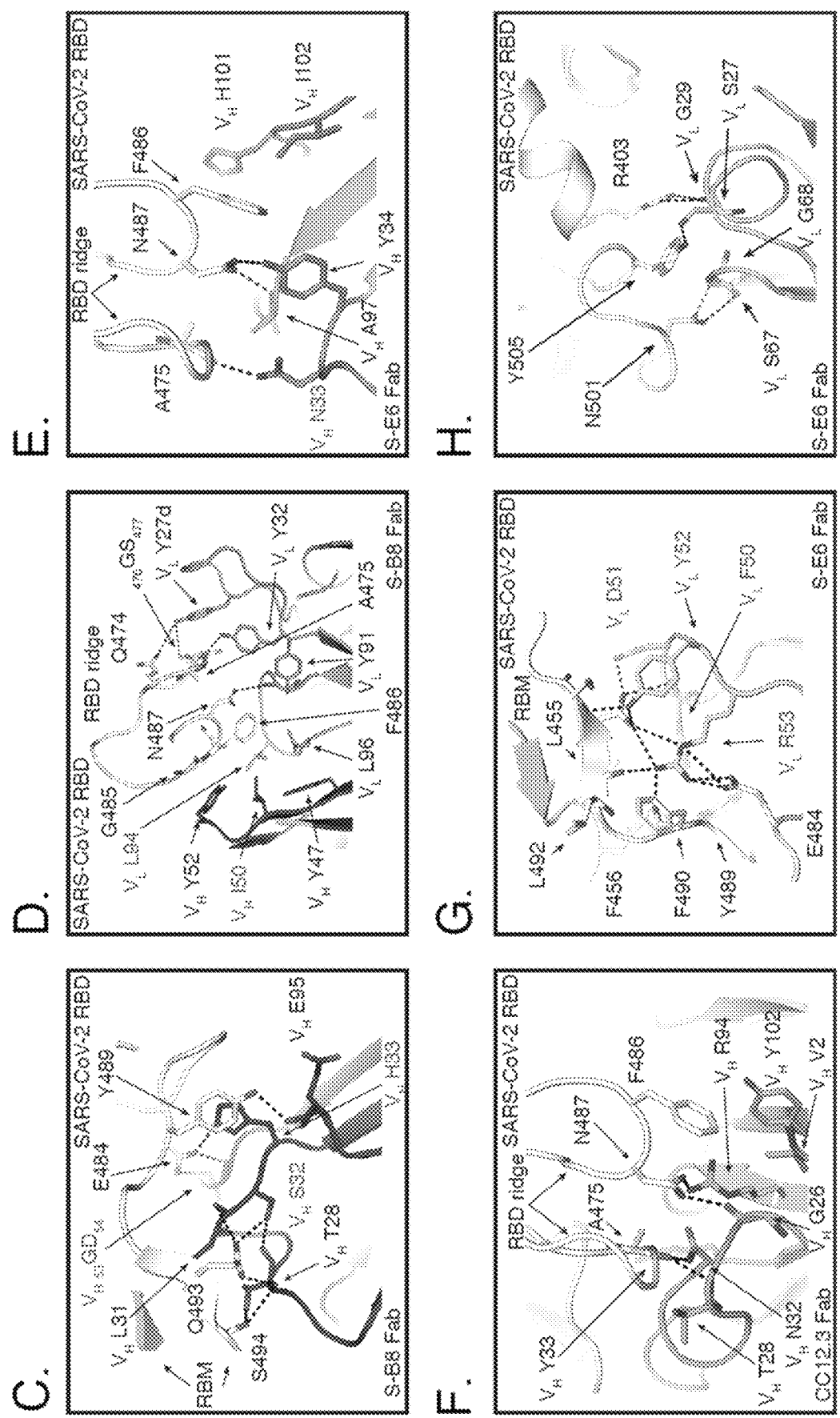

To elucidate the molecular recognition of S-B8 and S-E6 for SARS-CoV-2 S-RBD, x-ray structures of Fab+RBD complexes were determined to 2.25 and 2.70 Å, respectively (Table 2). Fab S-B8 and S-E6 bind the receptor binding site (RBS) with different approach angles (FIG. 6a) and sterically compete with ACE2 for RBD binding, consistent with the competition assay (FIG. 3a). S-B8 interacts mainly using its heavy chain, which contributes 73% of the buried surface area (BSA, 737 of 1010 Å$^2$) (FIG. 6b) and 12 of 16 polar contacts (Table 3). S-E6 predominately uses its light chain, which contributes 63% of the BSA (530 of 847 Å$^2$) and 16 of 19 polar contacts (Table 3). Light-chain dominant interactions are less common in antibodies.

TABLE 2

Crystallographic data collection and refinement statistics

| | S-B8 + RBD | S-E6 + RBD |
|---|---|---|
| Data collection | | |
| Beamline | APS 23ID-B | APS 23ID-B |
| Wavelength (Å) | 1.03317 | 1.03373 |
| Space group | R 1 3 1 | C 1 2 1 |
| Unit cell parameters | | |
| a, b, c (Å) | 191.6, 191.6, 117.4 | 242.1, 70.2, 91.9 |
| α, β, γ (°) | 90, 90, 120 | 90, 108.5, 90 |
| Resolution (Å) [a] | 50.0-2.25 | 50.0-2.70 |
| | (2.30-2.25) | (2.75-2.70) |
| Unique reflections [a] | 74,079 (3,622) | 37,826 (1,647) |
| Redundancy [a] | 6.4 (2.6) | 3.5 (2.6) |
| Completeness (%) [a] | 97.4 (71.4) | 93.3 (82.8) |
| $<I/\sigma_I>$ [a] | 17.3 (1.4) | 12.5 (1.7) |
| $R_{sym}$ [b] (%) [a] | 9.8 (44.6) | 9.2 (56.0) |
| $R_{pim}$ [b] (%) [a] | 4.0 (28.5) | 5.5 (38.0) |
| $CC_{1/2}$ [c] (%) [a] | 99.4 (77.5) | 98.4 (72.0) |
| Refinement statistics | | |
| Resolution (Å) | 47.9-2.25 | 49.3-2.70 |
| Reflections (work) | 70,217 | 33,627 |
| Reflections (test) | 3,821 | 1,791 |
| $R_{cryst}$[d]/$R_{free}$[e] (%) | 17.9/22.1 | 23.6/28.3 |
| No. of atoms | 10,193 | 8,955 |
| Macromolecules | 9,665 | 8,927 |
| Glycans | 28 | 28 |
| Solvent | 500 | — |
| Average B-value (Å$^2$) | 42 | 47 |
| Macromolecules | 42 | 47 |
| Fab | 40 | 43 |
| RBD | 46 | 57 |
| Glycans | 65 | 113 |
| Solvent | 45 | — |
| Wilson B-value (Å$^2$) | 37 | 44 |
| RMSD from ideal geometry | | |
| Bond length (Å) | 0.005 | 0.004 |
| Bond angle (°) | 0.78 | 0.67 |
| Ramachandran statistics (%) | | |
| Favored | 97.8 | 95.5 |
| Outliers | 0.0 | 0.2 |
| PDB code | 7KN3 | 7KN4 |

[a] Numbers in parentheses refer to the highest resolution shell.
[b] $R_{sym} = \Sigma_{hkl}\Sigma_i |I_{hkl,i} - <I_{hkl}>|/\Sigma_{hkl}\Sigma_i I_{hkl,i}$ and $R_{pim} = \Sigma_{hkl}(1/(n-1))^{1/2}\Sigma_i |I_{hkl,i} - <I_{hkl}>|/\Sigma_{hkl}\Sigma_i I_{hkl,i}$, where $I_{hkl,i}$ is the scaled intensity of the $i^{th}$ measurement of reflection h, k, l, $<I_{hkl}>$ is the average intensity for that reflection, and n is the redundancy.
[c] $CC_{1/2}$ = Pearson correlation coefficient between two random half datasets.
[d] $R_{cryst} = \Sigma_{hkl} |F_o - F_c|/\Sigma_{hkl} |F_o| \times 100$, where $F_o$ and $F_c$ are the observed and calculated structure factors, respectively.
[e] $R_{free}$ was calculated as for $R_{cryst}$, but on a test set comprising 5% of the data excluded from refinement.

TABLE 3

Hydrogen bonds and salt bridges identified at the antibody-RBD interface *

| Chain | Residue | Atom | Distance (Å) | Chain | Residue | Atom |
|---|---|---|---|---|---|---|
| | S-B8 | | | | SARS-CoV-2 RBD | |
| | | | Hydrogen bonds | | | |
| H | GLY 26 | N | 3.8 | A | TYR 449 | OH |
| H | THR 28 | N | 2.9 | A | GLN 493 | OE1 |
| H | THR 28 | N | 3.4 | A | SER 494 | OG |
| H | THR 28 | OG1 | 2.5 | A | SER 494 | OG |
| H | GLY 53 | N | 2.9 | A | GLU 484 | OE1 |
| H | ASP 54 | N | 3.7 | A | GLU 484 | OE2 |
| H | ASN 76 | ND2 | 3.3 | A | TYR 449 | OH |
| H | ALA 24 | O | 3.9 | A | TYR 449 | OH |
| H | LEU 31 | O | 3.7 | A | GLN 493 | NE2 |
| H | SER 32 | OG | 3.0 | A | GLN 493 | NE2 |
| H | GLU 95 | O | 2.8 | A | TYR 489 | OH |
| L | TYR 32 | OH | 2.7 | A | ALA 475 | O |
| L | TYR 27d | OH | 3.7 | A | SER 477 | O |
| L | TYR 27d | OH | 3.7 | A | GLN 474 | NE2 |
| L | TYR 91 | O | 3.2 | A | ASN 487 | ND2 |
| | | | Salt bridges | | | |
| H | HIS 33 | NE2 | 3.1 | A | GLU 484 | OE1 |
| | S-E6 | | | | SARS-CoV-2 RBD | |
| | | | Hydrogen bonds | | | |
| H | ASN 33 | ND2 | 2.9 | A | ALA 475 | O |
| H | ALA 97 | N | 2.8 | A | ASN 487 | OD1 |
| H | TYR 34 | OH | 2.9 | A | ASN 487 | ND2 |
| L | ARG 53 | NH2 | 2.7 | A | PHE 490 | O |
| L | ARG 53 | NH2 | 3.0 | A | LEU 492 | O |
| L | ARG 53 | NE | 3.7 | A | GLN 493 | OE1 |
| L | TYR 52 | OH | 3.0 | A | GLN 493 | OE1 |
| L | ARG 53 | NH2 | 3.4 | A | GLN 493 | OE1 |
| L | GLY 68 | N | 3.3 | A | ASN 501 | OD1 |
| L | SER 27 | OG | 2.2 | A | TYR 505 | OH |
| L | GLY 29 | O | 3.1 | A | ARG 403 | NH1 |
| L | GLY 29 | O | 3.2 | A | ARG 403 | NH2 |
| L | PHE 50 | O | 3.2 | A | GLN 493 | NE2 |
| L | ASP 51 | OD2 | 3.0 | A | GLN 493 | NE2 |
| L | TYR 52 | OH | 2.7 | A | SER 494 | N |
| L | SER 67 | O | 3.6 | A | ASN 501 | ND2 |
| | | | Salt bridges | | | |
| L | ARG 53 | NH1 | 3.6 | A | GLU 484 | OE1 |
| L | ARG 53 | NE | 4.0 | A | GLU 484 | OE2 |
| L | ARG 53 | NH1 | 2.5 | A | GLU 484 | OE2 |

* Somatically hypermutated residues are highlighted in yellow.

IgBLAST analysis suggests S-B8 is derived from IGHV3-66, a germline that is highly similar to IGHV3-53. However, in S-B8, $_{32}NY_{33}$ in CDRH1 is mutated to $_{32}SH_{33}$ and $_{53}SCGS_{56}$ ($_{53}TGGT_{56}$ in COVA2-39) in CDRH2 to $_{53}GDGN_{56}$. Intriguingly, CDRH1 and CDRH2, as well as FRH1, of S-B8 still bind to a similar region on SARS-CoV-2 S-RBD to that of binding mode B (FIG. 6b). The $_{32}SH_{33}$ in S-B8 is part of a type I beta-turn (FIG. 6c). $V_H$ S32 side chain hydrogen bonds with RBD Q493 and the $V_H$ T28 carbonyl oxygen. The $V_H$ H33 imidazole forms a salt bridge with RBD E484 and a π-π interaction with Y489. The $V_H$ $_{53}GD_{54}$ backbone in CDRH2 also forms two hydrogen bonds with E484, and $V_H$ T28 and L31 make four hydrogen bonds with Q493 and S494 (FIG. 6c, Table 3). F486 in the S-RBD ridge region is buried in a hydrophobic pocket ($V_H$ W47, $V_H$ I50, $V_L$ Y91, $V_L$ L94, $V_L$ L96) between the heavy and light chains, while $_{485}GF_{486}$ and $_{476}GS_{477}$ on the RBD ridge interact with $V_H$ Y52 and $V_L$ Y27d via π-π interactions (FIG. 6d).

S-E6 Interaction with SARS-CoV-2 S-RBD

S-E6 is an IGHV4-31 antibody. Interestingly, SHM introduces a $_{33}NY_{34}$ sequence in a similar position to the $_{32}NY_{33}$ motif in CDRH1 in IGHV3-53/3-66 antibodies that interact with the same RBD site but in a different orientation compared to $_{32}NY_{33}$ of IGHV3-53 binding mode A. Nevertheless, $V_H$ N33 still hydrogen bonds with RBD A475 carbonyl (FIG. 6e), as does $V_H$ N32 of IGHV3-53 in binding mode A (FIG. 6f). $V_H$ Y34 and $V_H$ A97 form two hydrogen bonds with N487 of the S-RBD (FIG. 6e), which differ from Y33 in IGHV3-53 antibodies (FIG. 60. F486, along with N487, interact with a hydrophobic pocket formed by $V_H$ Y34, A97, H101 and 1102 of S-E6 and also make π-π and cation-π interactions (FIG. 6e). However, the S-E6 light chain contributes the majority of the buried surface with the RBD. CDRL2$_{50}$FDYR$_{53}$ interact with the receptor binding motif (RBM) via multiple polar interactions (8 hydrogen bonds and 3 salt bridges) to E484, F490, L492, Q493 and S494 (FIG. 6g, Table 3). Moreover, $V_L$ F50 interacts with a nearby hydrophobic patch formed by L455, F456 and Y489 (FIG. 6g), and $V_L$ S27, G29, S67 and G68 form five hydrogen bonds with R403, N501 and Y505 on the other side of the RBS ridge (FIG. 6h, Table 3). However, residue 501 is located at the edge of S-E6 epitope site with space that allows for accommodation of the tyrosine mutation at the site (FIG. 6h). The neutralization of N501Y+D614G pseudovirus suggests that residue 501 is not critical in the binding site of S-E6 since no significant change in the neutralization potency is observed between wild-type and the mutant virus (FIG. 5e, f).

SHM Residues Form Specific Interactions with the RBD

Most RBD-targeting neutralizing antibodies isolated from COVID-19 patients have minimal SHM, although some antibodies expressed from memory B cells several months after infection have increased SHM. The antibodies derived from the combinatorial antibody library in this study are highly mutated. S-B8 and S-E6 contain 13 and 22 SHM residues, respectively, several of which are in the antibody paratope (FIG. 6), including $V_{H\ 31}$LSH$_{33}$, $V_{H\ 50}$IT$_{51}$, $V_{H\ 53}$GD$_{54}$, $V_H$ N$_{56}$, $V_H$ D$_{58}$ and $V_L$ L94 in S-B8, and $V_H$ N$_{33}$, $V_L$ V$_{39}$, $V_{L\ 50}$FDYR$_{53}$ and $_{65}$TR$_{66}$ in S-E6 (FIG. 6c-g). In summary, several SHM residues appear to be critical for interaction with SARS-CoV-2 RBD. The interaction with SHM residues appear to be mainly with the heavy chain in S-B8 or the light chain in S-E6.

Antibody Autoreactivity

To investigate the origin of the three antibodies, a HEp-2 autoreactivity assay was performed. Neither S-D4 nor S-E6 showed a positive signal in the assay, suggesting that they are not derived from an auto-immune response, whereas S-B8 displayed weak to moderate autoreactivity. This example further generated an S-B8 putative germline antibody by mutating back all of the SHMs in the S-B8 heavy chain to the naïve IGHV3-66 sequence. The mutated antibody showed greater autoreactivity than S-B8 and no S-RBD binding up to 12.5 nM.

Antibody-Dependent Enhancement (ADE) Activity Assessment of the Three Antibodies ADE occurs through two distinct mechanisms during viral infections, one via enhanced infection mediated by FcγRIIa expressed on monocytes and macrophages, and the other via enhanced immune activation caused by excessive Fc-mediated effector functions and immune complex formation. In these antibody constructs, this example adopted an engineered IgG4e1(S228P) format to reduce the affinity to Fcγ receptors (FcγRs). The ADE effects of the three antibodies were assessed in three cell lines expressing different levels of FcγR. The qPCR results revealed high level FcγIA and IIA, high level FcγIIA, and low level FcγIIB and IIIA for THP-1, K562, Raji, respectively. Treatment of Raji, K562 and THP-1 cells with a mixture of SARS-CoV-2 pseudovirus with different concentrations of S-B8, S-D4 and S-E6 showed no apparent ADE effects.

Three potent neutralizing antibodies were discovered in this example. Interestingly, they do not cross-react with the SARS-CoV spike protein (FIG. 2b), which is likely due to differences in the epitope (~70% difference) in the receptor binding site between SARS-CoV and SAR-CoV-2 targeted by these antibodies. In addition, neither of the three antibodies bind to other five HCoVs (FIG. 2c-g). Moreover, autoreactivity assay in a HEp-2 cell ruled out that S-E6 and S-D4 originate from autoimmune responses, whereas S-B8 showed weak to moderate autoreactivity, which was increased in the S-B8 putative germline antibody.

The structural studies on S-E6 and S-B8 revealed several striking features of these combinatorial antibodies. The primary immune response to viral infection is followed by a secondary response that generates functionally better antibodies, where the binding energy can be refined by somatic hypermutation. The secondary immune response is for later encounter of the same antigen, and is the basis of vaccination. In cases of pandemics, such as SARS-CoV-2, avian influenza or Ebola virus, if the infection is not dealt with by the immune system in the first few days, the patient has a high probability of dying, and as a consequence, the immune system will not have enough time to refine the immune response. Consistently, neutralizing antibodies isolated from SARS-CoV-2 convalescent patients contain only a few amino-acid mutations that may be a result of weak B cell stimulation due to rapid viral clearance. Neutralizing antibodies isolated from convalescent patients shortly after infection may then possibly not be fully refined (matured). However, a recent study has shown higher levels of SHM several months after infection in some COVID-19 patients.

In comparison, S-B8 and S-E6 exhibited higher levels of SHM, many of which are involved in specific interactions with SARS-CoV-2 RBD (S-RBD). Nine of 13 SHM residues in S-B8 and eight of 22 in S-E6 are located in the antibody-antigen interface. While some of these SHM residues only use their peptide backbone, others rely on specific side chains for S-RBD binding (FIGS. 6c, d, e, and g). Interestingly, SHM in CDRH1 of S-E6 generates a $_{33}$NY$_{34}$ sequence that is similar to the $_{32}$NY$_{33}$ motif in IGHV3-53/3-66 antibodies, which are the most frequent germlines used in targeting the S-RBD, indicative that the combinatorial antibody library and the maturation process can yield alternate antibody solutions. However, it is unclear how these SHM residues could have been raised specifically to the SARS-CoV-2 S-RBD, since the library was generated before the SARS-CoV-2 pandemic.

Of note, the heavy and light chains are randomly paired during the selection experiment. However, S-E6 is a light-chain dominant antibody and most of the SHM residues in the heavy chain are not involved in interaction with SARS-CoV-2 RBD. Thus, these findings raise fascinating questions about the original antigen(s) that elicited S-B8 and S-E6, at least to the heavy or light chains that dominate binding to SARS-CoV-2 RBD.

Example 2. Testing with New Mutants

The following assays were conducted to test the antibodies for newer mutants.

Affinity to N501Y RBD Determination by Biolayer Interferometry (BLI)

Binding affinities of S-D4 with SARS-CoV-2 N501Y S-RBD were performed by BLI on an Octet RED96 (Molecular Devices LLC, San Jose, CA, USA) using AR2G biosensors. N501Y S-RBD diluted in a PBS solution containing 0.02% Tween-20 and 0.05% BSA (PBST-B) (10 μg/mL) was loaded to the AR2G biosensor by amine coupling. The AR2G-N501Y S-RBD sensors were dipped into a PBST-B for 60 sec to establish a baseline, and then incubated with 2-fold serial diluted S-D4 antibody solutions to record the progressive curves of association. Finally, sensors were incubated in a PBST-B buffer to record the progressive curves of dissociation. For S-B8 and S-E6 detections, N501Y S-RBD was first biotinylated before loading onto a streptavidin (SA) sensor, the remaining procedure was same to that of S-D4. Results were analyzed by ForteBio Data Analysis software.

Figure 8:
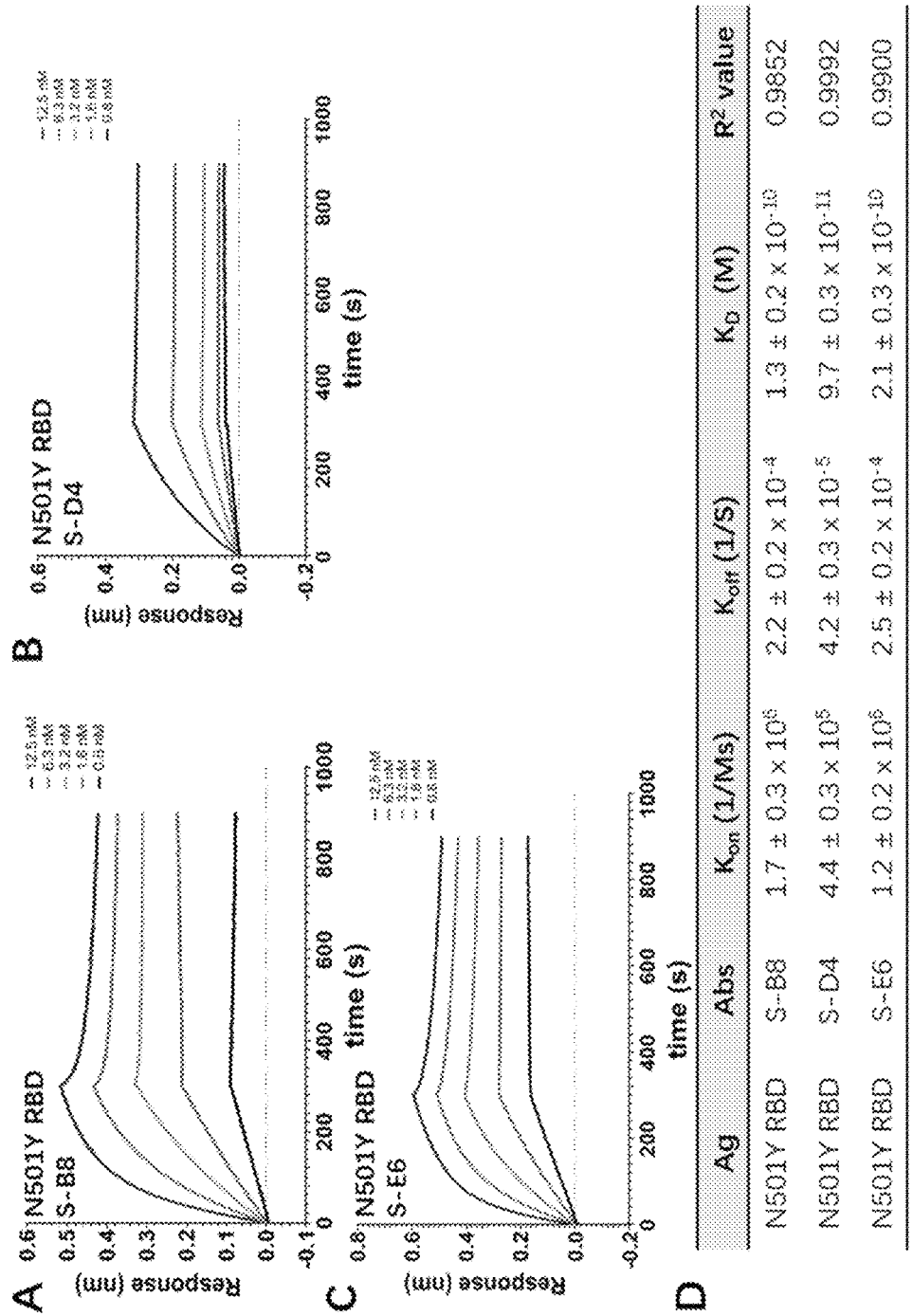
FIG. 8 Binding kinetics to the N501Y S-RBD. A-C. Binding kinetics with N501Y S-RBD were measured by biolayer interferometry (BLI). Biotinylated N501Y S-RBD was loaded onto the SA biosensor for detection of binding kinetics with S-B8 (A) and S-E6 (C), while N501Y S-RBD amine coupled onto AR2G sensor was utilized for S-D4 (B), with detection on an Octet. All curves were fitted by a 1:1 binding model using the Data Analysis software (Forte Bio). D. The association-rate ($k_{on}$), dissociation-rate ($k_{off}$) and dissociation constant ($K_D$) of the three competitive antibodies to N501Y S-RBD are shown.

Binding kinetics with N501Y S-RBD were measured by biolayer interferometry (BLI). Biotinylated N501Y S-RBD was loaded onto the SA biosensor for detection of binding kinetics with S-B8 (FIG. 8A) and S-E6 (FIG. 8C), while N501Y S-RBD amine coupled onto AR2G sensor was utilized for S-D4 (FIG. 8B), with detection on an Octet. All curves were fitted by a 1:1 binding model using the Data Analysis software (Forte Bio). The association-rate ($k_{on}$), dissociation-rate ($k_{off}$) and dissociation constant ($K_D$) of the three competitive antibodies to N501Y S-RBD are shown in FIG. 8D. All three antibodies exhibited potent binding affinities to N501Y S-RBD.

Neutralization of SARS-CoV-2 N501Y Pseudovirus

SARS-CoV-2 N501Y+D614G coronavirus pseudovirus (PSV) was first prepared, HEK293T/hACE2 cells were then seeded into 96-well white bottom plates at a density of $1\times10^4$/well, and cultivated overnight. The PSV was pre-incubated with an equal volume of different concentrations of selected antibodies (dilution factor: 3.16, from 200 nM to 20 fM for S-D4 and S-E6, 200 nM to 0.6 pM for S-B8) in DMEM at 37° C. for 30 min. DMEM with or without PSV in the absence of antibodies were set as controls. After incubation, the PSV mixture was transferred to the culture plates containing HEK293T/hACE2 cells. The DMEM media containing PSV and antibodies were replaced with fresh media after 16 h treatment, cells were incubated for an additional 48 h. PSV infection efficacy was evaluated by luciferase activity using Bright-Lumi™ Firefly Luciferase Reporter Gene Assay Kit (Beyotime, RG015M). Fifty microliter of luciferase substrate was added to each well, and the relative luminescence unit (RLU) values were measured on an Envision plate reader (PerkinElmer, Ensight).

Figure 9:
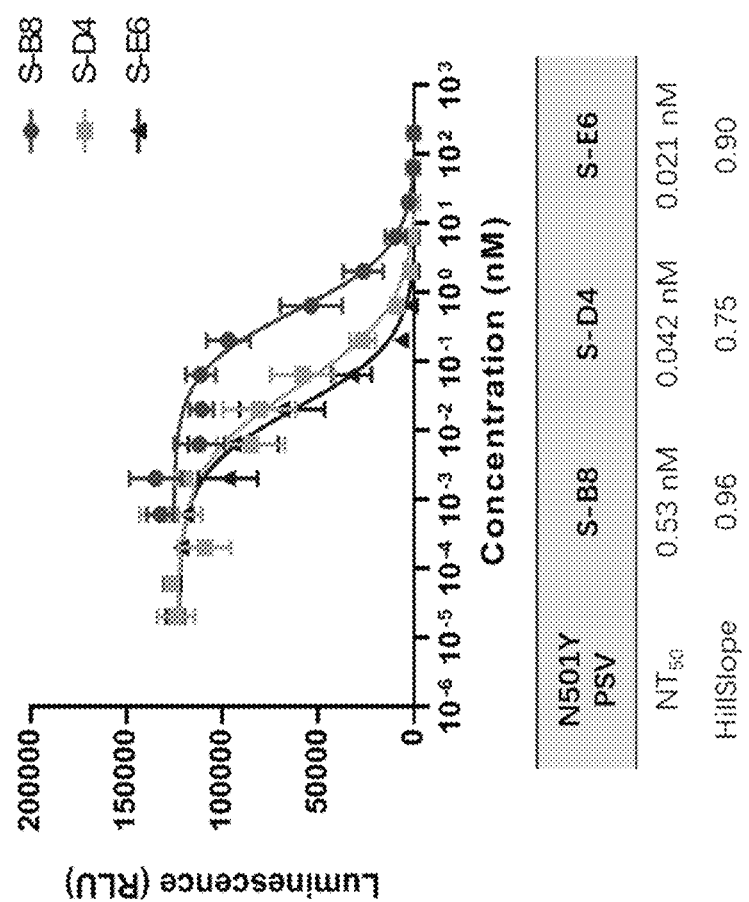
FIG. 9 Neutralization to N501Y pseudovirus for the three hACE2 competitive antibodies. Neutralization ability of the three hACE2 competitive antibodies to SARS-CoV-2 N501Y+D614G mutant pseudovirus was tested and fitted, $NT_{50}$ and HillSlope are shown in the lower panel.

Neutralization ability of the three hACE2 competitive antibodies to SARS-CoV-2 N501Y+D614G mutant pseudovirus was tested and fitted, $NT_{50}$ and HillSlope are shown in the lower panel of FIG. 9. All three antibodies showed superior neutralization abilities.

Authentic B.1.1.7 SARS-CoV-2 Virus Neutralization Assay

The study was performed in the CL3 Facility of the University of Oxford operating under license from the HSE, on the basis of an agreed Code of Practice, Risk Assessments (under ACDP) and Standard Operating Procedures. In brief, this rapid, high-throughput assay determines the concentration of antibody that produces a 50% reduction in infectious focus-forming units of B.1.1.7 authentic SARS-CoV-2 strains in Vero cells, as follows. Quadruplicate, 0.5 $\log_{10}$ serial dilutions of antibody (9 steps from 316 nM to 31 pM) were pre-incubated with a fixed dose of SARS-CoV-2 (B.1.1.7 variant) before incubation with Vero cells. A 1.5% carboxymethyl cellulose-containing overlay was used to prevent satellite focus formation. Twenty hours post-infection, the monolayers were fixed with 4% paraformaldehyde, permeabilized with 2% Triton X-100 and stained for N antigen using mAb EY 2A. After development with a peroxidase-conjugated antibody and True Blue peroxidase substrate, infectious foci were enumerated by ELISPOT reader. Data were analyzed using four-parameter logistic regression (Hill equation) in GraphPad Prism 8.3.

Figure 10:
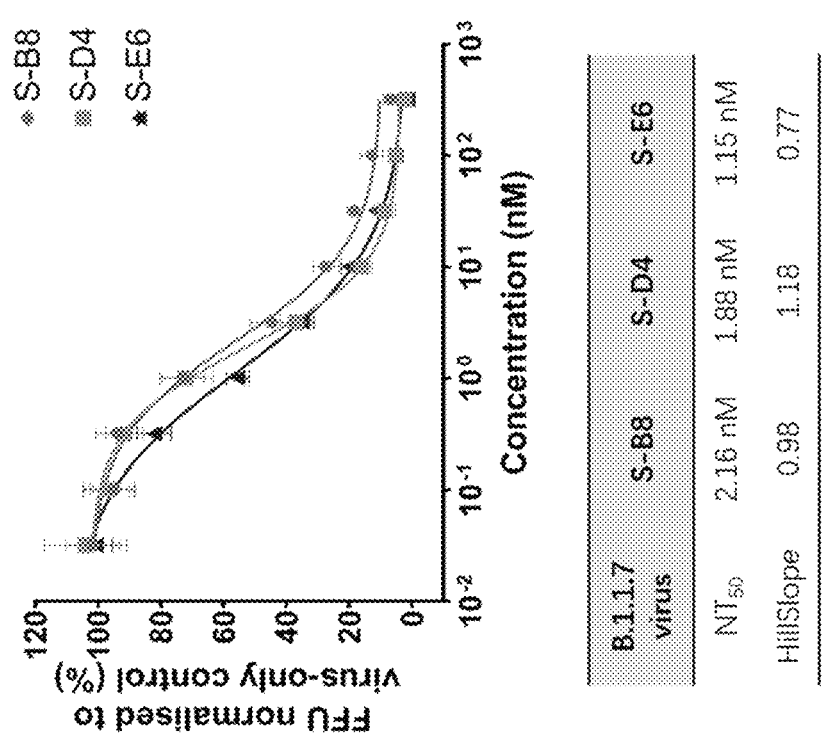
FIG. 10 Neutralization to B.1.1.7 authentic virus for the three hACE2 competitive antibodies. Neutralization ability of the three hACE2 competitive antibodies to authentic virus of B.1.1.7 strain was tested and fitted, $NT_{50}$ and HillSlope are shown in the lower panel.

Neutralization ability of the three hACE2 competitive antibodies to authentic virus of B.1.1.7 strain was tested and fitted, $NT_{50}$ and HillSlope are shown in the lower panel of FIG. 10. All three antibodies showed superior neutralization abilities.

Neutralization of SARS-CoV-2 K417N+E484K+N501Y Pseudovirus by S-D4 Antibody

SARS-CoV-2 K417N+E484K+N501Y+D614G coronavirus pseudovirus (PSV) was first prepared, HEK293T/hACE2 cells were then seeded into 96-well white bottom plates at a density of $1\times10^4$/well, and cultivated overnight. The PSV was pre-incubated with an equal volume of different concentrations of S-D4 antibody (dilution factor: 3.16, from 200 nM to 0.6 pM) in DMEM at 37° C. for 30 min. DMEM with or without PSV in the absence of antibody were set as controls. After incubation, the PSV mixture was transferred to the culture plates containing HEK293T/hACE2 cells. The DMEM media containing PSV and antibody were replaced with fresh media after 16 h treatment, cells were incubated for an additional 48 h. PSV infection efficacy was evaluated by luciferase activity using Bright-Lumi™ Firefly Luciferase Reporter Gene Assay Kit (Beyotime, RG015M). Fifty microliter of luciferase substrate was added to each well, and the relative luminescence unit (RLU) values were measured on an Envision plate reader (PerkinElmer, Ensight).

Figure 11:
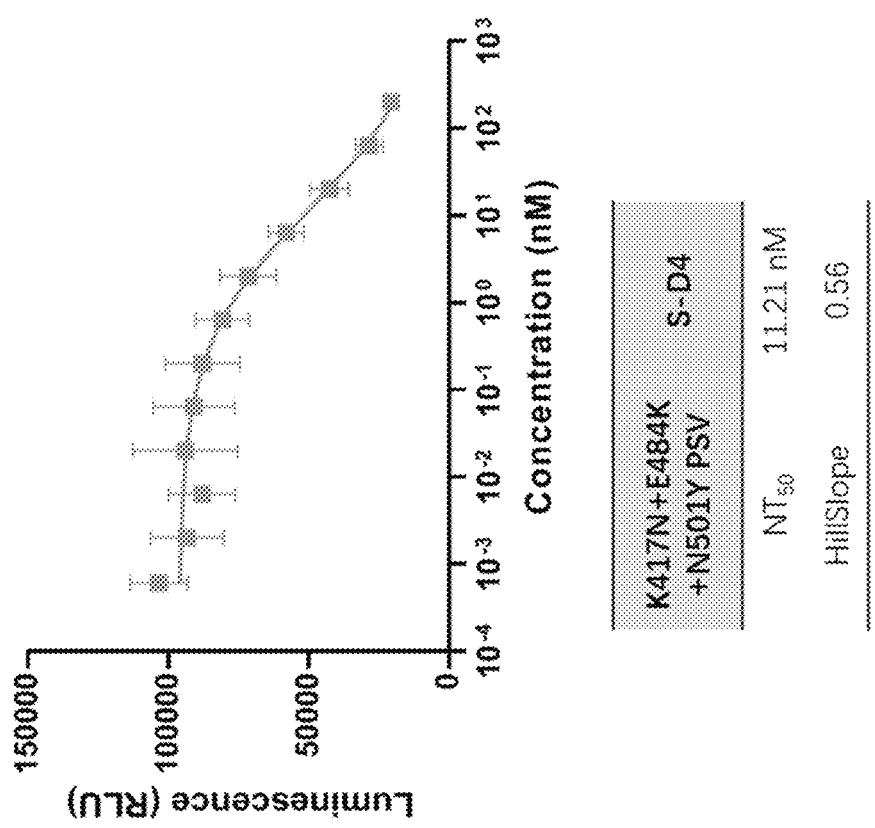
FIG. 11 Neutralization to K417N+E484K+N501Y pseudovirus for S-D4 antibody. Neutralization ability of S-D4 antibody to SARS-CoV-2 K417N+E484K+N501Y+D614G mutant pseudovirus was tested and fitted, $NT_{50}$ and HillSlope are shown in the lower panel.

Neutralization ability of S-D4 antibody to SARS-CoV-2 K417N+E484K+N501Y+D614G mutant pseudovirus was tested and fitted, $NT_{50}$ and HillSlope are shown in the lower panel of FIG. 11. S-D4 showed superior neutralization abilities.

Authentic B.1.351 SARS-CoV-2 Virus Neutralization Assay

The study was performed in the CL3 Facility of the University of Oxford operating under license from the HSE, on the basis of an agreed Code of Practice, Risk Assessments (under ACDP) and Standard Operating Procedures. In brief, this rapid, high-throughput assay determines the concentration of antibody that produces a 50% reduction in infectious focus-forming units of B.1.351 authentic SARS-CoV-2 strains in Vero cells, as follows. Quadruplicate, 0.5 $\log_{10}$ serial dilutions of antibody (9 steps from 316 nM to 31 pM) were pre-incubated with a fixed dose of SARS-CoV-2 (B.1.351 variant) before incubation with Vero cells. A 1.5% carboxymethyl cellulose-containing overlay was used to prevent satellite focus formation. Twenty hours post-infection, the monolayers were fixed with 4% paraformaldehyde, permeabilized with 2% Triton X-100 and stained for N antigen using mAb EY 2A. After development with a peroxidase-conjugated antibody and True Blue peroxidase substrate, infectious foci were enumerated by ELISPOT reader. Data were analyzed using four-parameter logistic regression (Hill equation) in GraphPad Prism 8.3.

Figure 12:
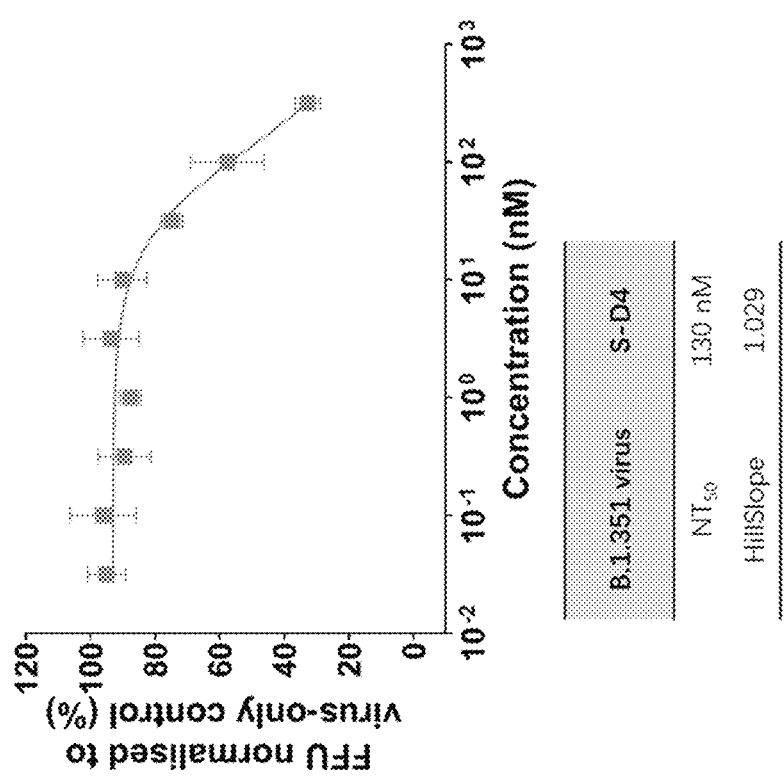
FIG. 12 Neutralization to B.1.351 authentic virus for the S-D4 antibody. Neutralization ability of S-D4 antibody to authentic virus of B.1.351 strain was tested and fitted, $NT_{50}$ and HillSlope are shown in the lower panel.

Neutralization ability of S-D4 antibody to authentic virus of B.1.351 strain was tested and fitted. The $NT_{50}$ and HillSlope are shown in the lower panel FIG. 12 demonstrating the excellent neutralization ability of S-D4.

Example 3. Trimeric Format of SARS-CoV-2 RBD-Targeting Antibodies Retrieve Ultrapotent Neutralization Ability Against Immune Escape Mutants This example developed a trimeric form of anti-spike RBD antibodies. As compared to the monomeric and dimeric forms, the trimeric form significantly increased the binding avidity to spike RBD, and surprisingly, it neutralized the immune-escape strain B.1.351 (beta) potently with an $NT_{50}$ of 36 pM and completely neutralized the B.1.617.2 (delta) strain with an $NT_{50}$ of 7 pM. By applying this trimeric format engineering method to other RMB-targeting antibodies, they also achieved significant neutralizing effects. The $NT_{50}$ values improved up to 30-fold.

Materials and Methods

Cell Culture

The FreeStyle™ 293F (HEK293F, ThermoFisher Scientific) cell line was cultured in Freestyle 293 expression media (ThermoFisher Scientific). HEK293T/hACE2 stable cell line was maintained in high glucose Dulbecco Modified Eagle Medium (DMEM) (Gibco) containing 10% (v/v) fetal bovine serum (FBS) (Gemini), with addition of 10 µg/mL puromycin.

Production and Purification of Recombinant Multivalent Antibodies

For multivalent antibodies engineering, taken S-E6 as example, we constructed trimeric antibodies of S-E6 by fusing T4 bacteriophage fibritin trimerization motif (T4F), GCN4 trimeric helices, or TSE tag to the C-terminus of the S-E6 Fab heavy chain, respectively. For fusing trimerization tags with antibody, different linkers were tried, including variable length of rigid linkers (EAAAK, SEQ ID NO:105).

For monomer and trimer antibodies, the encoding sequence of Fab domain of S-E6 heavy chain was cloned into expression vector with 6×His tag on C-terminal. HEK293F overexpressing each recombinant protein was cultured for 4 days. Recombinant proteins were harvested from the supernatant. After centrifugation, HisTrap Excel HP column (GE Healthcare) and HiTrap Protein A HP column (GE Healthcare) were used to purify His-tag (monomer and trimer antibodies) and hFc-tag proteins (dimer antibodies), respectively. The procedure followed manufacturer's instruction. Briefly, for His-tag proteins, after loading of the supernatant to a HisTrap column, the column was washed with a binding buffer (500 mM NaCl, 20 mM sodium phosphate, 20 mM imidazole, pH 7.4), and eluted with 500 mM imidazole in PBS buffer. For hFc-tag antibodies, after elution, the recombinant antibodies were buffer exchanged and concentrated in PBS buffer (150 mM NaCl, 20 mM sodium phosphate, pH 7.2) using Ultracel membrane with molecular weight cutoff of 30 kDa (Merck Millipore) and stored at −80° C. until use.

Size-Exclusion-High-Performance Liquid Chromatography (SEC-HPLC)

Twenty µL of 0.5 µg/µL purified antibodies were applied to an Agilent Bio SEC-5, 500A HPLC system. The mobile phase used was PBS buffer (pH 7.2) running at a flow rate of 0.35 mL/min Absorbance was analyzed and integrated by retention time and area under the curve (AUC) to determine the percentage of aggregation, monomer and degradants compositions. Signal was monitored by A280. Data processing was performed using the GraphPad Prism software.

Affinity Determination by Biolayer Interferometry (BLI)

The binding affinities of multivalent antibodies with SARS-CoV-2 wild-type or mutant S-RBD were performed by BLI on an Octet RED96 system (Molecular Devices LLC, San Jose, CA, USA) at room temperature. In brief, biotin conjugated S-RBD or mutant S-RBD diluted in a PBS solution containing 0.02% Tween-20 and 0.05% BSA (PBST-B) (10 µg/mL) was captured on a SA-coated biosensor (ForteBio). The baseline was recorded for 60 sec in a running buffer (PBST-B), and then the sensors recorded the progressive curves of association stage for 300 sec in wells containing 2-fold serial diluted antibody solutions. In the dissociation step, sensors were incubated in a PBST-B buffer for 600 sec to record the progressive curves of dissociation. The average $k_{on}$, $k_{off}$ and $k_D$ values were calculated from all the binding curves based on the fitting with a 1:1 Langmuir binding model.

Production of SARS-CoV-2 Wild-Type and Mutant Pseudovirus

Pseudovirions were produced by co-transfected HEK293T cells with the WT or mutant spikeΔ19 plasmid and NL4-3 mcherry Luciferase plasmid (addgene) by using Lipofectamine 3000 reagent (Invitrogen). The virus-containing supernatants were harvested 48 h post-transfection, filtered through 0.45 µm filter, and mixed with Lenti-X Concentrator (Takara) overnight at 4° C., then centrifuged at 1500 g for 45 min to remove supernatants. The pellets were collected and stored at −80° C. until use.

Pseudovirus-Based Neutralization Assay 96-well white bottom plates were seeded with $1 \times 10^4$ HEK293T/hACE2 cells per well. The following day, antibodies were subjected to a 3.16-fold dilution series. An equal volume of different concentrations of antibodies was mixed with PSVs of wild type or mutant. After incubation for 30 min at 37° C., the mixture was added to 96-well plates. After 16 hours cultivation at 37° C., the inoculum was replaced with fresh media, cells were incubated for additional 48 h. PSV infection efficacy was evaluated by luciferase activity using Bright-Lumi™ Firefly Luciferase Reporter Gene Assay Kit (Beyotime, RG015M). $NT_{50}$ values were calculated using the "log (inhibitor) vs. response" equation in GraphPad Prism software.

Results

Trimeric S-E6 Shows Enhanced Neutralization Ability than the Full IgG Format

It has been demonstrated that the binding and neutralization of RBS targeting antibodies are significantly reduced against the E484K containing spike mutations. Our computational modeling demonstrates that a trimeric antibody could simultaneously bind to the three monomers in the spike, a trimeric protein (FIG. 1A). The trimeric antibody, therefore, was contemplated to have higher binding avidity and better neutralizing potency to the immune escape mutants.

Figure 13:
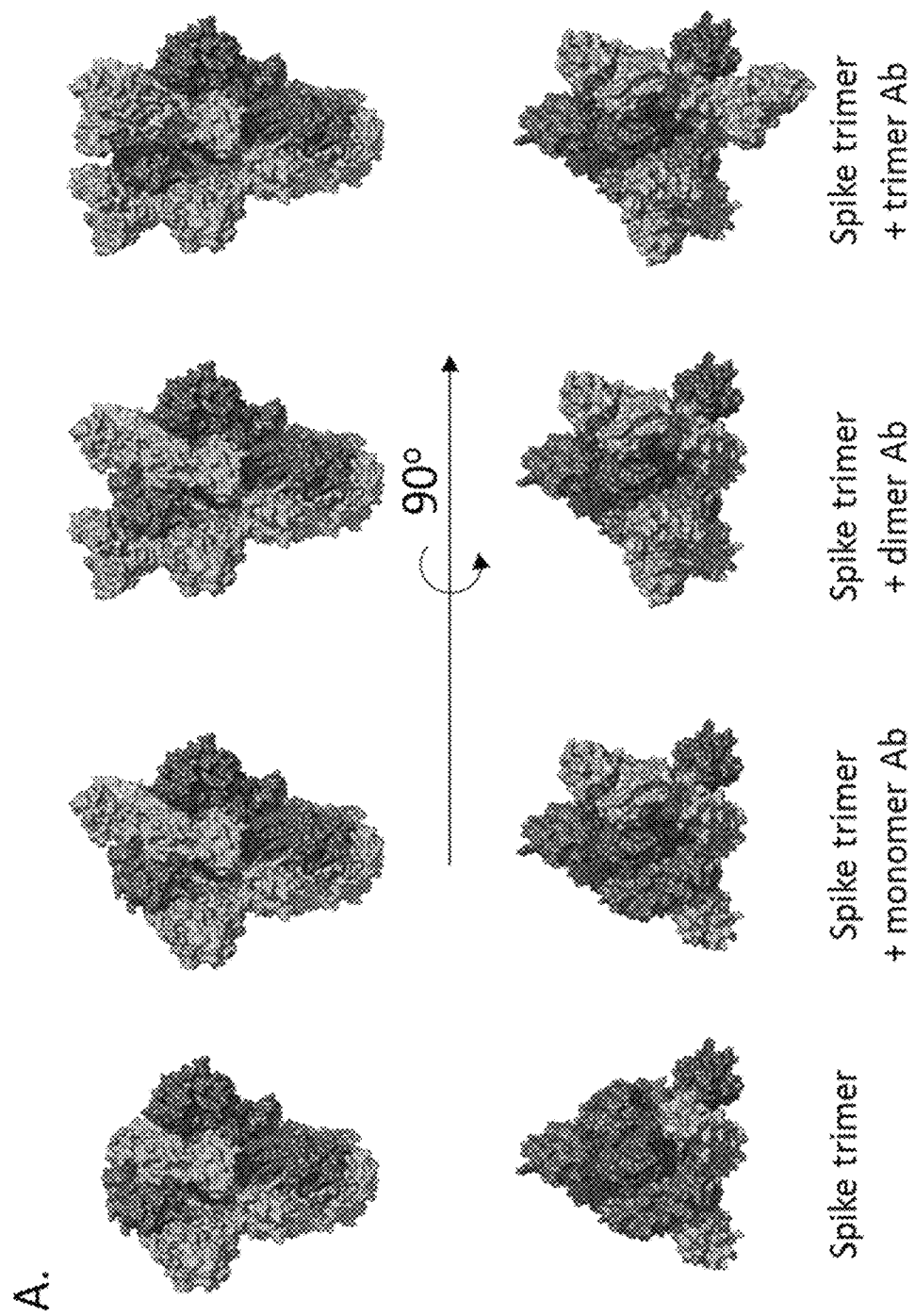
FIG. 13 Trimeric antibody shows enhanced neutralizing activity to wild-type SARS-CoV-2 pseudovirus. A. Scheme of monomer, dimer and trimer antibodies bound to spike protein. B. SDS-PAGE analysis of reduced form mono-, di-, and tri-S-E6. C. SEC-HPLC analyses demonstrate the homogeneity of mono-(cyan), di-(purple), and tri-S-E6 (orange). D. Neutralization ability of the different valents of S-E6 to WT SARS-CoV-2 pseudovirus was tested and fitted, trimer S-E6 was constructed by fusing CH1 to T4F tag with 3(G4S) linker. E. Neutralization ability of three trimer S-E6 with different trimerization tags to WT SARS-CoV-2 pseudovirus was tested and fitted, the tags were fused to CH1 with 3(G4S) linker. F. Neutralization ability of three trimer S-E6 with different lengths of rigid linkers to WT SARS-CoV-2 pseudovirus was tested and fitted, the linkers were used to fuse T4F tag. G. Construction of monomer, dimer and trimer of antibodies. For the trimer antibody, heavy chain plasmid was constructed by fusing CH1 domain (dark blue) with trimerization tag (light orange) with linker (gray), the C-terminal His tag (dark orange) was added for antibody purification.
Figure 13:
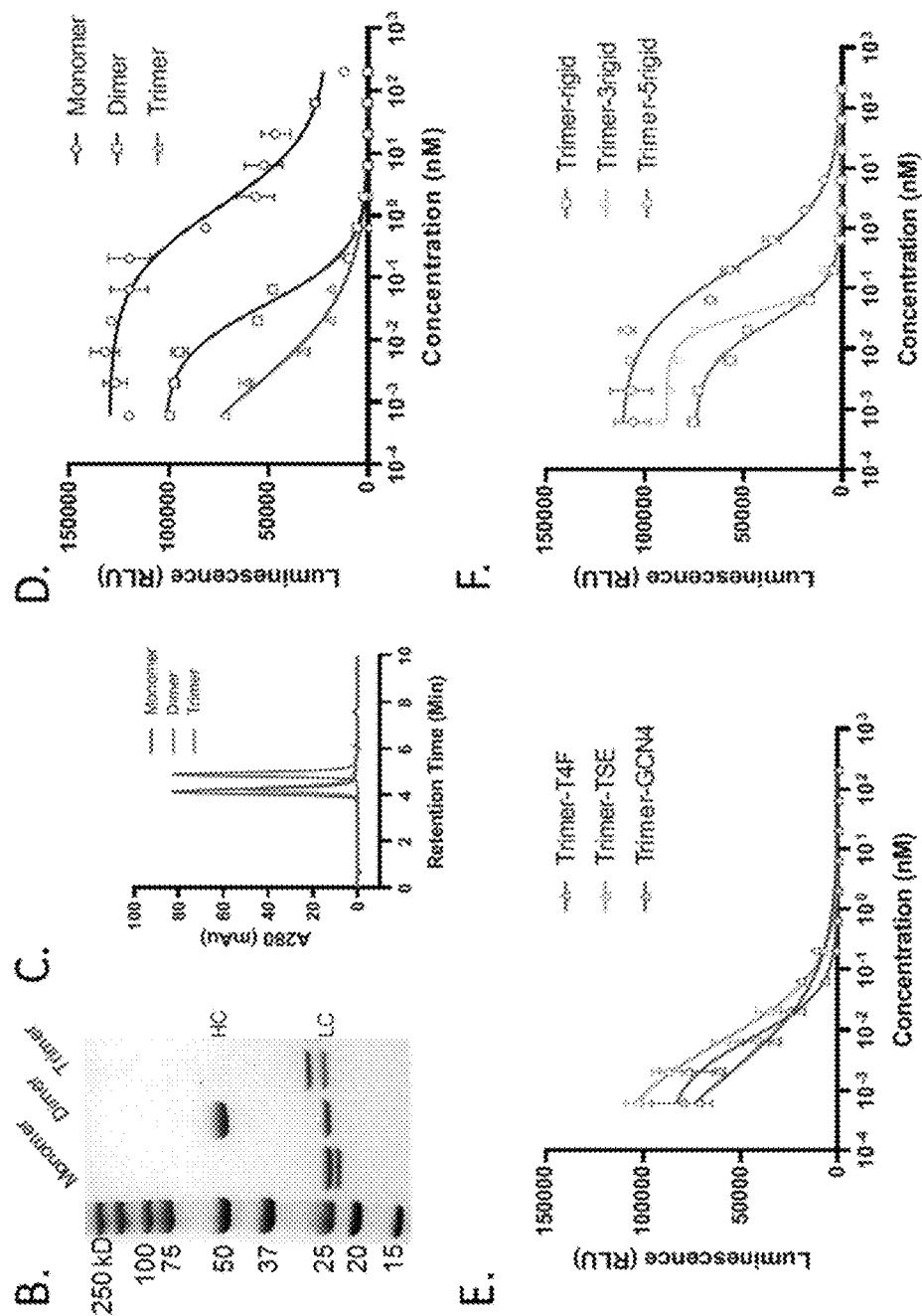
Figure 13:
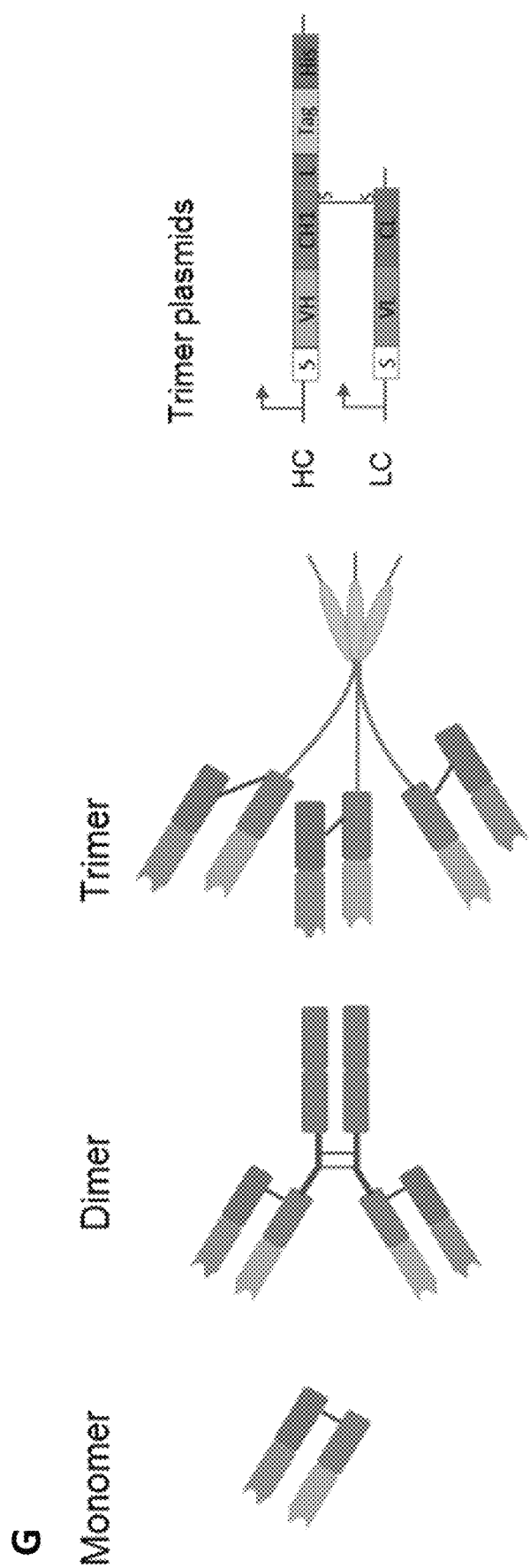

Here, we used S-E6 as an example to optimize the system. In order to prove the concept, S-E6 was first engineered into a trimeric format by fusing the CH1 domain with a trimerization tag T4F with a $(G_4S)_3$ linker (FIG. 13G). Both SDS-PAGE analysis and SEC-HPLC results indicate the trimeric S-E6 was well assembled and showed homogenous distribution (FIG. 13B, C). The results showed that the trimeric S-E6 ($NT_{50}$ 0.0016±0.001 nM) was more potent than the dimer ($NT_{50}$=0.036±0.004 nM) and monomer ($NT_{50}$ 1.3±0.4 nM)S-E6 in neutralizing SARS-CoV-2 wild-type pseudovirus (WT-PSV) (FIG. 13D). These results demonstrate that the trimer-Fab format antibodies do have better neutralizing potency than the conventional IgG format.

To optimize the trimeric format, we first compared the trimeric efficiency of three trimeric domains, including T4 bacteriophage fibritin trimerization motif (T4F), GCN4 trimeric leucine zipper motif (GCN4), and human collagen XVIII derived homotrimerization domain (TIE). All trimeric proteins yielded pure proteins on SDS-PAGE, but GCN4-tagged antibodies come up with two peaks in the HPLC-SEC separation, indicating non-homogeneous composition.

TABLE 4

Related Sequences

| Name | Sequence | SEQ ID NO: |
|---|---|---|
| S-E6 Trimer (G4S)3 TIE Heavy Chain | QVTLRESGPGLVKPSETLSLTCAVSGGSLSSVNYYWSIRQHPGKGLEW IGYIYYSGSTNYNPSLKSRVTMSLDTSKNQFSLKLSSVTAADTAVYYCA TPGAIMGALHIWGQGTLVTVSSASTKGPSVFPLAPSSKSTSGGTAALGC LVKDYFPEPVTVSWNSGALTSGVHTFPAVLQSSGLYSLSSVVTVPSSSL GTQTYICNVNHKPSNTKVDKKVEPPKSGGGGSGGGGSGGGGSSGVRLWA TRQAMLGQVHEVPEGWLIFVAEQEELYVRVQNGFRKVQLEARTPLPRGT DNE | 106 |
| TIE | SGVRLWATRQAMLGQVHEVPEGWLIFVAEQEELYVRVQNGFRKVQLEAR TPLPRGTDNE | 107 |
| S-E6 Light Chain | QAVLTQPSSASSTPGQRVIISCSGSSSNIGSNTVSWYQQVPGAAPKLLI YFDYRRPSGVPDRFSGTRSGTSASLGISGLQSEDEADYYCAAWDDSLSA WVFGRGTKLTVLGGLGGLVDYKGQPKAAPSVTLFPPSSEELQANKATLV CLISDFYPGAVTVAWKADSSPVKAGVETTTPSKQSNNKYAASSYLSLTP EQWKSHRSYSCQVTHEGSTVEKTVAPTECS | 108 |
| S-E6 Trimer (G4S)3 T4F Heavy Chain | QVTLRESGPGLVKPSETLSLTCAVSGGSLSSVNYYWSIRQHPGKGLEW IGYIYYSGSTNYNPSLKSRVTMSLDTSKNQFSLKLSSVTAADTAVYYCA TPGAIMGALHIWGQGTLVTVSSASTKGPSVFPLAPSSKSTSGGTAALGC LVKDYFPEPVTVSWNSGALTSGVHTFPAVLQSSGLYSLSSVVTVPSSSL GTQTYICNVNHKPSNTKVDKKVEPPKSGGGGSGGGGSGGGGSPGSGYIP EAPRDGQAYVRKDGEWVLLSTFLG | 109 |
| T4F | PGSGYIPEAPRDGQAYVRKDGEWVLLSTFLG | 103 |
| S-E6 Trimer (G4S)3 T4F Heavy Chain GCN4 | QVTLRESGPGLVKPSETLSLTCAVSGGSLSSVNYYWSIRQHPGKGLEW IGYIYYSGSTNYNPSLKSRVTMSLDTSKNQFSLKLSSVTAADTAVYYCA TPGAIMGALHIWGQGTLVTVSSASTKGPSVFPLAPSSKSTSGGTAALGC LVKDYFPEPVTVSWNSGALTSGVHTFPAVLQSSGLYSLSSVVTVPSSSL GTQTYICNVNHKPSNTKVDKKVEPPKSGGGGSGGGGSGGGGSMKQIEDK IEEILSKIYHIENEIARIKKLIGEV | 110 |
| GCN4 | MKQIEDKIEEILSKIYHIENEIARIKKLIGEV | 111 |
| S-B8 Trimer (G4S)3 T4F Heavy Chain T4F | QVQLVQSGGGLIQPGGSLRLSCAASGFTVSLSHMNWVRQAPGKGLEWVS ITYGDGNSDYADSVKGRFTISRDNSKNTLYLQMNSLRAEDTAVYYCARE YYYGMDVWGQGTTVTVSSASTKGPSVFPLAPSSKSTSGGTAALGCLVKD YFPEPVTVSWNSGALTSGVHTFPAVLQSSGLYSLSSVVTVPSSSLGTQT YICNVNHKPSNTKVDKKVEPPKSGGGGSGGGGSGGGGSPGSGYIPEAPR DGQAYVRKDGEWVLLSTFLG | 112 |
| S-B8 Trimer Light Chain | DIVMTQSPDSLAVSLGERATINCKSSQSVLYSSNNKNYLAWYQQKPGQP PKLLIYWASTRESGVPDRFSGSGSGTDFTLTISSLQAEDVAVYYCQQYY SLPLTFGGGTKLEIKRRTVAAPSVFIFPPSDEQLKSGTASVVCLLNNFY PREAKVQWKVDNALQSGNSQESVTEQDSKDSTYSLSSTLTLSKADYEKH KVYACEVTHQGLSSPVTKSFNRGEC | 113 |
| S-B2 Trimer (G4S)3 T4F Heavy Chain T4F | QVQLQESGGGVVQPGRSLRLSCAASGFTFSSYAMHWVRQAPGKGLEWVA VISYDGSNKYYADSVKGRFTISRDNSKNTLYLQMNSLRAEDTAVYYCAR DYGDYLLDYWGQGTLVTVSSASTKGPSVFPLAPSSKSTSGGTAALGCLV KDYFPEPVTVSWNSGALTSGVHTFPAVLQSSGLYSLSSVVTVPSSSLGT QTYICNVNHKPSNTKVDKKVEPPKSGGGGSGGGGSGGGGSPGSGYIPEA PRDGQAYVRKDGEWVLLSTFLG | 114 |
| S-B2 Trimer Light Chain | LSALTQPASASGSPGQSVTISCTGTSSDVGGYNYASWYQQHPGKAPKLL IYEVTKRPSGVPDRFSSSKSGNTASLTVSGLQAEDEADYYCSSYTGTLL LFGGGTKLTVLGQPKAAPSVTLFPPSSEELQANKATLVCLISDFYPGAV TVAWKADSSPVKAGVETTTPSKQSNNKYAASSYLSLTPEQWKSHRSYSC QVTHEGSTVEKTVAPTECS | 115 |
| S-D9 Trimer (G4S)3 T4F Heavy Chain T4F | QVQLVQSGAELKKPGESLKISCTASGYSFTNYWIAWVRQMPGKGLEWMG IVNPADSDTRYSPAFQGQVTMSADKSFNTAYLQWSRLKASDTAMYYCAR LGQDHNSGWYTYFHPMDVWGQGTTVTVSSASTKGPSVFPLAPSSKSTSG GTAALGCLVKDYFPEPVTVSWNSGALTSGVHTFPAVLQSSGLYSLSSVV TVPSSSLGTQTYICNVNHKPSNTKVDKKVEPPKSGGGGSGGGGSGGGGS PGSGYIPEAPRDGQAYVRKDGEWVLLSTFLG | 116 |
| S-D9 Trimer Light Chain | QSALTQPASVSGSPGQSITISCTGTRSDVGGYNYVSWYQQHPGKAPKLL IFGVNDRPSGVSDRFSGSRTGNTASLTISGLQPEDEADYYCSSFTRGTT LLVFGGGTKLTVLGQPKAAPSVTLFPPSSEELQANKATLVCLISDFYP GAVTVAWKADSSPVKAGVETTTPSKQSNNKYAASSYLSLTPEQWKSHRS YSCQVTHEGSTVEKTVAPTECS | 117 |
| 2489 Trimer (G4S)3 T4F | QLQLQESGPGLVKPSETLSLTCTVSGGSISSTTYYWGWIRQPPGKGLEW IASIYYSGSTYYNPSLKSRLTVSVDTSKNQFSLKLSSVTAADTAAVYYCA | 118 |

TABLE 4-continued

Related Sequences

| Name | Sequence | SEQ ID NO: |
|---|---|---|
| Heavy Chain T4F | RQWKWFGEAWYFDLWGRGTLVTVSSASTKGPSVFPLAPSSKSTSGGTAA<br>LGCLVKDYFPEPVTVSWNSGALTSGVHTFPAVLQSSGLYSLSSVVTVPS<br>SSLGTQTYICNVNHKPSNTKVDKKVEPPKSGGGGSGGGGSGGGGS*PGSG*<br>*YIPEAPRDGQAYVRKDGEWVLLSTFLG* | |
| 2489 Trimer Light Chain | EIVLTQSPGTLSLSPGERASLSCRASQSVSSSYLAWYQQKPGQAPRLLI<br>YGASSRATGIPDRFSGSGSGTDFTLTISRLEPEDFAVYYCQQYGSSPFT<br>FGGGTKVEIKRTVAAPSVFIFPPSDEQLKSGTASVVCLLNNFYPREAKV<br>QWKVDNALQSGNSQESVTEQDSKDSTYSLSSTLTLSKADYEKHKVYACE<br>VTHQGLSSPVTKSFNRGEC | 119 |
| S309 Trimer (G4S)3 T4F Heavy Chain T4F | QVQLVQSGAEVKKPGASVKVSCKASGYPFTSYGISWVRQAPGQGLEWMG<br>WISTYNGNTNYAQKFQGRVTMTTDTSTTTGYMELRRLRSDDTAVYYCAR<br>DYTRGAWFGESLIGGFDNWGQGTLVTVSSASTKGPSVFPLAPSSKSTSG<br>GTAALGCLVKDYFPEPVTVSWNSGALTSGVHTFPAVLQSSGLYSLSSVV<br>TVPSSSLGTQTYICNVNHKPSNTKVDKKVEPPKSGGGGSGGGGSGGGGS<br>*PGSGYIPEAPRDGQAYVRKDGEWVLLSTFLG* | 120 |
| S309 Trimer Light Chain | EIVLTQSPGTLSLSPGERATLSCRASQTVSSTSLAWYQQKPGQAPRLLI<br>YGASSRATGIPDRFSGSGSGTDFTLTISRLEPEDFAVYYCQQHDTSLTF<br>GGGTKVEIKRTVAAPSVFIFPPSDEQLKSGTASVVCLLNNFYPREAKVQ<br>WKVDNALQSGNSQESVTEQDSKDSTYSLSSTLTLSKADYEKHKVYACEV<br>THQGLSSPVTKSFNRGEC | 121 |
| (G4S) linker | GGGGS | 122 |
| (G4S)3 linker | GGGGSGGGGSGGGGS | 123 |
| 1rigid linker | EAAAK | 105 |
| 3rigid linker | EAAAKEAAAKEAAAK | 124 |
| 5rigid linker | EAAAKEAAAKEAAAKEAAAKEAAAK | 125 |

We further analyzed the neutralization capabilities of these trimmers. T4F-fused antibody showed the best neutralizing potency (T4F, $NT_{50}$=0.0016±0.001 nM; TSE, $NT_{50}$=0.0066±0.001 nM; GCN4, $NT_{50}$=0.0073±0.001 nM) (FIG. 13E). To compare the effects of different linkers, the flexible GS linker was replaced with different lengths of rigid linker (1-5 repeats of EAAAK; SEQ ID NO:105). The 3- and 5-repeated rigid linker mediated trimers (3rigid, $NT_{50}$=0.038±0.002 nM; 5 rigid, $NT_{50}$=0.20±0.035 nM) shows similar or decreased neutralizing ability, while the Trimer-1rigid S-E6 improves moderately ($NT_{50}$=0.026±0.002 nM) (FIG. 13F). Thus, we fused CH1 domain to T4F with 3($G_4S$) linker in the following experiment (Table 5).

TABLE 5

Neutralizing parameters of nAbs

| | $NT_{50}$ (WT) (nM) | $NT_{50}$ (B.1.351) (nM) |
|---|---|---|
| S-E6 monomer | 1.3 ± 0.4 | 3.2 ± 0.3 |
| S-E6 dimer | 0.036 ± 0.004 | 0.32 ± 0.22 |
| S-E6 trimer (T4F) | 0.0016 ± 0.001 | 0.036 ± 0.022 |
| S-E6 trimer (TIE) | 0.0066 ± 0.0011 | 0.079 ± 0.086 |
| S-E6 trimer (GCN4) | 0.0073 ± 0.0015 | 0.102 ± 0.036 |
| S-E6 trimer (1 rigid linker) | 0.025 ± 0.002 | N.A. |
| S-E6 trimer (3 rigid linker) | 0.038 ± 0.002 | 0.618 ± 0.100 |
| S-E6 trimer (5 rigid linker) | 0.20 ± 0.04 | N.A. |

Figure 14:
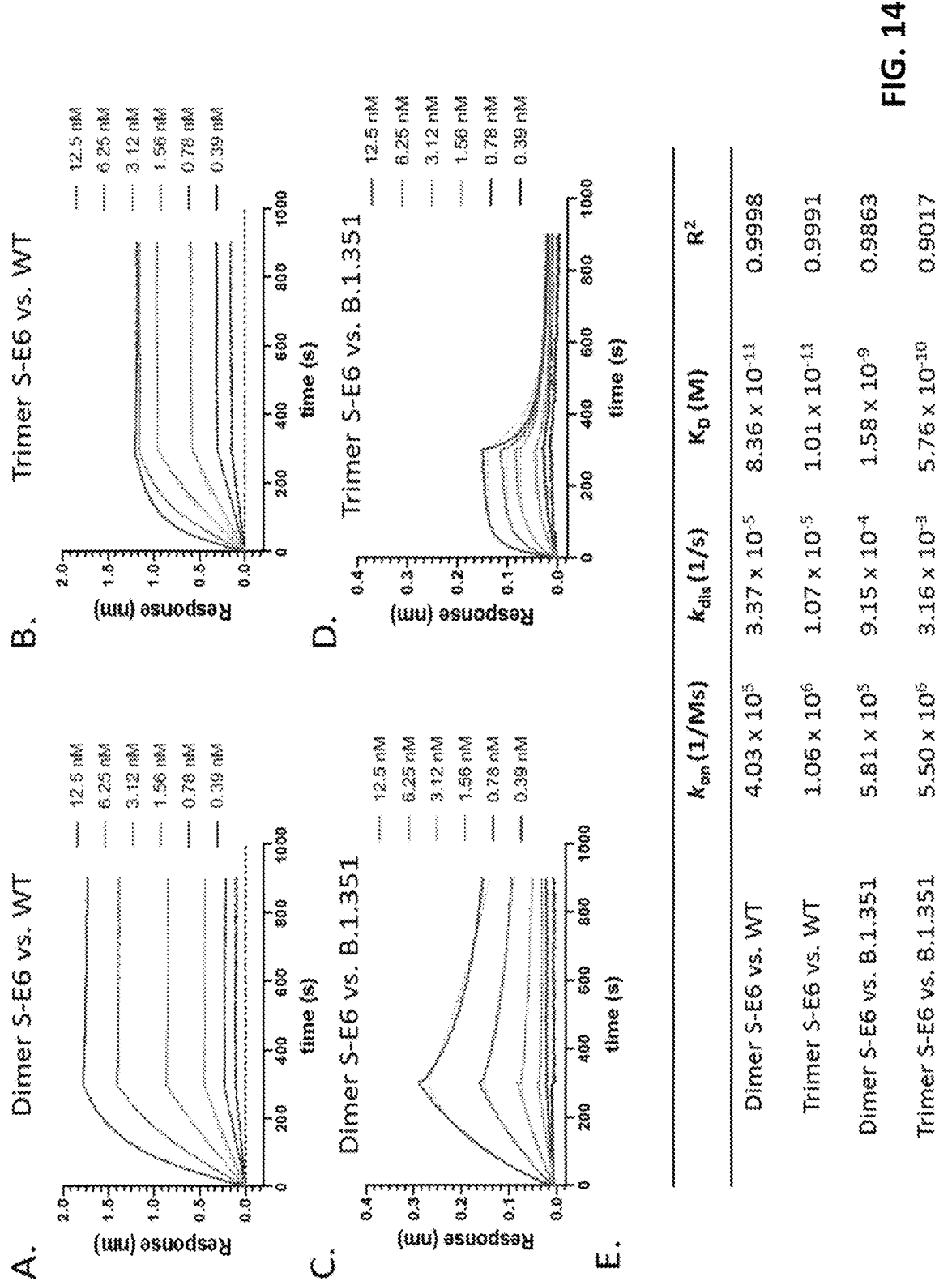
FIG. 14 Trimeric S-E6 shows restored binding avidity to the spike RBD of B.1.351 (Beta Strain). Binding kinetics of dimer S-E6 (A) or trimer S-E6 (B) with wild-type (WT)S-RBD were measured by biolayer interferometry (BLI). Binding kinetics of dimer S-E6 (C) or trimer S-E6 (D) with spike RBD of B.1.351 were measured by BLI. The fitting curves were shown as grey dotted line. E. The association-rate ($k_{on}$), dissociation-rate ($k_{off}$) and dissociation constant ($K_D$) of the antibodies to WT S-RBD and B.1.351 S-RBD are shown. All curves were fitted by a 1:1 binding model using the Data Analysis software (Forte Bio).

Trimer S-E6 Revived Neutralizing Potency to B.1.351 (Beta Strain) PSV with Enhanced Binding Avidity to S-RBD Binding is the basic physical force for neutralization, so we determined the binding parameters of antibody-RBD. Kinetic parameters of on-rate ($k_{on}$), off-rate ($k_{off}$), and dissociation constant ($K_D$) for dimer/trimer S-E6 to wild-type S-RBD and B.1.351 S-RBD were determined by biolayer interferometry (FIG. 14A, B). Dimer and trimer S-E6 exhibited $K_D$ values of 83.6 pM and 10.1 pM to WT S-RBD, respectively, with trimer S-E6 showing increased association rate (FIG. 14E). Similarly, the binding affinities of trimer S-E6 to the B.1.351 S-RBD was also higher than dimer S-E6, with $K_D$ values of 1.58 nM and 0.58 nM to WT S-RBD and B.1.351 S-RBD, respectively (FIGS. 14C, D and E). The elevation of binding avidity suggests that the trimer S-E6 was more active to neutralize the B.1.351 variant.

Figure 15:
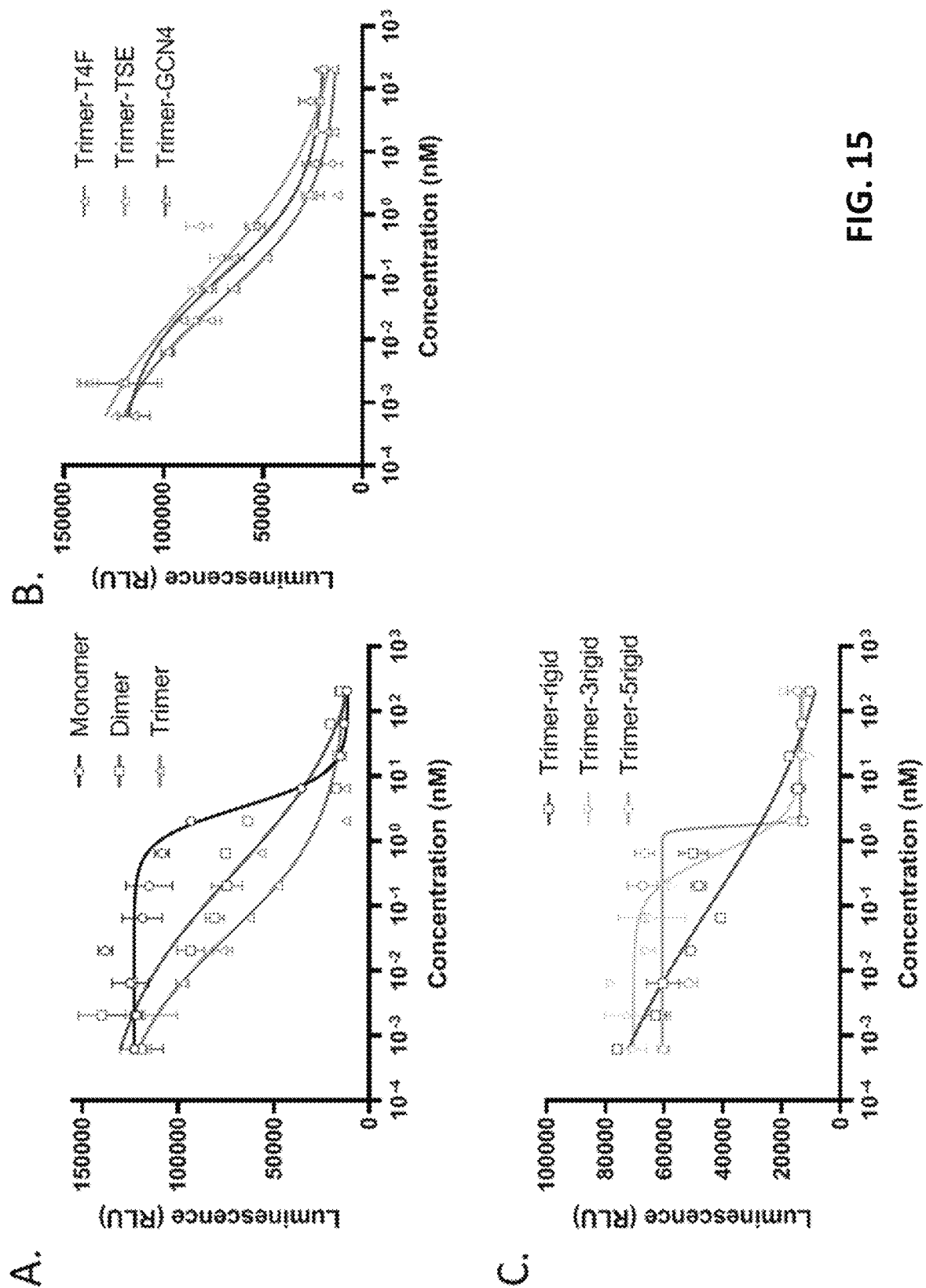
FIG. 15 Trimeric S-E6 shows restored neutralizing ability to B.1.351 (Beta Strain) PSV. A. Neutralization abilities of the different valents of S-E6 to SARS-CoV-2 B.1.351 pseudovirus were tested and fitted. B. Neutralization ability of three trimer S-E6 with different trimerization tags to SARS-CoV-2 B.1.351 pseudovirus was tested and fitted. C. Neutralization ability of three trimer S-E6 with different lengths of rigid linkers to SARS-CoV-2 B.1.351 pseudovirus was tested and fitted.

To test whether the trimer format of nAbs can restore the neutralizing potency to the immune escape variants, we first tested the neutralization of trimer S-E6 to the B.1.351 PSV. The experimental design was similar to that of WT SARS-CoV-2 PSV in FIG. 13, different valents/trimerization tags/linkers encoded S-E6 were tested for neutralizing B.1.351 PSV. As shown in FIG. 15, trimer S-E6 indeed shows markedly enhanced potency than the dimer and monomer ones, while the best modification is also the construct with 3(G4S) linked T4F tag (Table 5). Trimer S-E6 showed a $NT_{50}$ of 0.036±0.022 nM, comparable to the potency of native form of S-E6 (IgG) on WT SARS-CoV-2 PSV ($NT_{50}$=0.036±0.004 nM, FIG. 13D, Table 5). It suggests that engineering IgG format nAb into trimer-Fab format, it restored the neutralizing potency to the immune escape variant B.1.351.

Figure 16:
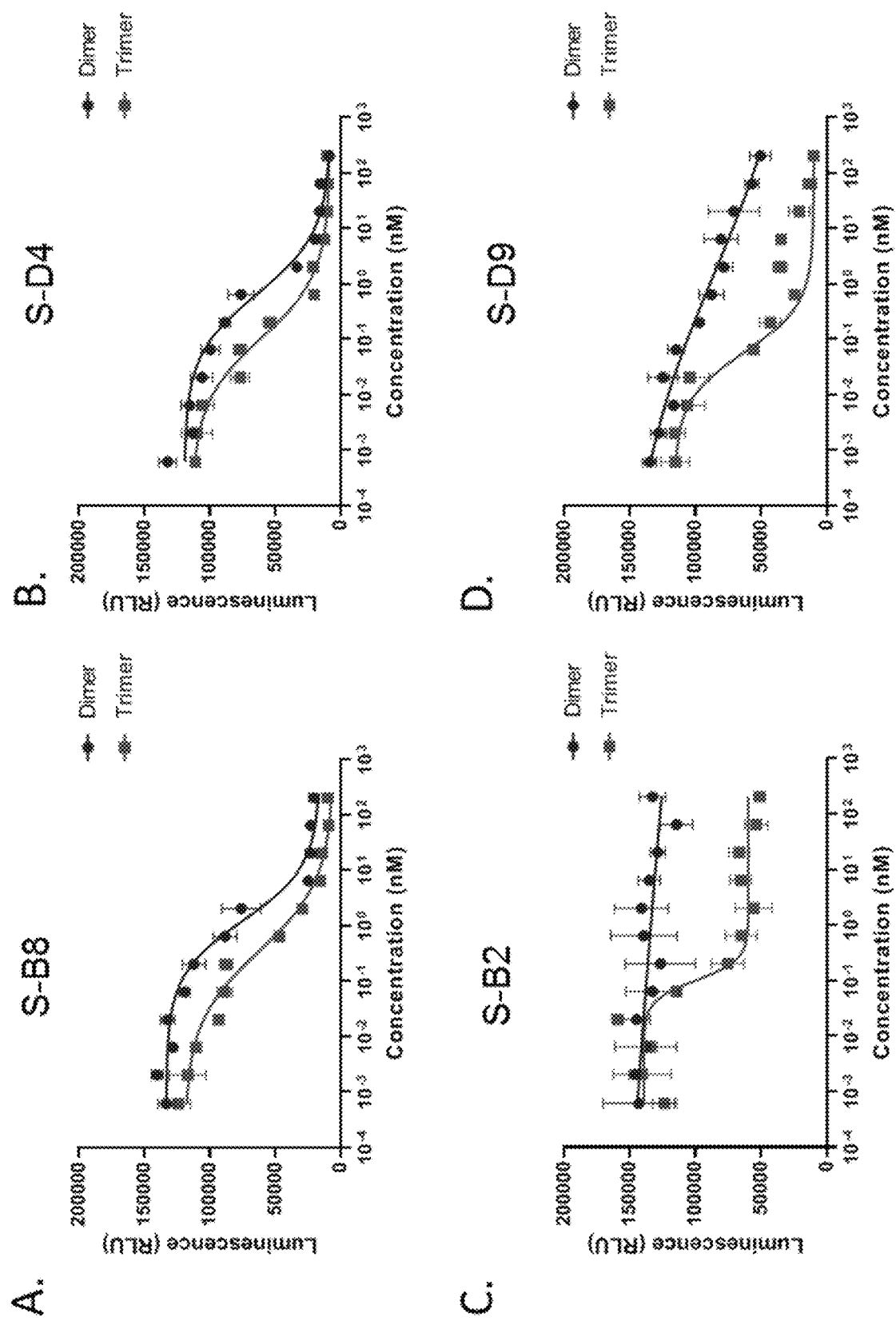
FIG. 16 Trimer format of nAbs from different classes show variable neutralizing enhancement to SARS-CoV-2 B.1.351 PSV. Neutralization abilities of the dimer or trimer antibodies from class 1, 2 and 3 to B.1.351 SARS-CoV-2 pseudovirus were tested and fitted. S-B8 (A), S-D4 (B), S-B2 (C) and S-D9 (D) are from class 1. S309 (E) is from class 2. CoV2-2489 (F) is from class 3. G. $NT_{50}$ values fold increase upon trimerization.
Figure 16:
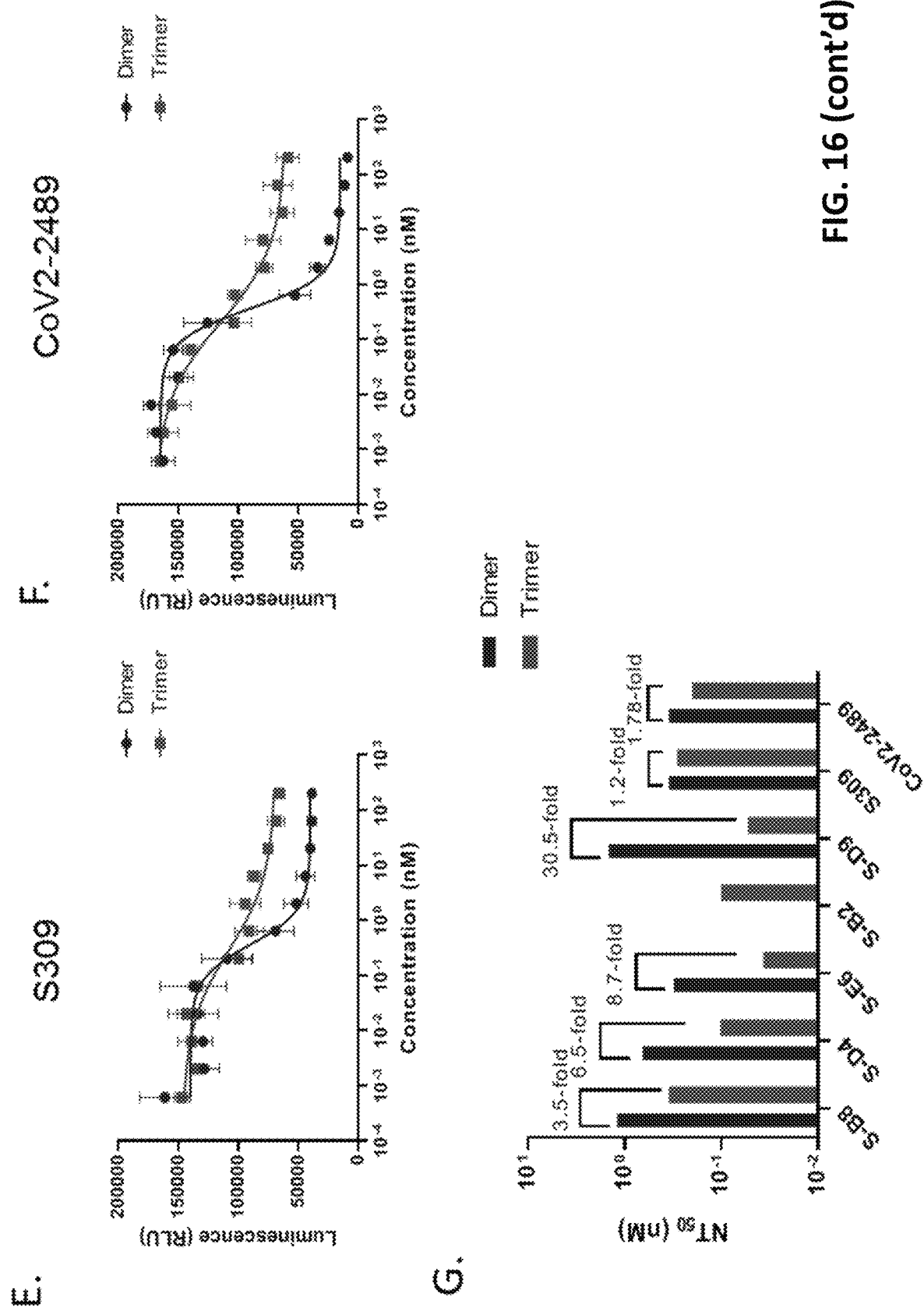

Trimeric Class 1 nAbs Restored Neutralizing Potency to B.1.351 (Beta Strain) PSV Motivated by the success in restoring the S-E6 neutralization against B.1.351, we further investigated whether the trimer reformatting is applicable to other S-RBD targeting nAbs. Class 1 nAbs are ACE2 competing ones that bind in RBM of spike, and some of them show decreased potency to B.1.351. We used T4F tag fusing with triple (G4S) linker as the trimer format, which is the most potent trimer format confirmed by S-E6. We took several class 1 nAbs belonging to the top enriched IGHV germlines for trimer modification, including S-B2 (IGHV3-30), S-D9 (IGHV5-51), S-D4 (IGHV3-33) and S-B8 (IGHV3-66) (FIG. 16A-D). In addition, a class 2 nAb, S309, was also engineered (FIG. 16E). A NTD targeting Ab CoV2-2489 was selected as an example of class 3 nAb (FIG. 16F).

Trimeric form of class 1 antibodies exhibited increased neutralizing potency than their corresponding IgG4 format, such as S-B8, S-D4 improved $NT_{50}$ by 3.5-fold and 6.5-fold, respectively. As conserved site targeting antibodies, class 2 antibody S309-IgG4 and class 3 antibody CoV2-2489-IgG4 could neutralize the B.1.351 PSV, with $NT_{50}$ of 0.36±0.08 nM and 0.35±0.04 nM, respectively. All $NT_{50}$ values fold increases upon trimerization, antibodies from Class 1 enhanced up to 30.5-fold (FIG. 16G). For S-B2 antibody, the dimer format did not show any neutralization against B.1.351 PSV even at 100 nM, but the trimer format inhibited the PSV infection with a $NT_{50}$ of 0.1 nM for B.1.351 PSV.

Interestingly, although similar $NT_{50}$ were observed between dimer and trimer, the trimerizing engineering to antibodies from class 2 and class 3 impairs the neutralizing effects, showing inhibition rates at maximal concentration (200 nM) decreased. The inhibition rates of S309 decreased from 76% to 55% at 200 nM, the inhibition capability reduced by 28%, while CoV2-2489 inhibition decreased from 95% to 64% at 200 nM, the inhibition capability reduced by 32% (Table 6 and FIG. 16G). But the inhibition rate of trimeric class 1 antibodies at 200 nM are improved in comparison to the dimer antibodies.

TABLE 6

Neutralizing parameters of nAbs

|  | NT50 (B.1.351) (nM) | NT50 (B.1.617.2) (nM) |
| --- | --- | --- |
| S-E6 dimer | 0.32 ± 0.22 | 0.065 ± 0.003 |
| S-E6 trimer | 0.036 ± 0.02 | 0.007 ± 0.003 |
| S-B8 dimer | 1.2 ± 0.2 | 0.37 ± 0.06 |
| S-B8 trimer | 0.35 ± 0.07 | 0.15 ± 0.01 |
| S-D4 dimer | 0.66 ± 0.13 | 0.24 ± 0.03 |
| S-D4 trimer | 0.10 ± 0.02 | 0.14 ± 0.02 |
| S-B2 dimer | >100 | 0.23 ± 0.02 |
| S-B2 trimer | 0.10 ± 0.02 | 0.067 ± 0.004 |
| S-D9 dimer | −1.5 ± 3.6 | 0.24 ± 0.05 |
| S-D9 trimer | 0.05 ± 0.01 | 0.067 ± 0.014 |
| S309 dimer | 0.36 ± 0.08 | N.A |
| S309 trimer | 0.28 ± 0.13 | N.A |
| CoV2-2489 dimer | 0.35 ± 0.04 | N.A |
| CoV2-2489 trimer | 0.20 ± 0.07 | N.A |

Figure 17:
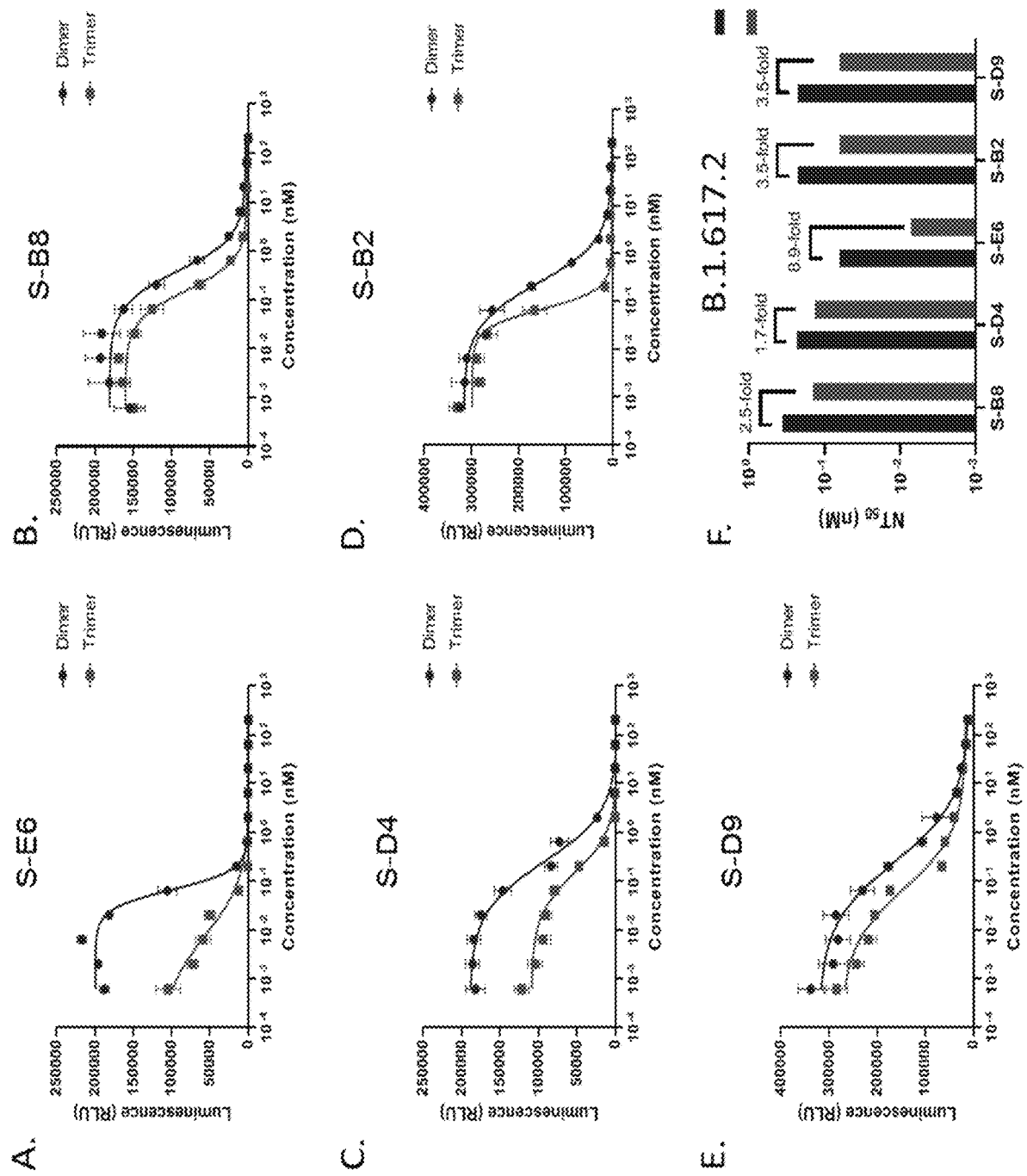
FIG. 17 Trimer format of nAbs from class 1 show variable neutralizing enhancement to SARS-CoV-2 B.1.617.2 PSV. Neutralization abilities of the dimer or trimer antibodies from class 1 to SARS-CoV-2 B.1.617.2 pseudovirus were tested and fitted. S-B8 (A), S-D4 (B), S-E6 (C), S-B2 (D) and S-D9 (E) are from class 1. F. $NT_{50}$ values fold increase upon trimerization.

Trimeric Class 1 nAbs Restored Neutralizing Potency to B.1.617.2 (Delta Strain) PSV Due to the high transmission efficiency and more breakthrough cases of B.1.617.2, we tested the potency of trimer antibodies on its PSV. Taken S-E6 as example, the neutralizing ability of trimer S-E6 is significantly higher than that of the IgG form, and the $NT_{50}$ value is only 4.6-fold higher than that to wild-type SARS-CoV-2 PSV (FIG. 17A). Neutralizing enhancement of trimer format was also observed on other class 1 antibodies (FIG. 17B-E). For S-B2, S-B8, S-D4, S-E6 and S-D9, the increased neutralizing abilities are 2.5-fold, 1.5-fold, 8.5-fold, 3.5-fold and 3.5-fold, respectively (FIG. 17F and Table 6). Meanwhile, the neutralization to B.1.671.2 of four antibodies are near complete.

The variants spread faster and caused higher risk of severe disease. For example, the B.1.1.7 (alpha) strain presented a 48% higher risk of severe disease than wild-type virus, the B.1.351 (beta) strain triggered a 24% higher risk of severe disease, 49% higher risk of critical disease, and 57% higher risk of COVID-19 death. The B.1.351 (beta) strain can escape the monoclonal antibodies targeting the viral spike glycoprotein (S). The B.1.617 was fully resistant to neutralization by bamlanivimab and partially resistant against neutralization by antibodies elicited by infection and vaccination with the Comirnaty/BNT162b2 vaccine. Taken together, the virus has developed a series of variants to escape the neutralization by nAb. Therefore, developing variant-resistant antibody is vital for the variants infection treatment and prevention. In this example, we proposed a strategy of engineering the nAbs into the trimeric format. We found an efficient trimeric format by fusing T4F with 3(G4S) to the C-terminus of CH1 domain. The trimeric antibodies significantly increased the avidity to the spike protein. Finally, the trimeric formats successfully restored the neutralization capabilities to the immune escape strains, including B.1.351 and B.1.617.2.

Example 4. Conformation Selection of SE6 Protein

Linoleic acid can lock the SARS-CoV-2 spike protein in the down conformation. We investigated the conformation preference using the Octet.

Purified Spike trimer protein was immobilized on the SA sensor. Linoleic acid (Cat. L8134, Sigma) was dissolved in the running buffer. The baseline was recorded for 60 sec in a running buffer (PBST-B), and then the sensors recorded the progressive curves of association stage for 300 sec in wells containing 2-fold serial diluted antibody solutions. In the dissociation step, sensors were incubated in a PBST-B buffer for 600 sec to record the progressive curves of dissociation. The sensor graph with or without the Linoleic acid was compared to get the binding preference. The average $k_{on}$, $k_{off}$ and $k_D$ values were calculated from all the binding curves based on the fitting with a 1:1 Langmuir binding model.

Figure 18:
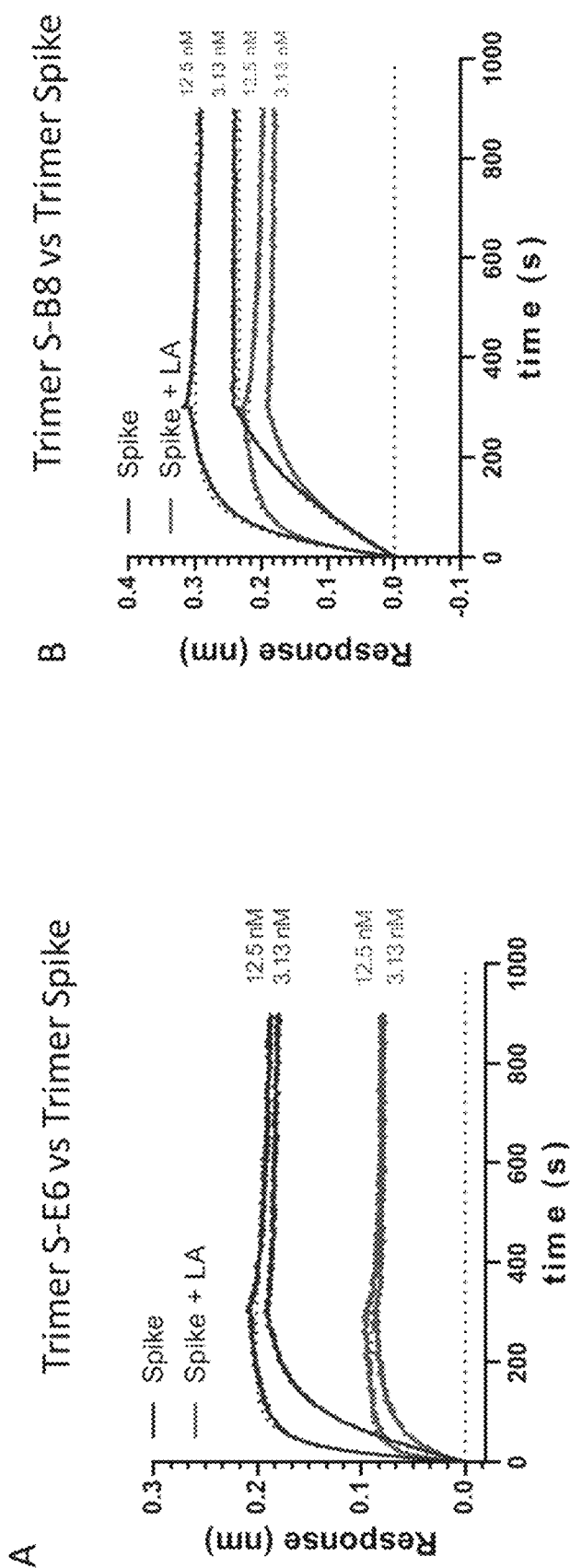
FIG. 18 shows the binding preference of trimeric S-E6 and S-B8. Binding kinetics of Trimer S-E6 (A) or trimer S-B8 (B) with wild-type (WT)S-RBD were measured by biolayer interferometry (BLI) with Linoleic acid (Red) or without Linoleic acid (blue). The supplement of Linoleic acid significantly decreased the binding of antibody to the Spike protein, indicating the antibody prefer to bind the up conformation.

As shown in FIG. 18, trimeric S-E6 and S-B8 preferentially bound to the up conformation. Binding kinetics of Trimer S-E6 (FIG. 18A) or trimer S-B8 (FIG. 18B) with wild-type (WT)S-RBD were measured by biolayer interferometry (BLI) with Linoleic acid (Red) or without Linoleic acid (blue). The supplement of Linoleic acid significantly decreased the binding of antibody to the Spike protein, indicating the antibody prefer to bind the up conformation.

The present disclosure is not to be limited in scope by the specific embodiments described which are intended as single illustrations of individual aspects of the disclosure, and any compositions or methods which are functionally equivalent are within the scope of this disclosure. It will be apparent to those skilled in the art that various modifications and variations can be made in the methods and compositions of the present disclosure without departing from the spirit or scope of the disclosure. Thus, it is intended that the present disclosure cover the modifications and variations of this disclosure provided they come within the scope of the appended claims and their equivalents.

All publications and patent applications mentioned in this specification are herein incorporated by reference to the same extent as if each individual publication or patent application was specifically and individually indicated to be incorporated by reference.

The invention claimed is:

1. An antibody or fragment thereof, wherein the antibody or fragment thereof has specificity to the SARS-CoV-2 spike protein, and comprises a heavy chain variable region (VH) comprising heavy chain complementarity determining regions CDRH1, CDRH2, and CDRH3, and a light chain variable region (VL) comprising light chain complementarity determining regions CDRL1, CDRL2, and CDRL3, wherein the CDRH1, CDRH2, CDRH3, CDRL1, CDRL2, and CDRL3, respectively, comprise the amino acid sequences of
   (a) SEQ ID NO:5-10;
   (b) SEQ ID NO:27-32;
   (c) SEQ ID NO:49-54;
   (d) SEQ ID NO:71-76; or
   (e) SEQ ID NO:89-94.

2. The antibody or fragment thereof of claim 1, which does not bind to the SARS-CoV spike protein.

3. The antibody or fragment thereof of claim 1, wherein the CDRH1, CDRH2, CDRH3, CDRL1, CDRL2, and CDRL3 comprise the amino acid sequences of SEQ ID NO:5-10, respectively.

4. The antibody or fragment thereof of claim 3, wherein the VH comprises the amino acid sequence of SEQ ID NO:1, and the VL comprises the amino acid sequence of SEQ ID NO: 2.

5. The antibody or fragment thereof of claim 1, wherein the CDRH1, CDRH2, CDRH3, CDRL1, CDRL2, and CDRL3 comprise the amino acid sequences of SEQ ID NO:27-32, respectively.

6. The antibody or fragment thereof of claim 5, wherein the VH comprises the amino acid sequence of SEQ ID NO:23, and the VL comprises the amino acid sequence of SEQ ID NO:24.

7. The antibody or fragment thereof of claim 1, wherein the CDRH1, CDRH2, CDRH3, CDRL1, CDRL2, and CDRL3 comprise the amino acid sequences of SEQ ID NO:49-54, respectively.

8. The antibody or fragment thereof of claim 7, wherein the VH comprises the amino acid sequence of SEQ ID NO:45, and the VL comprises the amino acid sequence of SEQ ID NO:46.

9. The antibody or fragment thereof of claim 1, wherein the antibody a human antibody.

10. A trimeric antibody comprising three fusion polypeptides, each fusion polypeptide comprising an antigen binding domain fused to a trimerization domain, wherein the antigen binding domain has binding specificity to the receptor binding motif (RBM) of the receptor binding domain (RBD) of the SARS-Cov-2 spike protein,
   wherein the antigen binding domain comprises a VH comprising CDRH1, CDRH2, and CDRH3, and a VL comprising CDRL1, CDRL2, and CDRL3, wherein the CDRH1, CDRH2, CDRH3, CDRL1, CDRL2, and CDRL3, respectively, comprise the amino acid sequences of
      (a) SEQ ID NO:5-10;
      (b) SEQ ID NO:27-32;
      (c) SEQ ID NO:49-54;
      (d) SEQ ID NO:71-76; or
      (e) SEQ ID NO:89-94, and
   wherein the trimerization domain comprises an amino acid sequence selected from the group consisting of SEQ ID NO:103, 107 and 111.

11. The trimeric antibody of claim 10, wherein the trimerization domain is capable of mediating stable association of the trimeric antigen binding molecule.

12. The trimeric antibody of claim 10, wherein the trimerization domain comprises the amino acid sequence of SEQ ID NO:103.

13. The trimeric antibody of claim 10, further comprising a peptide linker between the antigen binding domain and the trimerization domain.

14. The trimeric antibody of claim 13, wherein the peptide linker is a flexible linker.

15. The trimeric antibody of claim 13, wherein the peptide linker is from 5 to 50 amino acid residues in length.

16. The trimeric antibody of claim 10, wherein the antigen binding domain binds to at least one of amino acid residues selected from the group consisting of positions 438-, 447-456, 489-495, and 507-508 of SEQ ID NO:126.

17. The trimeric antibody of claim 10, wherein the antigen binding domain is a Fab fragment or a scFv fragment.

18. One or more polynucleotides encoding the antibody or fragment thereof of claim 1.

19. A method for treating a SARS-CoV-2 viral infection in a subject, comprising administering to the subject an effective amount of the antibody or fragment thereof of claim 1.

20. The trimeric antibody of claim 13, wherein the peptide linker comprises the amino acid sequence of SEQ ID NO:122 or 123.

\* \* \* \* \*